US012651470B2

(12) United States Patent
Dhanani et al.

(10) Patent No.: US 12,651,470 B2
(45) Date of Patent: Jun. 9, 2026

(54) IMAGE PROCESSING SYSTEMS FOR DETECTING VEHICLE DAMAGE

(71) Applicant: CCC INTELLIGENT SOLUTIONS INC., Chicago, IL (US)

(72) Inventors: Bhadresh Dhanani, Chicago, IL (US); Sagar Bachwani, Chicago, IL (US); Ranjini Vaidyanathan, Chicago, IL (US)

(73) Assignee: CCC INTELLIGENT SOLUTIONS INC., Chicago, IL (US)

( * ) Notice: Subject to any disclaimer, the term of this patent is extended or adjusted under 35 U.S.C. 154(b) by 401 days.

(21) Appl. No.: 17/741,267

(22) Filed: May 10, 2022

(65) Prior Publication Data

US 2022/0358756 A1 Nov. 10, 2022

Related U.S. Application Data

(60) Provisional application No. 63/186,717, filed on May 10, 2021.

(51) Int. Cl.
*G06V 10/82* (2022.01)
*G06T 3/18* (2024.01)
(Continued)

(52) U.S. Cl.
CPC ................ *G06V 20/70* (2022.01); *G06T 3/18* (2024.01); *G06T 7/0002* (2013.01);
(Continued)

(58) Field of Classification Search
CPC .. G06F 3/0481; G06F 3/0482; G06F 3/04845; G06Q 10/20; G06Q 30/0283;
(Continued)

(56) References Cited

U.S. PATENT DOCUMENTS 9,886,771 B1 * 2/2018 Chen ................... G06F 3/04845
10,319,094 B1 6/2019 Chen et al.
(Continued)

OTHER PUBLICATIONS

Zelic, "Damage Inspection with AI-Automating Claims Processing for Insurance," Nanonets (2021). Retrieved from the Internet at: https://nanopets.com/blog/damage-inspection-machine-learning/.

*Primary Examiner* — Michael J Vanchy, Jr.
(74) *Attorney, Agent, or Firm* — MARSHALL, GERSTEIN & BORUN LLP

(57) ABSTRACT

An image processing system analyzes each of a set of vehicle images to determine if there is any damage to the vehicle depicted in each or any of the images. The image processing system uses a characterization engine in the form of a neural network based image model to process each of the pixels of each of the selected tagged images to determine the particular pixels of the image (or of the object depicted within the image) that depict the presence of damage to the object, and the likelihood of the pixels depicting damage. The characterization engine or image model may be developed or trained using a training engine that analyzes a plurality of images of different vehicles damaged in various different manners which have been annotated, on a pixel by pixel basis, to indicate which pixels of each image represent damaged areas of the objects and which have also been annotated, on an image basis, to indicate the view and/or zoom level of the image.

20 Claims, 27 Drawing Sheets

(51) Int. Cl.

| | |
|---|---|
| *G06T 7/00* | (2017.01) |
| *G06T 7/10* | (2017.01) |
| *G06T 7/11* | (2017.01) |
| *G06T 7/50* | (2017.01) |
| *G06T 7/70* | (2017.01) |
| *G06V 10/26* | (2022.01) |
| *G06V 10/764* | (2022.01) |
| *G06V 10/766* | (2022.01) |
| *G06V 10/774* | (2022.01) |
| *G06V 10/94* | (2022.01) |
| *G06V 20/70* | (2022.01) |
| *G06F 3/0482* | (2013.01) |
| *G06Q 10/20* | (2023.01) |
| *G06Q 30/0283* | (2023.01) |

(52) U.S. Cl.
CPC .............. *G06T 7/0004* (2013.01); *G06T 7/10* (2017.01); *G06T 7/11* (2017.01); *G06T 7/50* (2017.01); *G06T 7/70* (2017.01); *G06V 10/26* (2022.01); *G06V 10/764* (2022.01); *G06V 10/766* (2022.01); *G06V 10/774* (2022.01); *G06V 10/82* (2022.01); *G06V 10/945* (2022.01); *G06F 3/0482* (2013.01); *G06Q 10/20* (2013.01); *G06Q 30/0283* (2013.01); *G06T 2207/20021* (2013.01); *G06T 2207/20081* (2013.01); *G06T 2207/20084* (2013.01); *G06T 2207/30252* (2013.01); *G06V 2201/08* (2022.01)

(58) Field of Classification Search
CPC . G06T 2207/20021; G06T 2207/20081; G06T 2207/20084; G06T 2207/30252; G06T 3/18; G06T 7/0002; G06T 7/0004; G06T 7/10; G06T 7/11; G06T 7/50; G06T 7/70; G06V 10/26; G06V 10/764; G06V 10/766; G06V 10/774; G06V 10/82; G06V 10/945; G06V 20/70; G06V 2201/08

See application file for complete search history.

(56) References Cited

U.S. PATENT DOCUMENTS

| | | | |
|---|---|---|---|
| 10,636,148 B1 | 4/2020 | Chen et al. | |
| 10,657,647 B1 | 5/2020 | Chen et al. | |
| 10,706,321 B1 | 7/2020 | Chen et al. | |
| 10,740,891 B1 | 8/2020 | Chen et al. | |
| 10,783,643 B1 * | 9/2020 | Zhang | G06V 10/225 |
| 11,288,789 B1 | 3/2022 | Chen et al. | |
| 11,361,428 B1 | 6/2022 | Chen et al. | |
| 11,430,069 B1 * | 8/2022 | Pedersen | H04N 7/185 |
| 11,935,219 B1 * | 3/2024 | Cole | G06N 3/045 |
| 2020/0110965 A1 * | 4/2020 | Zhao | G06F 18/214 |
| 2022/0148050 A1 * | 5/2022 | Gandhi | G06N 3/08 |

* cited by examiner

Y/M/M = 2016 Honda Accord Sport

308 — Y/M/M = 2016 Honda Accord Sport

310 — View = Right Front Corner

312 — Zoom = Negligible

308 — Y/M/M = 2016 Honda Accord Sport

325 — View = Right Front Corner

330 — Zoom = Average

308 — Y/M/M = 2016 Honda Accord Sport

328 — View = Right Front Corner

332 — Zoom = High

Y/M/M = 2016 Honda Accord Sport

Y/M/M = 2016 Honda Accord Sport

Y/M/M = 2016 Honda Accord Sport

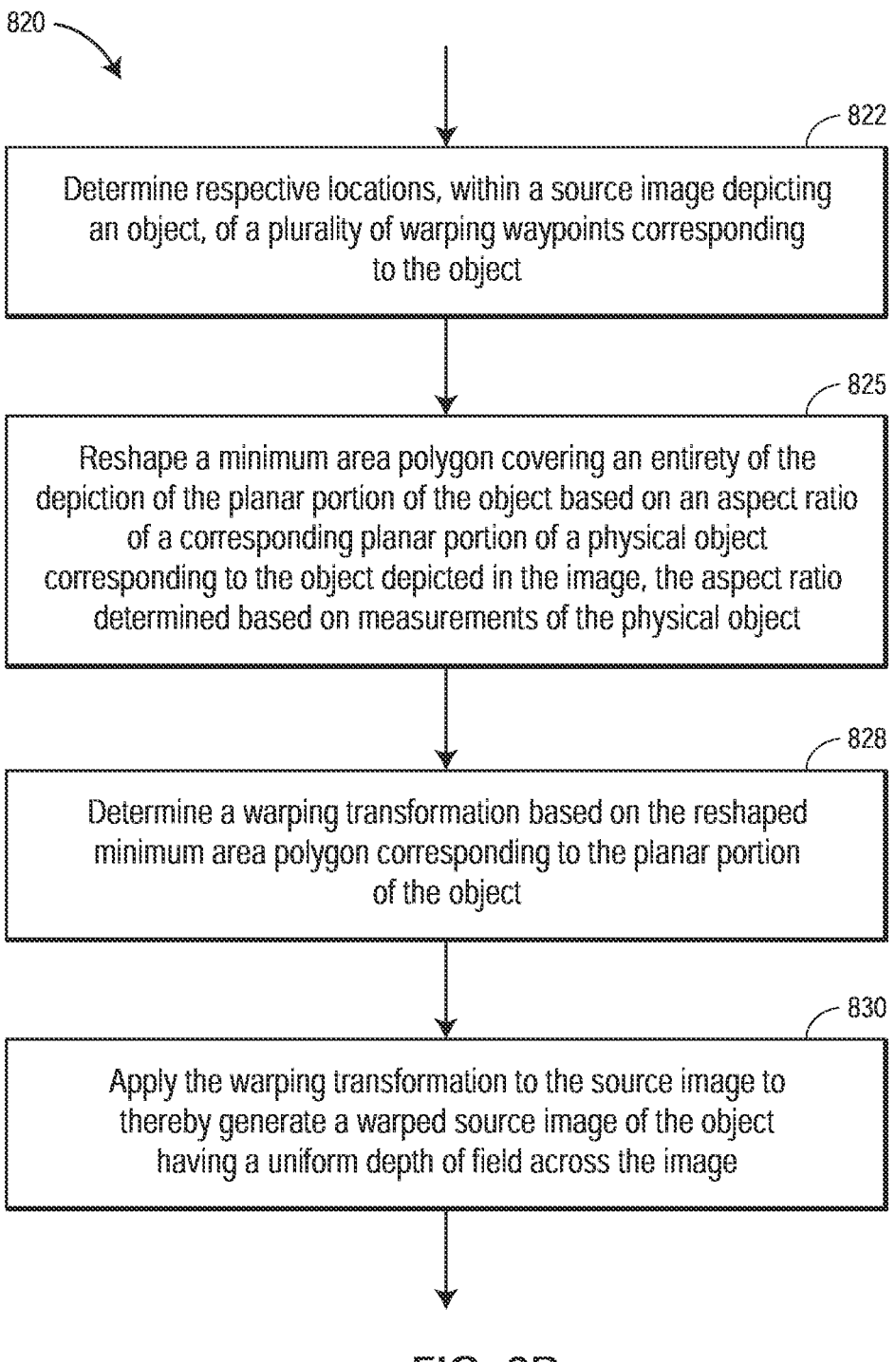

820

822

Determine respective locations, within a source image depicting an object, of a plurality of warping waypoints corresponding to the object

825

Reshape a minimum area polygon covering an entirety of the depiction of the planar portion of the object based on an aspect ratio of a corresponding planar portion of a physical object corresponding to the object depicted in the image, the aspect ratio determined based on measurements of the physical object

828

Determine a warping transformation based on the reshaped minimum area polygon corresponding to the planar portion of the object

830

Apply the warping transformation to the source image to thereby generate a warped source image of the object having a uniform depth of field across the image

FIG. 8B

IMAGE PROCESSING SYSTEMS FOR DETECTING VEHICLE DAMAGE

CROSS-REFERENCE TO RELATED APPLICATIONS

This application claims priority to and the benefit of U.S. Provisional Patent Application No. 63/186,717 filed on May 10, 2021 and entitled "IMAGE PROCESSING SYSTEM AND METHOD FOR DETECING PRECISE LOCATIONS, SIZES AND TYPES OF DAMAGE TO AN OBJECT," the disclosure of which is hereby incorporated by reference in its entirety.

TECHNICAL FIELD

This patent relates to an image processing system and technique, and more particularly, to an image processing system and methodology that detects highly precise locations, sizes and/or types of changes to an object.

DESCRIPTION OF THE RELATED ART

Image processing systems typically operate on images, such as photos, digital pictures, digital video frames, computer generated images, etc., to enhance the image in some manner or to detect certain features or characteristics of an image, such as to determine information about objects in the image, to recognize persons or things in the image, etc. For example, there are many image processing systems that perform character or facial recognition in images to identify text, people, particular buildings, or other features of objects within images in order to automatically identify people, objects, or other features depicted within the image. In many cases, these image processing systems use statistical processing techniques to detect particular features or characteristics of the set of pixels that make up a feature based on the similarity of the characteristics of the image pixels to other images of the same or similar object, feature, etc. being detected. In other cases, image processing systems look for and detect defects in the image caused by the camera, such as red eye detection, distortion detection, color balance detection, etc., all with the goal of correcting or altering the image to make the image a better or more realistic or more pleasing image. As further examples, some image processing systems operate to perform edge detection to detect objects within an image, to filter images in various manners to reduce or enhance particular features of the image, etc. The goal of most of these image processing systems is to create a better or more useful image, or to detect features within the image for some other purpose.

Traditionally, there have been very few image processing systems that can quickly and effectively detect changes that have occurred to an object as depicted in an image to thereby detect the manner in which an object depicted in the image has changed from a known state or condition to, for example, a degraded or an upgraded state or condition. For example, known image processing systems are unable to quickly and effectively detect, isolate or quantify damage that may have occurred to an automobile in an accident, changes to buildings or other structures that may have occurred due to further construction on the buildings, due to tornado or flood damage, etc. While it is possible to compare images of the same object at different times to detect changes to the image of the object, it is difficult to automatically detect or quantify actual changes to the object based on this comparison of the images for a number of reasons. In particular, such a comparison requires the images of the object to be from the same perspective, angle, distance, etc. which is difficult to achieve in practice. Moreover, a high fidelity comparison would normally require that the images be obtained from the same camera to account for distortions that would typically be introduced by different cameras taking images at different times. Still further, a simple comparison of images of the same object from the same perspective and using the same camera may still result in the detection of changes that are not substantive in nature due to differences in lighting, surrounding objects, etc. Moreover, it is difficult to quantify the nature or type of changes even if such changes are be detected.

More recently, there have been some advances in using image processing techniques to analyze one or more images of an object to detect, more precisely, areas of change, e.g., damage on the object. For example, U.S. Pat. No. 9,886,771 describes an image processing system that creates and uses statistically based models of known automobiles to detect damage to an automobile caused by, for example, an accident. The output of this model includes a "heat map" illustrating particular areas of damage detected in various locations or panels of a vehicle as compared to a non-damaged vehicle of the same make, model and year. This heat map can be used by a viewer to grossly determine where damage is likely to exist on a particular vehicle based on images or photos of the vehicle and the viewer can use the heat map as part of a process to estimate repair work that needs to be performed on the vehicle and thereby to estimate repair costs associated with repairing the vehicle. However, unfortunately, a user such as an estimator must still analyze the images along with the heat map to estimate the size of the damage (such how much of a particular panel is damaged, the size of the damage as compared to the panel size, etc.) as well as the type of damage (for example, is the damage a scratch, a dent, a tear, a misalignment, etc.) in order to estimate the repairs that need to be performed and the costs of such repairs. Still further, the techniques described in this patent are computationally complex and require the creation of a number of artificial intelligence (AI) models for different automobiles and different parts of different automobiles.

SUMMARY

An image processing system includes various different processing components including one or more classification engines, such as statistical image models or convolutional neural network (CNN) models, and analytic routines that process various images of an object, such as images of an automobile or other vehicle, to detect and quantify changes to or on the object, such as damage caused to an automobile in an accident. More particularly, the image processing system may obtain or be provided with a set of target images of the object, with the target images generally depicting different views or areas of the changed object. In one example, the target images may depict different views of the exterior of a vehicle, such as a front planar view, corner or perspective views, side planar views, and a rear planar view of an automobile. A single target image may depict only a single planar view of the vehicle, or a single target image may depict multiple planar views of the vehicle (that is, may depict a corner or perspective view of the vehicle). The image processing system may then process the various target images of the object, such as any of a set of corner, side, front, back and interior images of an automobile, to determine change characteristics of the object, such as the precise location of, the relative size of and the type of damage to an automobile depicted in the images.

In one example, the image processing system may receive or obtain a set of target images of a vehicle, as one or more corner, side, front, back and/or interior images of an automobile or vehicle. In one case, the image processing system may analyze one or more of the target images using a model-based classification engine approach to determine more precise object identification information describing or indicating the type of the object within the images, such as an indication of the year, make and model, and in some cases, the level of trim (abbreviated herein as "Y/M/M") of an automobile or vehicle depicted within the set of target images. In another case, the image processing system may receive this identification information from a user or a file. The image processing system may also or instead analyze each of the target images to determine the view of the object that is depicted in each of the target images and tag each of the target images with the type of view (e.g., front, right side, left side, back, or perspective) of the object and/or with the zoom level of the object as depicted within the target image. More particularly, the image processing system may implement one or more statistical or model-based analyses on some or all of the provided target images, such as on each of a set of target images depicting one or more of a corner, a side, a front and a back of a vehicle, including images at various zoom levels, to determine the nature or view of the image, including the location of the image with respect to the object (e.g., the front right corner view, the left rear corner view, the passenger side view, the driver side view, the front view, the back view, etc.), as well as a zoom level of the view of the object (no zoom, zoomed, or highly zoomed, for example). Upon determining the view and/or the zoom level of the object within the image, the image processing system may tag or label each target image with any or all of the Y/M/M, the view, and the zoom information to create a set of tagged target images.

The image processing system may then select, from the tagged target images, a subset of tagged target images that depict the entire object or a set of desired views of the object, such as eight standard views of an automobile (front, right front corner, passenger side, right rear corner, rear or back, left rear corner, driver side, and left front corner) at appropriate zoom levels (no zoom, medium zoom, large zoom). Moreover, the image processing system may cull or reduce the set of tagged target images to be used in further processing by eliminating images that are too zoomed in, too far away, have glare or other visual or camera artifacts, etc. that prevent the target image from being able to be processed correctly in later steps, to eliminate duplicate views of the object, etc. This reduced set of images is referred to herein as a selected set of tagged target images. Of course, the image processing system may perform the culling process prior to the tagging process if desired. In addition, the image processing system may perform image enhancement to the tagged target images, such as to perform glare reduction, color correction, etc., ultimately to create a set of selected tagged target images that depict or show the object from different perspectives (and possibly zoom levels) and which can be used singly or as a group in later steps of the image processing techniques described herein to identify more precisely a set of change characteristics of the object as depicted in the selected tagged target images. In one example, such change characteristics may be damage characteristics identifying particular aspects of damage to the object. In a further example, such damage characteristics may be a type of damage, a precise location of the damage on the object (e.g., relative to some known component or segment of the object), and/or a precise size of the damage to the object.

More particularly, the image processing system may analyze each of the selected tagged target images to determine if there is any damage to the object depicted in each or any of the selected tagged target images. In one embodiment, the image processing system may implement one or more of the techniques described in U.S. Pat. No. 9,886,771 to obtain a heat map corresponding to each of the selected tagged target images, with each of the heat maps identifying, at a pixel level, where there is damage or likelihood of damage on the object, as depicted in the selected tagged target image. In another case, the image processing system may use a characterization engine and, more particularly, may use a CNN based image model to process each of the pixels of each of the selected tagged target images to determine the particular pixels of the image (or of the object depicted within the image) that depict the presence of damage to the object, and the likelihood of the pixels depicting damage. In this case, the characterization engine or CNN model or transformer model may be developed or trained using a training engine that analyzes a plurality of images of objects (e.g., different automobiles) damaged in various different manners which have been annotated, on a pixel by pixel basis, to indicate which pixels of each image represent damaged areas of the objects and which have also been annotated, on an image basis, to indicate the view and/or zoom level of the image.

Moreover, in one example, the image processing system may further analyze each of the selected tagged target images in which damage is detected to determine a type of damage to the object depicted in the selected tagged target image. Here, the image processing system may store and implement a damage type detection model, such as a statistical image model, which has been trained on various training images to determine or categorize the type of damage depicted in an image as falling into one or more of a preset number of damage types (or as not being determinable). In some cases, the image processing system may perform a model-based classification or statistical analysis on each of the selected tagged target images (such as the images for which the respective heat map indicates the likely existence of damage) to determine the type of damage depicted within the image and more particularly the type of damage depicted at each of the pixels of the image which were identified as depicting the presence of damage to the object by the heat map of that image. In one example, in which images of an automobile are analyzed, the image processing system may detect or determine if the damage is associated with one of various preset types of damage, including, for example, a dent, a scratch, a tear, a misalignment, a hole, a missing part, a kink, a twist, etc. Moreover, the image processing system may, in some cases, determine that damage in a particular image falls into multiple categories, as there may be various different parts of the detected damage (as identified by the heat map for example) that fall into different damage types or categories. Still further, the image processing system may determine a probability of the type of damage for each pixel such that a single pixel may have various probabilities of depicting different types of damage or may even depict two or more types of damage. In one example, the image processing system may use a characterization engine and, more particularly, may use a CNN-based image model to process each of the pixels of each of the selected tagged target images to determine the damage type or damage types depicted by each pixel of the image (or of the object depicted within the image) and, if desired, a probability that the pixel depicts each of those types of damage. In this case, the characterization engine or CNN model or transformer model may be developed or trained using a training engine that uses a plurality of images of objects (various different automobiles of different Y/M/M for example) damaged in various different manners which have been annotated, on a pixel by pixel basis, to indicate which pixels of the image represent damaged areas of the objects and further to indicate the type of damage associated with each such damaged pixel, and which have also been annotated, on an image basis, to indicate the view and/or zoom level of the image.

Still further, the image processing system may analyze each of the selected tagged target images of the object to perform a segmentation of the depiction of the object within the selected tagged target images to thereby create a set of segmented tagged target images in which the boundaries of each of a set of known segments or components depicted in the image are identified. Different segments of the depiction of an object typically are mutually exclusive areas within the image (such as different side or planar views depicted within a single perspective image, different portions of one of the planar views depicted within a single planar or perspective image, etc.). The different segments depicted within a segmented tagged target image may be indicated or differentiated by respective borders, respective colors, labels, and/or other suitable indicators. In one case, each pixel of the segmented tagged target images (also called segmented target images, segment maps, or segment masks) may be labeled with a respective segment in which the pixel is included, and may also, if desired, be labelled or annotated with a probability that the pixel is included in the labelled segment. In some cases, any particular pixel may be labelled as being potentially associated with (e.g., potentially included in) multiple different segments and a respective probability of being included in each segment, or may be labelled as being associated with or being included in no segment at all. Components or segments can be any desired known subdivision of the depiction of the object, such as one or more planar views of the object (e.g., front view, rear or back view, right side view, left side view, top or birds-eye view, etc.), parts of a planar view of an object (e.g., automobile body panels such as a hood, a door, a trunk, a front grill, etc.), and the like. In one example, the image processing system may use a characterization engine and, more particularly, may use a CNN-based image model to process each of the pixels of each of the selected tagged target images to determine the segment name or segment type in which that pixel is included and, if desired, a probability that the pixel is included in that segment. In this case, the characterization engine (or CNN model or transform) may be developed or trained using a training engine that analyzes a plurality of images of objects (various different automobiles of the same or different Y/M/M) damaged in various different manners which have been annotated, on a pixel by pixel basis, to indicate which pixels of the image are included in which segments of the depiction of the object, and which have also been annotated, on an image basis, to indicate the view and/or zoom level of the image.

In one case, the image processing system may include a tool that helps a user train each of the statistical image models or classification engines (e.g., the CNN models) that are used to detect damaged areas on a vehicle, to detect damage types, and to detect segments of the depiction of the vehicle by enabling a user to select and annotate various different training images to be used to train the models, wherein each of the training images depicts damage of one or more damage types to various different vehicles or automobiles (including automobiles of different Y/M/M). Generally, the tool may display each of the selected training images and enable a user to indicate, on the displayed selected training image, using an electronic pen, a touch screen or any other type of selector device, one or more of (1) a set of pixels within the displayed image that are associated with or that depict damage to the vehicle, (2) a set of pixels within the displayed image that are associated with or that depict a particular type of damage, and/or (3) a set of pixels within the displayed image that are associated with or included in a particular segment of the depiction of the vehicle within the image (e.g., associated with a particular planar view of the vehicle, with a particular automobile panel, etc.). The user may, for example, be able to draw a line around the pixels associated with damage in general, pixels associated with a particular type of damage, such as a dent or a scratch depicted in the displayed training image, or associated with a particular vehicle body panel within the image, to indicate the pixels in the training image that depict damage in general, that depict damage of a particular type and/or that are included in particular segments of the depiction of the vehicle. The tool may then enable the user to associate or label the selected pixels of the displayed training image as being damaged or illustrating damage, as being associated with a particular type of damage, such as with a dent, a scratch, a hole, a tear, etc., and/or as being associated with a particular segment of the depiction of the object, such as with a particular body panel of a vehicle. As an example, the model building or training tool may enable the user to label or associate a particular type of damage or a particular segment of the depiction of an object within the image with the selected pixels using a drop down menu, and the system may then mark the training image and, in particular, the selected individual pixels of the training image with a particular damage type or a particular segment as identified by the user or model trainer. In some cases, the user may also be able to indicate the view of the image (e.g., right front corner view, side view, back view, etc.) and/or an approximate zoom level of the image (no zoom, moderate zoom, high zoom, etc.). These preprocessed images, referred to herein as damage training images, damage-typed training images and segmented training images, respectively, can then be advantageously used to train statistical or classification models (in one example, CNN models) that are then used to process pixels in new images (e.g., target images) (1) to detect a probability of damage at respective locations, on the vehicle, depicted by each of those pixels, (2) to detect a type of damage and/or a probability of a particular type of damage at respective locations depicted by each of those pixels and/or (3) to detect the respective segment of the depiction of the object (and/or a probability of the respective segment of the depiction of the object) in which each of those pixels is included.

Once a segmented target image or segmentation map for a target image is determined, the image processing system may overlay or otherwise compare the segmentation map or segmented target image for a particular tagged target image with the particular tagged target image and label each pixel in the selected tagged target image being processed with one or more segment identifiers (so that each pixel depicted in the selected tagged target image is identified as being included in corresponding one or more segments of the depiction of the object). The image processing system may also or instead determine the boundaries of each of a number of segments of the object as depicted in a target image being processed with respect to the damage areas of the object by overlaying the segmentation map or segmented target image for a particular selected tagged target image with the selected heat map for the selected tagged target image being processed or with the damage-typed image for the selected tagged target image being processed. In other cases, such as when the selected tagged target image being processed is a corner view, the image processing system may perform a warping technique on the selected tagged target image and/or on its corresponding segmentation map and/or heat map and/or damage-typed image to flatten the image (e.g., to make a two-dimensional view of the object as depicted in the image to account for or compensate for three dimensional aspects of the object depicted in the image). This warping technique may adjust for the angle of the camera used when taking the target image to make the various different parts of the object depicted within the image warped to the same view or perspective and/or to make a three dimensional object image into a two dimensional image to keep all parts of the object at the same approximate scale (and to eliminate three-dimension perspective attributes of the image). In addition, the image processing system may warp each of the segmented target images using the same warping technique, if necessary, and may warp the heat maps or heat masks, or the damage-typed images for the tagged target images being processed in the same manner.

In one case, the image processing system may overlay a heat map of a tagged target image (depicting areas of damage within the image) with the segmented target image (which has each pixel thereof labeled with a segment of the object with which it is associated or in which it is included) and/or a damaged-typed tagged target image (which has each pixel corresponding to damage within the object depicted therein labeled with a damage type) to determine the pixels within the tagged target image that are damaged or that are likely damaged (or that make up a depiction of a damaged portion of the object within the tagged target image). The image processing system may use this overlapping or overlay to determine damage or change characteristics of the object within the image in a highly precise manner. In particular, the image processing system may compare the damage as depicted in a target image (based on the labelled pixels of the corresponding heat map or damage-typed image) to a corresponding segment outline or description of the object (as indicated by the corresponding segmented target image) to thereby precisely quantify the location and size of the damage or other change to the object with respect to the segment in which the depiction of the damage exists. In some cases, the image processing system may determine an area of each segment within a target image that depicts damage, the relative size of the damage depicted within the segment, such as a percentage of the segment in which damage is depicted, the size of the damage in terms of the length and width of the damage as compared to the length and width of the segment, the location of the damage as depicted within in the segment, etc.

Still further, in some cases, the image processing system may determine that the depiction of a particular area of damage to the object spans multiple ones of the selected tagged target images being processed (e.g., that a particular damaged area of the object is not depicted fully in a single tagged target image because different parts of particular damaged area are depicted in different ones of the tagged target images being processed). To determine the change characteristics in this case, the image processing system may stitch various ones of the processed images together (e.g., the selected tagged target images, or the segmented target images, or the damage-typed target images) and/or stitch various segments depicted within the processed images together to create a stitched image (e.g., a single composite or panoramic image) that illustrates the complete, particular damaged area. The change characteristics may then be determined based on a comparison of the stitched image and a base segmentation image or map depicting the entire particular damaged area of the object. In some cases, the images or segments thereof being processed may be stitched together such that images of a higher zoom level are stitched within or with images of a lower zoom level, which provide better resolution for determining the change characteristics in various different parts of the stitched image. In still other cases, the images or segments being processed may be stitched together to illustrate a damage site that is depicted across multiple segments, to enable the damage site to be characterized and quantified as a whole, even though the damage site is depicted across multiple segments.

In any event, after all of the images have been processed in some or all of the manners described above, the image processing system may determine a set of segments of the depiction of the object in which changes (e.g., damage) are depicted. For example, the image processing system may determine the segments (e.g., planar views, depictions of panels of an automobile) that depict complete or partial damage sites therein. (In some cases, the depiction of damage sites may span multiple segments.) The image processing system may also determine or quantify the size and/or location of each damage site with respect to the segment(s) over which the depiction of a particular damage site spans by determining or calculating the number of pixels included in the depiction of the damage site as compared to the number of pixels included in one or more of the segments over which the depiction of the damage site spans, or the number of pixels along the length and/or width and/or height of the depicted damage site as compared to the number of pixels along the length and/or width and/or height of one or more segments over which the damage site spans. Moreover, the image processing system may measure or determine an actual size of the damage site based on one or more comparisons of the damage site pixels to a corresponding base segment map in which the damage site exists, and the known size of the base segment within the base segment map. Still further, the image processing system may determine a location of a damage site with respect to one or more segments over which the depiction of the damage site spans (such as in a particular quadrant or on a grid associated with one or more segments, and/or with respect to one or more waypoints or features corresponding to one or more segments).

Moreover, after analyzing each of the selected target images by performing a segmentation, damage detection, characterization and/or sizing with respect to each of the segments depicted within each of the selected tagged target images, the image processing system may determine a complete list of damage (as some of the same damage sites may be depicted in multiple ones of the processed images) as well as a more precise description of the damage (or other change characteristics) including, for example, the damage location (e.g., the damage location depicted on each segment), the damage size (as compared to the segment size and/or a physical measurement of the segment or object) and/or a damage type for each of the damage sites. This list then quantifies, in a very precise manner, the location, size and/or type of damage depicted on each segment (e.g., each vehicle panel) which can then be used to quantify the complexity of the damage or the complexity of the estimate to be performed. Moreover, if desired, this damage information may be presented graphically to a user in any desired manner, such as by being provided to the user in a list, on one or more two-dimensional or three-dimensional annotated segment maps for a vehicle with the damage areas depicted in each segment indicated (e.g., using a color), with the type of damage at each site indicated (e.g., with a color or a label or other identifier) and/or with the size or other characteristic of the damage indicated (e.g. with text or a scale). This list or depiction of damage may be used to route the claim to more or less experienced adjustors or estimators so as to reduce the overall estimation costs by only using more experienced estimators (which are typically more expensive) on more complex claims and less experienced estimators on more simple claims. Still further, the output of the analysis may be used to perform additional steps associated with automatic or semi-automatic repair and cost estimation.

BRIEF DESCRIPTION OF THE DRAWINGS

FIG. 8B depicts a flow diagram of an example method for warping an image.

DETAILED DESCRIPTION

Figure 1:
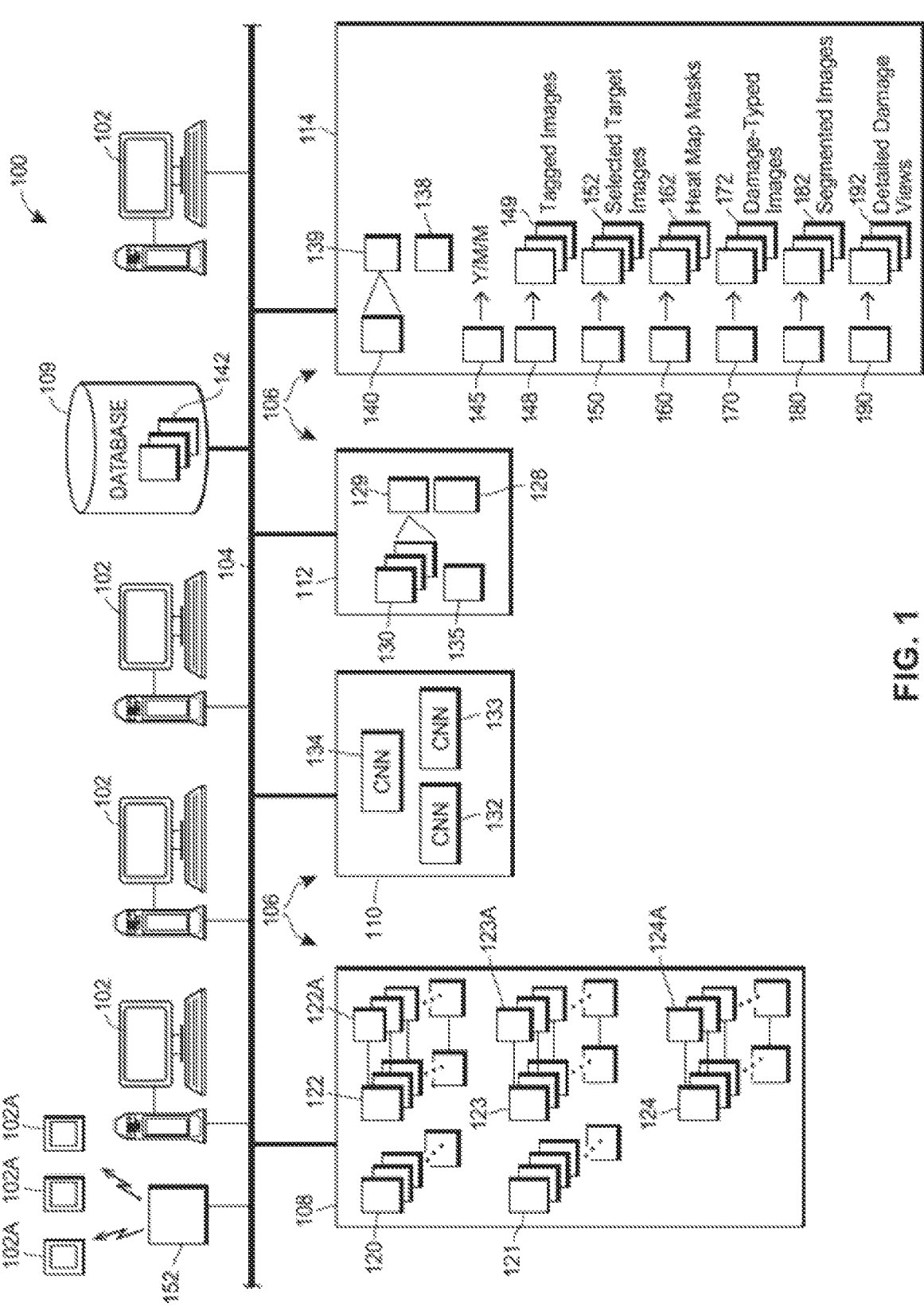
FIG. 1 depicts an exemplary image processing system that can be used to detect changes in objects, such as to detect damage to automobiles, buildings, and the like, and to quantify the changes, such as by determining one or more change characteristics of the object, including a type of change to the object and/or a precise location and/or a size of the change on the object.

FIG. 1 illustrates one example of an image processing system 100 which may be used to determine changes to a target object and to determine therefrom one or more change characteristics of the object including, for example, a type of change, a location of the change on the object, a size of the change on the object, or any other precise description of the change(s) to the object. In the examples provided herein, the image processing system 100 will be described as being used to detect change in the form of damage to an object and the object will be described as a vehicle and, in particular, an automobile. However, it should be noted that the image processing system 100 can be used to detect other types of changes (including for example upgrades, additions, repairs, degradation, etc.) to any type of object including, for example buildings, land, bridges, roads, forests, jewelry, etc. Moreover, the terms "vehicle" and "automobile" are used herein to include any type of vehicle, including powered and non-powered and motorized and non-motorized vehicles.

Generally speaking, the image processing system 100 operates on a number of target images of a "changed," e.g., damaged, object to determine differences between the object as depicted in the one or more of the target images of the object and one or more images or depictions of the pre-changed object, or between the depicted object and a base model of the object representing the object prior to the changes occurring to the object. Concurrent with or after changes to the target object have been determined, the image processing system 100 determines or quantifies the changes in one or more precise manners, such as by determining a type of each change to the object, a precise location of each change to the object, and/or a precise measurement and/or size of each change within or on the object. These change characteristics may then be used to determine secondary characteristics or features associated with the target object, such as how to process the target object in a more efficient manner, costs associated with repairing or replacing the target object or parts thereof, the time it may take to repair the target object, the progress the target object has undergone in changing states, etc.

As illustrated in FIG. 1, the image processing system 100 may include various user interface devices 102, which may be general purpose computers 102, handheld devices 102A, workstations, etc., connected through one or more communication networks 104 to one or more further computing devices 106, which may operate as servers and/or databases in a traditional client-server or cloud-based network. For example, the further computing devices or servers 106 may include one or more databases 108, 109 and 110, and one or more servers 112 and 114 having computer processing and storage capabilities.

In this case, the database 108 may store various processing components or image files that are used to train and implement one or more statistical models to perform various image processing steps described herein. In particular, the database 108 may store one or more base object models 120 (which may be, for example, two-dimensional and/or three-dimensional object models) defining or depicting one or more base objects upon which change detection image processing may be performed. In one example, the base object models may be two- or three-dimensional renditions, maps, depictions or other digital representations of various different automobiles (e.g., of automobiles of different years, makes, models and/or trim-types) in their original or pristine condition (i.e., prior to any damage thereto). Additionally, the database 108 may store base segment or base segmentation models or files 121 that depict, describe or define various segments or components of the one or more base objects within the base object models 120. In one example, in which the image processing system 100 may be used to detect changes to automobiles, such as to detect damage caused to an automobile in an accident, the base object models 120 may be two-dimensional or three-dimensional models of various automobiles based upon which changes may be detected. Generally in this case, a different base object model 120 will be stored for each year/make/model or year/make/model/trim-type of automobile that is to be analyzed for damage. Moreover, a different base segment model or file 121 can be stored for each year/make/model or year/make/model/trim-type of automobile that is to be analyzed for damage. In this case, the base segment model 121 may identify various segments or components of the base object, such as body panels of an undamaged automobile (e.g., a hood, doors, trunk, grille, etc.), respective measurements thereof, respective locations thereof on the automobile, etc. Of course, the base segment models 121 may be part of the base object models 120. Base object models 120 and segment object models 121 may include or otherwise indicate physical measurements and/or dimensions of respective vehicles, such as overall dimensions, respective dimensions of each segment (e.g., length, width, height, length of principal axis, length of shortest axis, etc.), and the like.

Moreover, the database 108 may store training images that can be used to train one or more statistical models as described in more detail herein, including for example damage detection training image files 122, damage-typed training image files 123 and segmented training image files 124. The damage detection training image files 122 may be files that include images of changed (e.g. damaged) base objects illustrating various manners in which changes (damages) to the base objects within the base object model 120 may occur or have occurred in the past. In some cases, images of non-changed (non-damaged) base objects may be included in the training image files 122 but this is not typically necessary. In some cases, these damage detection training image files 122 can be images of different automobiles (of various different Y/M/Ms) that have been involved in different accidents and may also include images of non-damaged automobiles of different Y/M/Ms. Likewise, each of the damage detection training image files 122 may include an information file 122A associated therewith that provides information about the object within the associated damage detection training image 122, including, for example, the Y/M/M of the vehicle depicted in the image 122, an indication as to whether or not damage is depicted or illustrated in the image 122, the view or perspective of the object within the image 122 (e.g., a side view, a right front corner view, etc.), the approximate or gross zoom level of the image 122 (e.g., no zoom, moderate zoom, large zoom), etc. Preferably, the training images 122 are annotated on a pixel by pixel basis so that each pixel of the image 122 is annotated in the file 122A with an indication of whether the pixel does nor does depict damage to the vehicle. Likewise, the damage-typed training image files 123 depict various ones of the base objects within the base object model (e.g., automobiles of the same or different Y/M/Ms) with various different types of damage thereon, such as scratches, dents, misalignments, tears, holes, etc. In this case, each of the damage-typed training image files 123 includes an information file 123A associated therewith that provides information about the type of damage to the object within the associated training image 123, including, for example, the Y/M/M of the vehicle depicted in the image 123, an indication as to whether or not damage is depicted or illustrated in the image 123, the view or perspective of the image 123 (e.g., a side view, a right front corner view, etc.), the approximate zoom level of the image and, importantly, information as to the type or types of damage depicted in the image 123, including the precise location of that damage (e.g., the pixels of the image 123 which illustrate the damage of the particular damage type). Preferably, the training images 123 are annotated on a pixel by pixel basis so that each pixel of the image 123 is annotated in the file 123A with each type of damage (which may be one type or multiple types) depicted by the pixel. Still further, the segmented training image files 124 may be files that include images of unchanged (non-damaged) and changed (e.g. damaged) base objects illustrating the boundaries or outlines of various segments of a base object. In some cases, these segmented training image files 124 can be images of different automobiles (of various different Y/M/Ms) that have been involved in different accidents and may also include images of non-damaged automobiles of different Y/M/Ms. Likewise, each of the segmented training image file 124 may include an information file 124A associated therewith that provides information about the object within the associated segmented training image 124, including, for example, the Y/M/M of the vehicle depicted in the image 124, an indication as to whether or not damage is depicted or illustrated in the image 124, the view or perspective of the object within the image 124 (e.g., a side view, a right front corner view, etc.), the approximate zoom level of the image 124 and, importantly, an indication of the one or more segments of the base object that are illustrated in the image 124 (such as an outline or description or definition of the boundaries of each of the segments of the base object depicted in the image 124). Preferably, the training images 124 are annotated on a pixel by pixel basis so that each pixel of the image 124 is annotated in the file 124A with the segment of the object to which the pixel belongs. If desired, in some cases, the same images may be used for one or more of the training files 122, 123 and 124 as long as the proper damage areas, damage types and/or segments are identified for the images.

In a more particular example, each of the damage detection training image files 122, damage-typed training image files 123 and segmented training image files 124 may include one or more images of a damaged vehicle (conforming to one of the make/model/year types, for example, of the base object models 120 stored in the database 108). Generally, each such damage detection training image file 122, damage-typed training image file 123, and segmented training image file 124 may include one or more digital photos taken of a particular automobile that has been damaged in, for example, an accident. Such photos may be collected by, for example, owners of the automobiles depicted in the photos, an automobile insurer against whom an insurance claim was made for repairing or replacing the damaged automobile, etc. Still further, each of the information files 122A, 123A and 124A may store other information pertaining to the damaged automobiles in the training image files 122, 123, 124 besides the damage location and type and segment location and type information described above, such as the year/make/model and trim-type of the damaged automobile, the country, state, city, zip code, and/or other geographical region in which the automobile was insured or damaged, the mileage of the damaged automobile, the color of the damaged automobile, the type of or location of the damage to the automobile, telematics data obtained from or about the damaged automobile associated with the accident, the parts which needed to be repaired or replaced as a result of the damage, the cost of repair or replacement of each such part, the type of damage to each such part, whether the automobile was considered a total loss as a result of the damage, the cost of repair of the automobile if the automobile was repaired, the insurer of the automobile, if any re-inspection was performed on the automobile during repair, capitation of the automobile, etc. Of course, other information could be stored for any or all of the training image files 122, 123, 124, and the type of information stored for each of the training image files 122, 123, 124 may vary depending on use, the type of object upon which change detection is to be performed, etc. Still further, while the training image files 122, 123 and 124 are described as separate files or images, the information depicted therein may be combined into a single file, or may all be based on the same set of original images, if so desired. As will be described in more detail herein, the base object models 120, the segment models or files 121, the damage detection training image files 122, the damage-typed training image files 123, the segmented training image files 124 and the information files 122A, 123A and 124A may be used by the image processing system 100, for example, to perform primary and secondary processing on photographs or images of a newly damaged automobile (referred to herein as a "target object" or a "target vehicle" or a "target automobile") to determine the type of and/or the extent of damage (change) and/or the precise location of the damage (change) to the damaged automobile.

The server 112, which may include one or more microprocessors 128 and one or more computer readable memories 129, may store one or more image processing or model training routines 130. The training routines 130 may be implemented on the microprocessor 128 using the training images and some or all of the data within the files 122, 122A, 123, 123A, 124 and 124A to generate various other information or processing components used in further image processing routines that analyze images of target objects (which correspond to one of the base object models 120) on which changes have occurred but for which changes have not been quantified and to quantify those changes in a more precise manner, such as by determining the type of change to the target object, the location of the change on the target object, and/or the measurement and/or size of the change on the target object.

In one example, one or more of the training routines 130 may implement a model training routine using the training images 122, 123 and 124 and the associated information files 122A, 123A and 124A to determine a different set of convolutional neural networks (CNNs) for use in detecting damaged areas of an object depicted in a set of target images, in detecting the type of damage depicted in a set of target images, and/or in detecting object segment boundaries depicted in a set of target images. In particular, one of the routines 130 may be used to train a statistical model or a classification model that generally detects damage to a target object to produce a "heat map" of the target object illustrating or indicating where damage exists within a target image based on the indication and description of damage depicted in the set of damage training images 122 and associated information files 122A. Here, the model training routine 130 may determine a first convolutional neural network (CNN) 132 that is to be used by a model-based or classification-based image processing routine to identify damage locations within a new set of target images. The CNN 132 (which includes CNN coefficients to be used in a CNN-based classification model) are illustrated in FIG. 1 as being stored in the database 110, but these components could be stored in other memories associated with the image processing system 100 if desired. Additionally, one of the routines 130 may be used to train a statistical model that generally detects damage types in a target object to produce an indication of the type of damage illustrated or present in a target image, based on the indication and description of damage types depicted in the set of damage-typed training images 123 and associated information files 123A. Here, the model training routine 130 may determine a second convolutional neural network (CNN) 133 that may be used by a model-based or classification-based image processing routine to identify damage types (e.g., at various segments, areas, or locations of the target object) of detected damage within a new set of target images. The CNN 133 is illustrated in FIG. 1 as being stored in the database 110, but this component (which includes a set of CNN based coefficients to be used in a CNN-based classification model) could be stored in other memories associated with the image processing system 100 if desired. Still further, one of the routines 130 may be used to train a statistical model that generally detects segments and segment boundaries in a target image to produce an indication of the name (or type) of the segment and the boundaries of the segment illustrated or present in a target image, based on the indication and description of segments and segment boundaries depicted in the set of segmented training images 124 and associated information files 124A. Here, the model training routine 130 may determine a third convolutional neural network (CNN) 134 that is used by a model-based or classification-based image processing routine to identify segments and segment boundaries within a new set of target images. The CNN 134 is illustrated in FIG. 1 as being stored in the database 110, but this component could be stored in other memories associated with the image processing system 100 if desired.

Thus, generally speaking, and as will be described in further detail herein, the image training routines 130 use the damage training images 122 and information files 122A, the damaged-typed training images 123 and information files 123A and the segmented training images 124 and information files 124A to produce and/or select the CNNs 132, 133 and 134, in one example, that will be used by the image processing system 100 to detect changes to target objects (such as to detect damage to automobiles or other vehicles) and/or to detect the types of changes or damage to automobiles or other objects, and/or to detect segments and/or segment boundaries of damaged automobiles or other objects within images of these target objects. As described in more detail herein, a training tool 135, which may be stored in, for example, the server 112, may operate on a processor (such as the one or more processors 128) to assist a user in annotating the image files 122, 123 and 124 to provide some or all of the information within information files 122A 123A and 124A.

Moreover, as illustrated in FIG. 1, the server 114, may include one or more microprocessors 138 and one or more memories 139 that store a general image processing routine 140 that may perform image processing and image manipulation on a set of target images 142, which images depict a target object represented by one of the base object models 120, but upon which change has occurred, to thereby detect changes to the target object, such as to detect or quantify damage to the target object and one or more of a damage type, a damage location and a damage size or other damage descriptors. In this case, the target images 142, which may be stored in the database 109 for example, represent the target object as changed or altered with respect to the same object as represented by one of the base object models 120. Generally speaking, the image processing routine 140 may use the CNNs 132, 133 and 134 (as stored in the database or memory 110) as well as the set of target images 142 for the target object to detect and quantify changes that have occurred to the target object, where the changes are represented or depicted within the set of target images 142 of the target object. While the image processing routine 140 is particularly described herein using statistical model that applies CNNs to images to determine occurrences of damage or heat map, to determine damage types and/or to determine segments and segment boundaries, any other type of statistical model or AI technique may be used to perform these functions instead or as well.

During operation, a user may log onto or access the system 100 via one of the user interfaces 102 or 102A, may upload or store a new set of target images 142 of a target object in the database 109, and may additionally provide or store information in the database 109 related to the new set of images 142, such as an identification of the target object within the new set of images 142 (e.g., the year/make/model and potentially trim type of a damaged automobile depicted in the images), information about the target object (such as vehicle mileage, location or geographical region of the automobile, etc.), as well as any other desired information about the images 142 or the target object within the images 142, such as telematics data collected by the automobile depicted in the photographs, first notice of loss information as collected by the insurance carrier of the automobile depicted in the photographs, an indication of the angle or perspective at which the object is depicted in the photograph, the approximate zoom of the image, etc. However, in one case, the user may simply upload the set of target images 142 and the image processing system 100 may determine some or all of the needed image information in the manners described herein. Still further, in another embodiment, the system 100 may receive a set target images 142 from a mobile device or another system (such as a First Notice of Loss (FNOL) system) and may process the images 142 on the fly or based on the receipt of these images.

Of course, the new set of target images 142, potentially along with information related to the new set of target images 142, if provided, may be stored in the database 109 and/or provided to the database 109 in other manners, such as via a direct or indirect connection to a camera, via another device in the communication network(s) 104, e.g., via a handheld device 102A connected to the network(s) 104 via a wireless interface 152, etc. Moreover, if desired, a user may use one of the user interfaces 102, 102A to additionally or alternatively select a subset of the target images 142 that have been previously collected or taken of the target object, such as different views of the target object from different angles, and may provide these images to the database 109 or may mark these images in the database 109 for use as and/or inclusion in the new set of target images 142 to be processed by the image processing routine 140.

The user may then initiate the image processing routine 140 to operate on the new set of target images 142 to detect changes within the target object depicted in the new set of target images 142 as compared to the base object model 120 for that same object. Generally speaking, once initiated, the image processing routine 140 may use a first routine, referred to herein as an identifier routine or a Y/M/M routine 145 that may identify, from one or more of the set of target images 142, an identification of the object depicted in the set of target images 142, such as the Y/M/M and/or trim type of an automobile or other vehicle depicted in the target images 142. The routine 145 may store the identification information, such as the Y/M/M of the automobile within or as part of the target images 142, e.g., in the memories 109

Thereafter, the image processing routine 140 may implement another routine, referred to herein as a tagger routine 148, to determine image information about each of the target images 142, such as the view or perspective of each target image 142 (e.g., a side view, a front view, a corner view), and the zoom level of each of the target images 142 (e.g., no zoom, moderate zoom, high zoom), etc. The tagger routine 148 may store view and zoom information obtained for or determined for each of the target images 142 as part of a tag for each of the target images 142 and may store a set of tagged target images 149 that include the target images 142 along with the view, zoom and/or object identification information (e.g., Y/M/M) of the object depicted in the corresponding tagged target image, e.g., in the memories 139. In some implementations, the tagger routine 148 may store the tags separately from the target images 142, and each tag may reference its corresponding target image 142. In various implementations, however, the identification information (Y/M/M) does not need to be part of the tag for the target images 142.

The routine 140 may also include a culling routine 150 that may process the tagged target images 149, as tagged by the tagging routine 148, to select a representative set of tagged target images 149 that best depict the various views of the target object needed for later processing by the routine 140. The culling routine 150 may store the culled or reduced set of target images as a selected set of tagged target images 152. Generally speaking, the culling routine 150 may process each of the tagged target images 149 to detect the quality of the images therein, to detect if any portion of the object (e.g., automobile) depicted therein is occluded in the image, to determine if there is glare or other photographic detrimental effects within the image, to determine if the image is at an appropriate zoom level (not too zoomed in or too far away), to assure that the image depicts a view of the object or automobile that is usable (e.g., that it is an exterior view of the automobile), etc. The culling routine 150 may also or instead select various ones of the tagged target images 149 to illustrate different desired or needed views of the object, so that each exterior side or portion of the object is depicted in at least one of the selected tagged target images 152. In any event, the culling routine 150 may produce a reduced set or selected set of tagged target images 152 to be used in the further processing steps in any other manner.

Additionally, the image processing routine 140 may include a heat mapper or heat mapping routine 160 that may process each of the culled or selected set of tagged target images 152 to produce, for each such target image, a heat map mask (or heat map image) 162 illustrating the areas of the object in the associated target image that are damaged or that are likely to be damaged. Thus, in one example, the heat mapper routine 160 will produce for each of the selected set of tagged target images 152, a heat mask image 162 or map indicating which pixels of the image 152 are indicative of damage and/or indicative of likely damage and/or a probability that damage has occurred at a respective location of the object (e.g., automobile) represented by that pixel. Generally speaking, the heat mapper routine 160 will implement a statistical model that uses the CNN 132 to detect areas (e.g., pixels) of the target object depicted in the selected set of tagged target images 152 that are damaged, and/or a probability of damage at that area (pixel). The heat mapping routine 160 may thus store a set of heat map masks or images 162 that indicate, on a pixel by pixel basis, where damage exists in the image or object and/or the probability of damage at a respective object location denoted by each pixel.

Still further, the image processing system 140 may include a damage type detector routine 170 that may process each of the selected set of tagged target images 152 and, in one example case, the areas of each of the selected set of tagged target images 152 that are indicated by the heat map mask 162 for that image to include damage of some sort, using the CNN 133 in a CNN classification model to determine a type of damage at each of the damage locations or at each of the pixels within the tagged target image being processed. More particularly, the damage type detector 170 may implement a CNN-based classification model or routine that produces, for each of the selected set of tagged target images 152, an image 172 that is labelled, on a pixel by pixel basis, with the type or types of damage (if any) present at a respective location of the object (e.g., automobile) represented by each pixel. Thus, all pixels of a scratch depicted in one of the images 152 would be labelled with a damage type of "scratch," while all pixels of a dent depicted in one of the images 152 would be labelled with a damage type of "dent," and pixels of the object at which no damage is located (as determined by the heat map 162 for that image) would be labeled as "no damage" or something similar. Of course, in some cases, various pixels of the images 172 may be labelled as being associated with or depicting multiple types of damage and, if desired, the damage type detector routine 170 may label the damage type with a detected probability of or likelihood or confidence factor of that damage type (e.g., 60 percent likely that this pixel is associated with a scratch and 22 percent likely that this pixel is associated with a dent).

Moreover, the image processing routine 140 may include a segmentation routine 180 that performs segmentation on each of the selected set of tagged target images 152 or, if desired and available, on each of the damage-typed target images 172. In particular, the segmentation routine 180 may determine one or more components or segments of the object depicted in each of the images 152 or 172 that this routine processes in order to define the limits or boundaries of each of a set of known object segments as depicted in the images 152 or 172 being processed. In the situation in which the object is a vehicle or an automobile, the segments may define predetermined or pre-established body panels of the vehicle (e.g., a hood, a passenger side front door, a rear bumper, a front grill, a wheel, a right front quarter panel, etc.). In this case, the routine 180 may process the image (including the information about the view and zoom of the image) by implementing a CNN-based classification model or routine using the CNN 134 that produces, for each of the selected set of tagged target images 152 or each damage-typed target image 172, a segmentation image or mask 182 that is labelled, on a pixel by pixel basis, with the vehicle segment to which the pixel belongs and, if desired, a probability or confidence factor that the pixel belongs to that segment. The segmentation routine 180 thus determines the segments that are depicted, either partially or fully, within the target images 152, 172 and the boundaries of these segments. In this manner, the segmentation routine 180 creates a set of segment images or segment masks 182 that (1) identify one or more segments of the base object as depicted in the target image, and (2) identify the boundaries of the one or more identified segments as depicted within the target image. These segment masks 182 are from the same perspective as the camera angle of the target image and are sized to the size of the target object depicted target image so that, advantageously, overlaying the segment mask 182 onto the selected tagged target image 152, 172 will define the segment boundaries for a number of segments of the object within the selected tagged target image 152, 172.

The image processing routine also includes a damage detailer routine 190 that processes the selected set of tagged target images 152 or the selected set of tagged and damage-typed target images 172 with the heat masks 162 and/or the segmentation masks 182 to determine particular change or damage characteristics associated with the object and, in particular, associated with each segment of the object. In this case, the damage detailer routine 190 may overlay one or more of the selected tagged target images 152, or selected damage-typed tagged target images 172 with the heat map mask 162 for that image and the segmentation mask 182 for that image to determine how the damaged areas or pixels denoting damage depicted within the image (identified by the heat map mask 162, for example) align with one or more of the segments (identified by the segment map 182) within the image. The damage detailer routine 190 may produce a set of detailed files or images 192 that indicate more precise information about the damage to each of the segment and, in particular, may identify each of the target object segments in an image that are damaged, the precise size of the damage as compared to the base segment (e.g., the percent of the base segment that is damaged, the location of the damage with respect to the base segment, the size of the damage such as the height, length and/or width of the damage as compared to the base segment height, length and/or width and/or by using physical measurements determined from the image processing, etc.), the type of damage if available from a damage-typed image 172, etc. The damage detailer may include a number of routines such as a warping routine 195 and a stitching routine 197 that enable the damage detailer routine 190 to align various segments of the target object or automobile in this case with the damaged locations on the target object in a very precise manner. In particular, the warping routine 195 may be used to warp a three-dimensional image into a two-dimensional image to make each part of the image have the same perspective or size and thus to reduce or eliminate three-dimensional effects within an image. This warping routine 195 is particularly useful when processing corner images of an automobile (that illustrate part of the front or back and part of one of the sides of the automobile and thus have severe three-dimensional perspective effects). This warping routine 195 may be applied in the same manner to each of the associated corner images within the selected set of tagged target images 152 or the selected set of damage-typed tagged target images 172, and to the heat map mask 162 and the segmentation map or image 182 of each such selected tagged target image in order to produce highly accurate damage information. Still further, the stitching routine 197 may be used to stitch various one of the images 152 or 172 together so as to illustrate, in one image, a complete segment and/or an entirety of a damaged area. This stitching routine 197 may be advantageously used when none of the selected tagged target images 152 illustrates a particular segment in its entirety or when it is desirable to provide higher zoom level detail of a particular segment available within one image 152 within a second image 152 of the same segment to provide higher damage resolution within parts of the stitched image, or when it is desirable to view or analyze a complete damage site that spans multiple segments.

While it will be understood that the image processing system 100 of FIG. 1 is illustrated as a hardwired system having various servers and databases 106 connected to various user interfaces 102 via a hardwired communication network 104, other processing and communication configurations could be used as well or instead. For example, the network 104 could be a wireless communication network, or could be a combined wired and wireless communication network, and the network 104 may include any type of communication network, including a public local area network (LAN) or wide area network (WAN), a private LAN or WAN, a set of direct communication connections, etc. Moreover, the network 104 may include or use the Internet or the World Wide Web, to enable users at the user interfaces 102 and 102A to communicate with the servers and databases 106 via an Internet connection to upload photos or images of a target object for which change is to be detected to the database 109, to initiate the image processing routines 130, 135 or 140, to view the results of the routine 140, etc. Still further, while the servers and databases 106 are illustrated in FIG. 1 as including five different devices that have different information stored therein, any number of servers, databases, and/or other computing devices could be used and, in fact, the elements illustrated in the servers and databases 106 of FIG. 1 could be stored within or distributed among more or less than five devices. For example, these components could be all stored in the same computer processing device, which could be the same computer processing device as one of the user interfaces 102 or 102A. In another example, at least some (or all) of these components could be implemented using a computing cloud architecture. Thus, the architecture of the image processing system 100 of FIG. 1 could be changed to include more or less computer devices connected in various different manners and still function as described herein.

Figure 2:
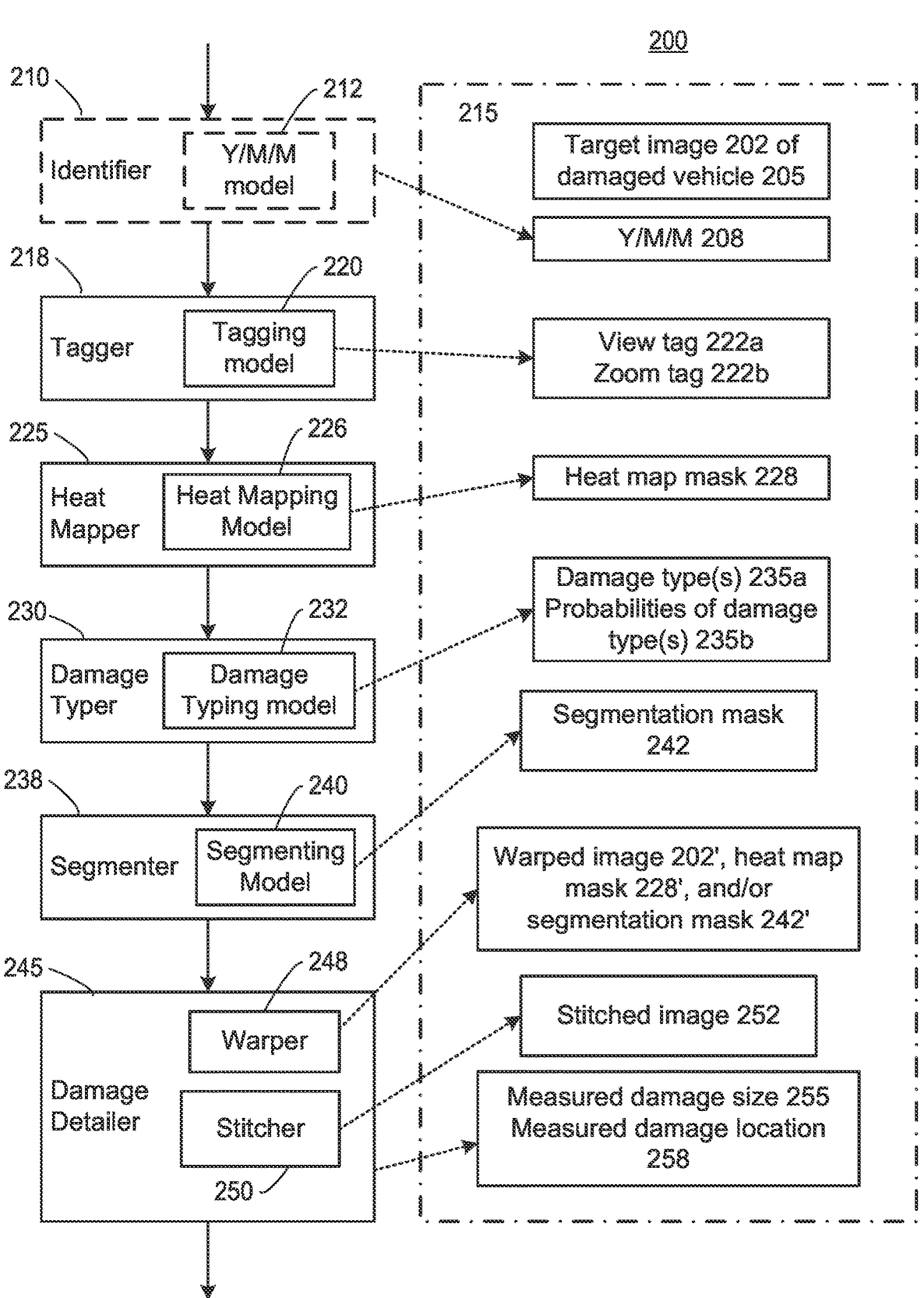
FIG. 2 depicts a block diagram of an exemplary image processing system and techniques that may be used to detect change characteristics of an object, such as types, locations, and sizes of damage on the object.

FIG. 2 is a block diagram of an exemplary image processing system 200 (which may be the image processing routine 140 and/or the image processing system 100 of FIG. 1) which processes images to detect, quantify, and characterize damages to an object, such as a vehicle. Generally speaking, the system 200 image processes an image of a damaged object to automatically detect, quantify, and characterize damages to the object depicted in the image without any or with very minimal human input, intervention, or guidance. The techniques of the system 200 may be easily applied to images of any type of object, such as images of a building, a bridge, a movable structure, a road, a forest, jewelry, land, etc. However, for ease of discussion and not for limitation purposes, the present disclosure discusses applying the techniques disclosed herein to images of a vehicle, such as an automobile, car, bus, truck, aircraft, heavy machinery, etc.

Generally speaking, the example system 200 processes an input or target image 202 of a damaged vehicle 205 by using a set of image processing modules 210, 218, 225, 230, 238, 245, each of which image processes the input image 202 to detect and/or determine different aspects of and/or information 215 associated with the damaged vehicle 205 depicted within the image 202. For example, when the system 100 includes an instance of the system 200, the image processing modules 210, 218, 225, 230, 238, 245 may be included in or initiated by the image processing routine 140, and the information 215 may be stored in the memories 139. As is described elsewhere within this disclosure, some of the modules of the set 210, 218, 225, 230, 238, 245 image process the input image 202 in conjunction with and/or by utilizing aspects and/or information 215 determined by one or more of the other modules within the set, and some modules of the set may image process the input image 202 without utilizing any other additional information other than the input image 202 itself. Further, although FIG. 2 visually depicts the modules 210, 218, 225, 230, 238, 245 operating in a relatively sequential order, this is only for ease of illustration and not limitation purposes. For example, in some implementations, two or more of the modules 210, 218, 225, 230, 238, 245 may concurrently image process the input image 202 or instances thereof, e.g., two or more of the image processing modules 210, 218, 225, 230, 238, 245 may image process different instances of the input image 202 in parallel. In some implementations, one or more of the modules 210, 218, 225, 230, 238, 245 may not be applied to the input image 202 at all, and/or an additional, different image processing module (not shown) may be applied to the image 202 to discover respective information therefrom. Still further, for ease of understanding, FIG. 2 is discussed with simultaneous reference to FIGS. 3A-3G, each of which visually depicts one or more example input images depicting a damaged vehicle and/or depicts various information corresponding to the images and/or to the damaged vehicle which has been detected, determined, and/or output by one or more of the image processing modules 210, 218, 225, 230, 238, 245.

In FIG. 2, the system 200 obtains the electronic image 202 of the damaged vehicle 205 (which may be any of the target images 142 of FIG. 1, for example, or which may be received via a network interface from another computing device or computing system). The electronic image 202 typically is a digital image, and may be a two-dimensional or a three-dimensional image; however, for ease of illustration and not limitation purposes, the present disclosure refers to the image 202 as a two-dimensional, digital image. In some scenarios, the system 200 obtains an indication of the year, make, and model 208 (which is interchangeably referred to herein as the "Y/M/M" 208) of the vehicle 205. The system 200 may obtain the Y/M/M 208 of the depicted damaged vehicle 205 via any suitable technique, such as via user input, by reading a file, by image processing the input image 202, etc. For example, the system 200 may include an optional Identifier module 210 which image processes the target image 202 to determine the Y/M/M 208 of the vehicle 205 depicted within the target image 202. The Identifier module 210 may include a Y/M/M model 212 which has been specially trained (e.g., by training routine 130) on images of both damaged and undamaged vehicles to detect or determine the particular year, make, model, and optionally trim type of a vehicle depicted in the subject image. For instance, the Y/M/M model 212 may include one or more analytical or AI models which have been trained, by using any one or more suitable machine learning technique(s), on images of damaged and undamaged vehicles that have been labeled with the respective Y/M/M and optionally trim type of the vehicle depicted within each image. In one example implementation, the Y/M/M of the vehicle depicted within the image may be determined using one or more of the image processing techniques described in any of co-owned U.S. patent application Ser. Nos. 16/874,154, 16/874,167, or 16/874,175, the disclosure of each of which is hereby expressly incorporated by reference herein. In any event, the vehicle 205 and the vehicle's Y/M/M 208 may be stored 215 or otherwise made available for use by the image processing modules 218, 225, 230, 238, 245 of the system 200. This information may be stored, for example, as part of the information file 124A of FIG. 1.

Figure 3A:
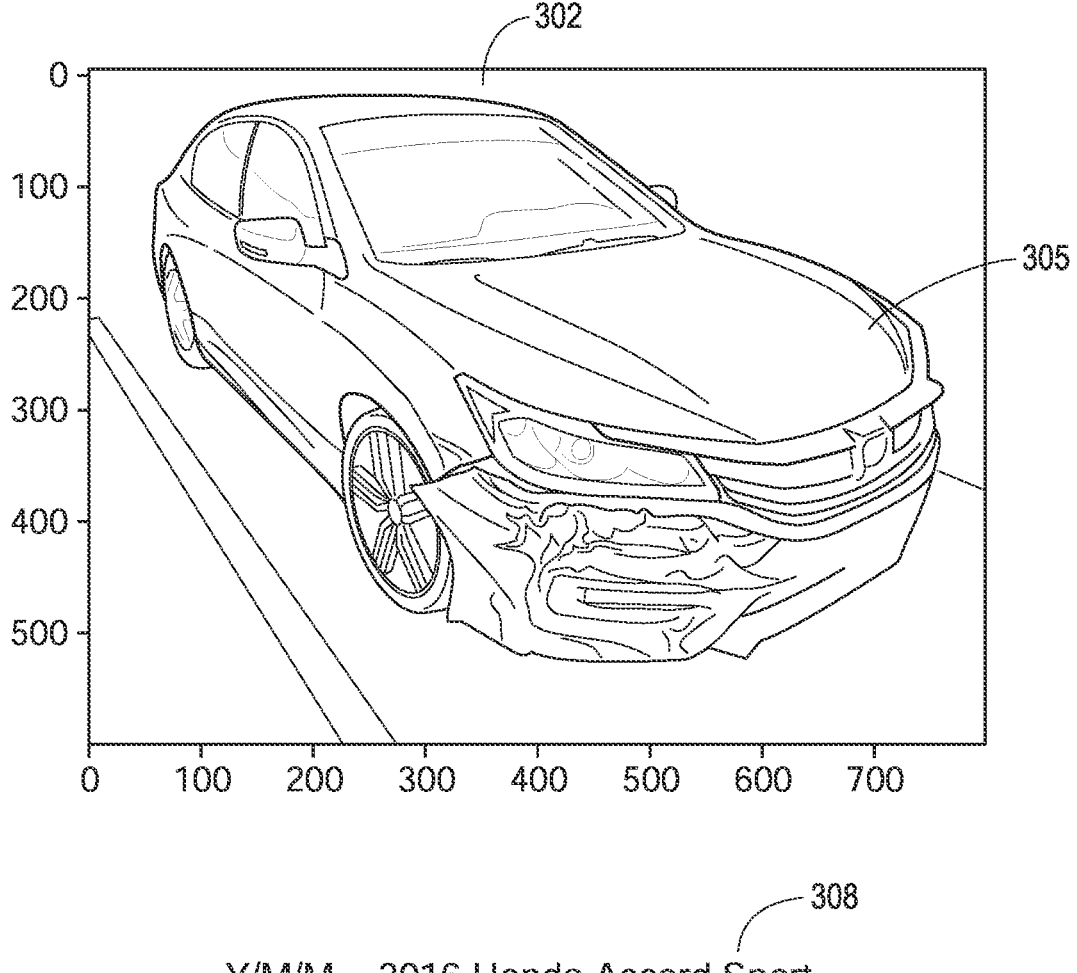
FIGS. 3A-3G depict various images of an automobile associated with different image processing steps performed to detect one or more change characteristics on an object depicted in the images.

To illustrate using an example, FIG. 3A depicts an example two-dimensional image 302 of a damaged vehicle 305 which may be input into and image processed by the system 200, as well as depicts an indication of the vehicle's Y/M/M 308. In FIG. 3A, the Y/M/M 308 of the vehicle 305 has been previously determined by another AI model or system (not shown) which has been specially trained to detect or determine the Y/M/M of vehicles depicted in images. For example, one or more models and/or techniques described in co-owned U.S. patent application Ser. Nos. 16/874,154, 16/874,167, or 16/874,175 may have been applied to the image 302 to determine its Y/M/M 308. In embodiments, the image processing system 200 includes the AI model or system 210 which determines a depicted vehicle's Y/M/M, if desired.

In some embodiments, the system 200 includes a Tagger module 218 which image processes the input image 202. The Tagger module 218 includes a tagging model 220 which has been specially trained (e.g., by training routine 130) on images of both damaged and undamaged objects, such as vehicles, to detect or determine the particular view of an object or vehicle depicted in a subject image, and optionally to detect or determine a degree or amount of zoom with respect to the depicted object or vehicle. For example, the tagging model 220 may include one or more analytical or AI models which have been trained, by using any one or more suitable machine learning technique(s), on images of damaged and undamaged vehicles that have been labeled with the respective view of the vehicle depicted within each image (e.g., side or planar views such as Left Side View, Right Side View, Front View, and Back View; perspective or corner views such as Left Front Corner View, Right Front Corner View, Left Rear Corner View, and Right Rear Corner View; interior views such as Dashboard View, and Back Seat View; and/or other suitable type(s) of views of the depicted vehicle). In some implementations, the tagging model 220 includes one or more of the models described in U.S. Pat. No. 10,319,035 (the disclosure of which is hereby expressly incorporated by reference herein), and the Tagger module 218 utilizes one or more techniques described in U.S. Pat. No. 10,319,035 to determine or detect the particular view of the damaged vehicle 205 depicted within the image 202. In other implementations, the Tagger module 218 may additionally or alternatively utilize other suitable techniques, if desired. Additionally, in some scenarios, the tagging model 220 may operate on both the input image 202 and the Y/M/M 208 of the depicted vehicle 205 as inputs. Further, in some embodiments, the tagging model 220 (or another model included in the Tagger module 218, not shown) may include one or more analytical or AI models which have been trained, by using any one or more suitable machine learning technique(s), on training images of damaged and undamaged vehicles which have been labeled with respective degrees, levels, or amounts of zoom (e.g., Negligible Zoom, Average Zoon, High Zoom, and/or other suitable level(s) of zoom). The Tagger module 218 applies the tagging model 220 (and applies the separate zooming model, if so implemented in the Tagger module 218) to the input image 202 to thereby determine or detect the particular view 222a of the vehicle 205 depicted in the image 202, and optionally to determine or detect the degree, level, or amount of zoom 222b of the image 202 with respect to the vehicle 205 depicted in the image 202. The Tagger module 218 tags or labels the input image 202 with an indication of the detected view 222a and an indication of the detected level of zoom 222b, and the tags 222a, 222b corresponding to the image 202 are stored or otherwise made available 215 for use by other modules 210, 225, 230, 238, 245 of the system 200.

Figure 3B:
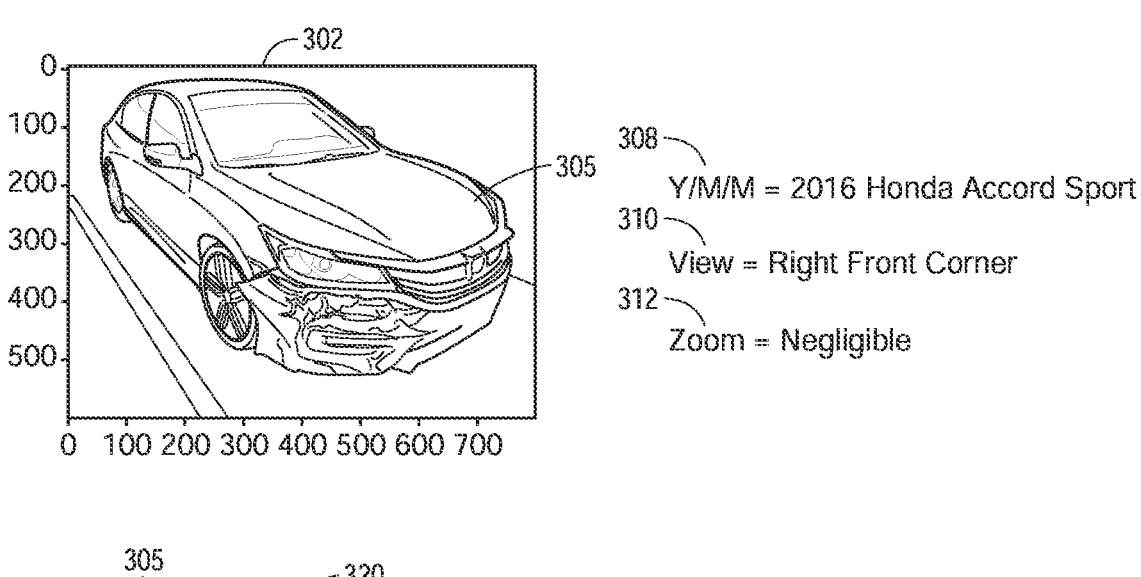
Figure 3B:
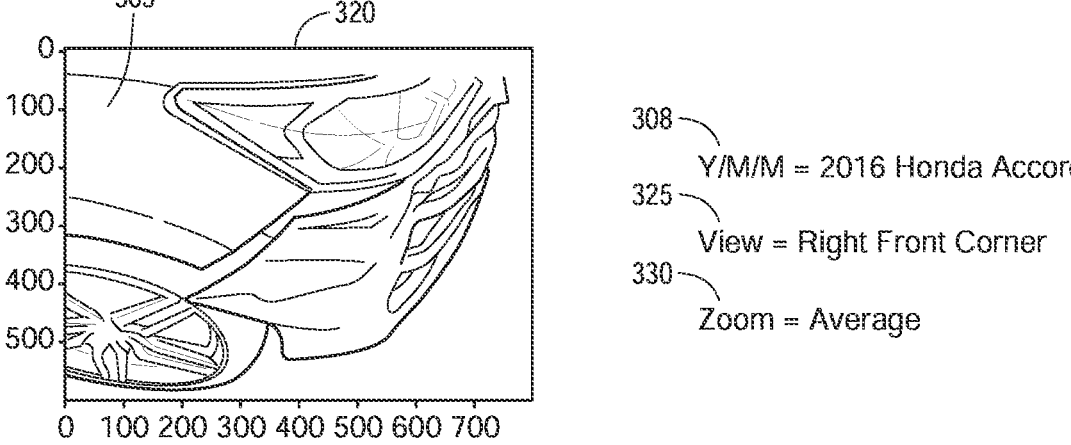
Figure 3B:
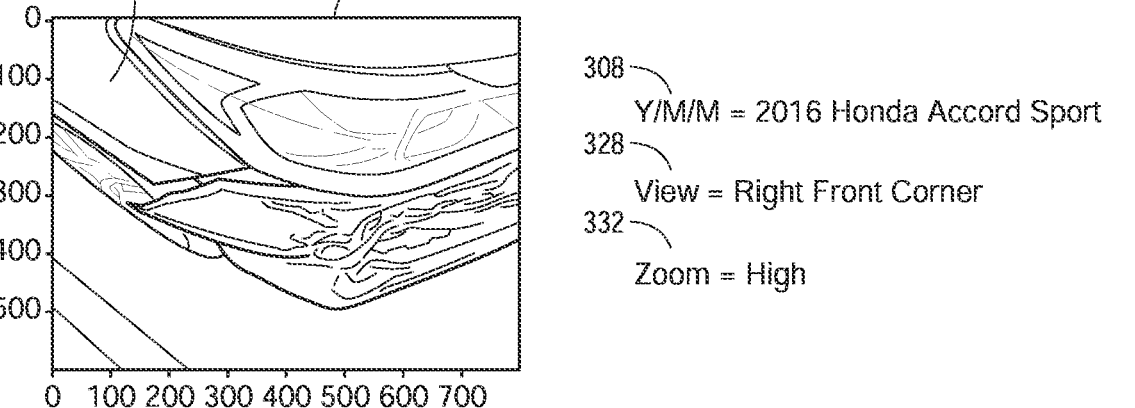

To illustrate, FIG. 3B depicts the example image 302 of the damaged vehicle 305 of FIG. 3A, where the image 302 has been image processed by the Tagger module 218 and consequently tagged as being a Right Front Corner perspective view 310 and as having Negligible Zoom 312. As also shown in FIG. 3B, each of two other example images 320, 322 of the damaged vehicle 305 have also been tagged by the Tagger module 218 as being, respectively, a Right Front Corner perspective view 325, 328 of the damaged vehicle 305. The Tagger module 218 has tagged the image 320 as being an "Average Zoom" 330 image, whereas the Tagger module 218 has tagged the image 322 as being a "High Zoom" 332 image.

Returning back to FIG. 2, in some embodiments, the system 200 includes a Heat Mapper module 225 which image processes the input image 202. The Heat Mapper module 225, which may be the heat mapper routine 160 of FIG. 1, includes a heat mapping model 226 which has been specially trained (e.g., by training routine 130) on images of both damaged and undamaged objects, such as vehicles, to detect or determine the presence of damage (and/or the probability or the confidence level of the presence of damage) to various parts, portions, segments, sites, or locations of an object or vehicle depicted in a subject image. In an example, the heat mapping model 226 includes one or more analytical models or AI models which have been trained by using any one or more suitable machine learning technique(s) on training images (e.g., training images 122) which have been labeled on a per pixel basis with a respective indication of the presence or absence of actual damage at a corresponding part, portion, segment, and/or site of a vehicle represented by each pixel. The Heat Mapper module 225 applies the heat mapping model 226 to the input image 202, thereby generating a heat map mask 228 (which may be the heat map masks 162 of FIG. 1, and which is also interchangeably referred to herein as a "heat map" or "heat map image" 228) of the depicted vehicle 205. Each colored pixel of the heat map mask 228 represents a respective location on the vehicle 205 at which the heat mapping model 226 has discovered the presence of damage to the vehicle 205 (and/or has discovered that the probability of the presence of actual damage to the vehicle 205 is greater than a predetermined threshold), and each different color corresponds to a different degree or amount of damage and/or a different probability of the presence of actual damage at the respective location on the vehicle 205. As indicated above, the Heat Mapper module 225 may implement a statistically based characterization routine and, in particular, a characterization routine that implements a CNN model to analyze each pixel of an input image 202 to determine a probability that damage exists at that pixel. The operation of this model will be described in more detail with respect to FIG. 4A. The Heat Mapper module 225 may then create a heat map 228 of the image that details or annotates, for each pixel of the input image, if damage has been detected and, if desired, the probability of the detected damage. The Heat Mapper module 225 may, if desired, apply a thresholder to the damage probability determined at each pixel so that any determined potential damage less than the threshold is detected as no damage. However, in other implementations, the heat mapping model 226 includes one or more of the models and performs the techniques described in U.S. Pat. No. 9,886,
771 (the disclosure of which is hereby expressly incorporated by reference herein), and the Heat Mapper module 225
implements one or more of the techniques described in U.S.
Pat. No. 9,886,771 to generate a heat map corresponding to
a damaged vehicle depicted in an image. In other implementations, the Heat Mapper module 225 may additionally
or alternatively utilize other suitable techniques. Additionally, in some scenarios, the heat mapping model 226 may
operate on both the input image 202 and the Y/M/M 208 of
the depicted vehicle 205 as inputs. The generated heat map
or heat map mask 228 of the vehicle 202 may be stored or
otherwise made available 215 for use by other modules 210,
218, 230, 238, 245 of the system 200.

Figure 3C:
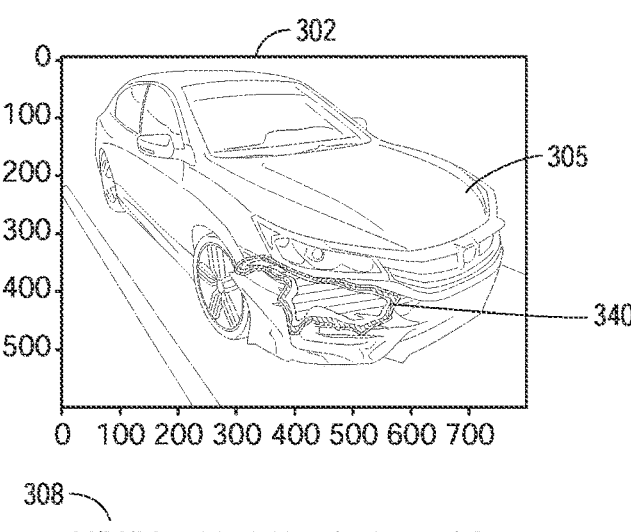
Figure 3C:
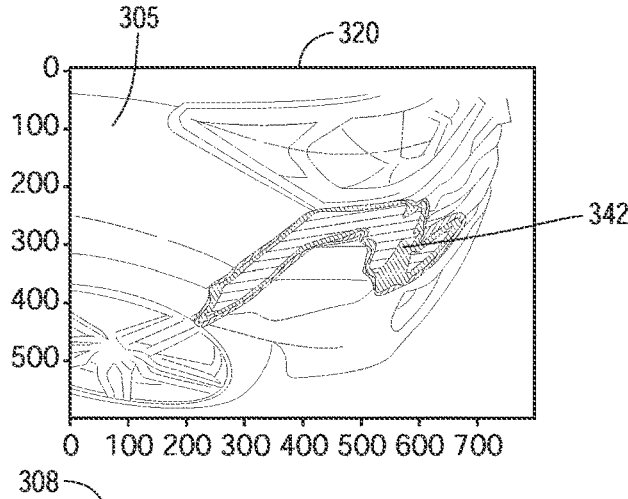
Figure 3C:
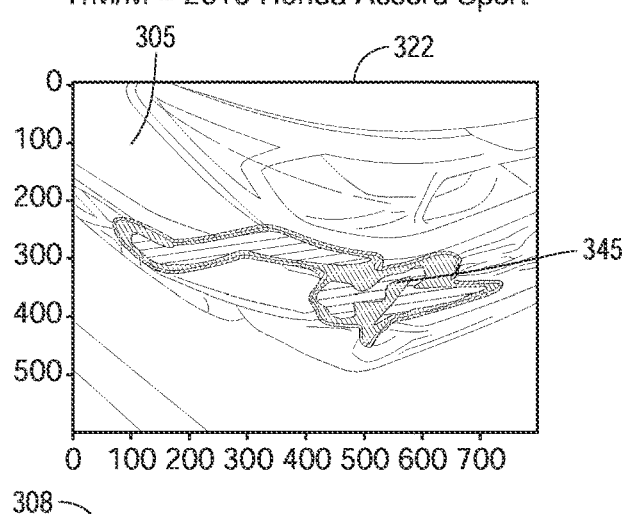

To illustrate, FIG. 3C depicts as an example usage of the
Heat Mapper module 225. In FIG. 3C, the system 200 has
applied the Heat Mapper module 225 to each of images 302,
320, 322, thereby generating respective heat map masks
340, 342, 345 which have been respectively overlaid on their
respective target images 302, 320, 322. The color scale of
the heat map masks 340, 342, 345 uses the darkest red color
to indicate the highest degree or amount of damage and/or
the highest probability of the presence of damage, and
gradually changes the colors to brighter red, orange, yellow,
green, and in some cases, blue to respectively indicate
decreasing levels of amounts of damage and/or decreasing
probabilities of the actual presence of damage at respective
locations on the vehicle 305 represented by corresponding
pixels of the heat map masks 340, 342, 345. The embodiments of the heat map masks 340, 342, 345 shown in FIG.
3C do not mask any pixels of respective images 302, 320,
322 which corresponds to locations on the object or vehicle
at which no damage was detected by the heat mapping
model and/or at which a probability of the presence of actual
damage to the vehicle is below a pre-determined threshold.
That is, the pixels of the heat map masks 340, 342, 345
which do not correspond to any damage to the vehicle are
rendered without color or as clear/transparent.

Returning again to FIG. 2, in some embodiments, the
system 200 includes a Damage Typer module 230 (which
may be the damage typer routine 170 of FIG. 1) to image
process the input image 202. The Damage Typer module 230
includes a damage typing model 232 which has been specially trained (e.g., by training routine 130) on images of
damaged (and potentially undamaged) objects, such as
vehicles, to detect or determine one or more different types
of damage of various parts, portions, segments, and/or sites
of an object or vehicle depicted in a subject image (and/or
to determine the probabilities of one or more different types
of damage at the various parts, portions, segments, and/or
sites of the depicted object or vehicle). For example, the
damage typing model 230 may include one or more analytical models or AI models which have been trained by
using any one or more suitable machine learning
technique(s) on training images (e.g., training images 123)
which have been labeled on a per pixel basis with respective
one or more different types of damage which are physically
present at the sites or locations on vehicles represented by
each pixel. In one case, the Damage Typer module 230 may
implement a statistically based characterization routine and,
in particular, a characterization routine that implements a
CNN model to analyze each pixel of an input image 202 to
determine a probability that damage exists at that pixel. The
operation of this model will be described in more detail with
respect to FIG. 4B. The Damage Typer module 230 may then
create a damage-typed image or mask that details or annotates, for each pixel of the input image 202, the type or types of damage detected at that pixel 235a and, if desired, the
probability of the detected damage type(s) 235b. The Damage Typer module 230 may, if desired, apply a thresholder to
the damage type probability determined at each pixel so that
any determined potential damage type less than the threshold is discarded or detected as no damage of that damage
type. Thus, the Damage Typer module 230 applies the
damage typing model 232 to the input image 202, thereby
generating, for each of a set of sites on the vehicle 205
depicted within the image 202, a respective set of types of
damage 235a and/or respective probabilities 235b of the
actual presence of the different types of damage at each site.
Examples of different types of damage which may be
detected by the Damage Typer module 230 include but are
not limited to:

Dents—a type of damage where the surface of a vehicle
is significantly deformed. Dents may happen to metal,
plastic, and/or rubber materials of a vehicle.

Buckles—a type of damage where a segment or panel of
a vehicle is completely deformed or bent under pressure.
Typically, when viewing a buckle from outside of the
vehicle, a buckle creates a large concave area with hard,
clearly delineated edges, and a peak of a buckle may be
visibly distinguished when viewing the buckle from the
interior of the segment or panel. As such, a "buckle" may be
more severe than a "dent." Some buckles may cause certain
segments or panels of a vehicle (e.g., hood, trunk lid, etc.)
to deform outwards instead of or in addition to deforming in
the concave manner. Buckles are typically associated with
metal materials of a vehicle, and most cases of buckle
damage are not repairable (e.g., a buckled portion of the
vehicle typically is replaced).

Creases—a type of damage which is a linear (or is an
essentially linear) dent. Typically creases are one inch or
greater in length, and may occur most commonly on metal
panels or segments of vehicle.

Dings—a type of damage which is a small dent of a small
curvature, typically dime- or nickel-sized and not visible
from a distance.

Scratches —a type of damage including a cut or a mark
which has a one-dimensional or two-dimensional shape, and
typically may have been caused by rubbing the surface of the
vehicle with a sharp object. Scratches may be categorized
into at least three different types depending on the depth of
the scratch, for example:

a clear coat scratch may be a low-depth or light scratch on
an outer layer (e.g., the clear coat layer) of the vehicle;

a color coat scratch may be a medium-depth scratch
which penetrated the clear coat layer of the vehicle and
removed paint color from the vehicle; and a primer scratch may be a deep-depth scratch which
exposes bare metal of the vehicle.

Cracks—a type of damage in which a segment or a panel
of a vehicle has been broken apart due to impact.

Tears—a type of damage in which a segment or panel of
a vehicle has split, typically occurring in plastic, rubber, or
fabric materials.

Holes—a type of damage which is a cavity in a panel or
segment, typically caused by a sharp penetration of a small
object, and occurring less commonly than Tears.

Bend—a type of damage which includes a gradual change
in shape of the vehicle between the damaged area and an
undamaged area.

Misalignment—a type of damage characterized by a
visible gap within a segment or panel of a vehicle.

Missing—a type of damage which is characterized by a
missing part, panel, or segment of a vehicle.

Of course, other type of damages may be additionally or alternately detected by the Damage Typer module 230. Further, demarcations between classifications of different types of damages (e.g., dents vs. buckles, cracks vs. tears, and the like) and/or classifying multiple types of damages which are simultaneously present at a same site (e.g., dent and scratch, crack and misalignment and scratch, etc.) may be defined during labeling of the training images. Accordingly, the Damage Typer module 230 may detect multiple types of damages (and/or probabilities of multiple types of damage) occurring at a particular portion, segment, or site of the depicted damaged vehicle 205. Additionally, in some embodiments, the Damage Typer module 230 may respectively apply the damage typing model 232 to different portions, segments, or sites of the vehicle 205 depicted within the image 202 to detect the respective damage types (or probabilities of the respective presences thereof) at each different portion, segment, or site of the vehicle 205 depicted within the image 202. The Damage Typer module 230 may indicate the detected damage types 235a by listing the respective type(s) of detected damages of various different portions, segments, or sites of the vehicle, by indicating the respective probabilities 235b of actual damage types occurring at the various different portions, segments, or sites of the vehicle, and/or by using any other suitable indication. The determined damage type(s) 235a of the vehicle 202 and/or probabilities thereof 235b may be stored or otherwise made available 215 for use by other modules 210, 218, 225, 238, 245 of the system 200.

Figure 3D:
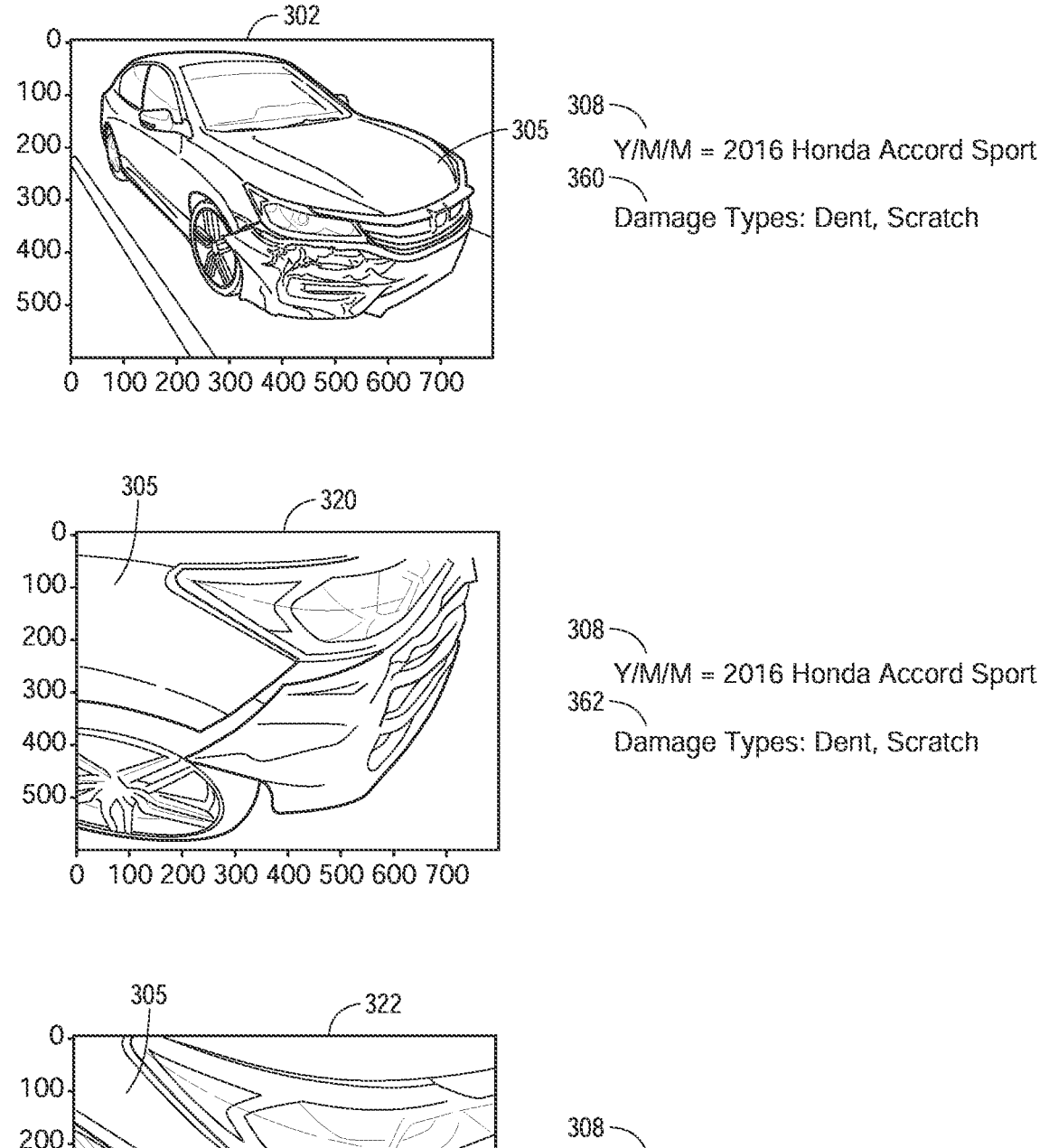

FIG. 3D illustrates an example usage of the Damage Typer module 230. In FIG. 3D the system 200 has applied the Damage Typer module 230 to each of the images 302, 320, and 322, and the Damage Typer module 230 has detected that each of the images 302, 320, 322 respectively depicts two damage types, e.g., "dent" and "scratch," as denoted respectively by the references 360, 362, 365.

Returning still to FIG. 2, in some embodiments, the system 200 includes a Segmenter module 238 (which may be the segmentation routine 180 of FIG. 1) to image process the input image 202. The Segmenter module 238 includes a segmenting model 240 which has been specially trained (e.g., by training routine 130) on images of damaged (and potentially undamaged) objects, such as vehicles, to detect or determine different segments or predefined portions of an object or vehicle depicted in a subject image. Typically, the different segments may be delineated or defined based on a base object model (such as the segmentation model 121 of FIG. 1) or based on downstream uses of the information 215 provided by the image processing system 200, e.g., may be delineated or defined based on consumers of the information 215 which is generated and/or discovered by the image processing system 200. For example, the information 215 provided by the image processing system may be utilized to order parts needed to repair the damaged vehicle, and accordingly segments of the vehicle may be defined according to sets or groups of parts which may be ordered and/or replaced as a whole, such as a front bumper system, a rear right side panel, a driver's door and window system, a wheel assembly, etc. In some implementations, segments of the vehicle may be defined as different views of the vehicle which can be depicted within a single image, e.g., driver's or left side view, passenger's or right side view, front view, back view, etc. As such, in these implementations, a perspective or corner view of a vehicle may be segmented into two different views, e.g., a back view and a right side view, a front view and a left side view, etc.

Accordingly, the segmenting model 240 may include one or more analytical models or AI models which have been trained by using any one or more suitable machine learning technique(s) on training images (e.g., training images 124) which have been labeled on a per pixel basis with a respective indication of the respective segment of a vehicle which is depicted by each pixel. In one embodiment, the Segmenter module 238 may implement a statistically based characterization routine and, in particular, a characterization routine that implements a CNN model to analyze each pixel of an input image 202 to determine a predefined segment to which that pixel belongs (e.g., which the pixel depicts) and, in some cases, a probability or confidence factor that the pixel of the image belongs to (e.g., depicts) that segment. The operation of this model will be described in more detail with respect to FIG. 4. The Segmenter module 238 may then create a segmented image that details or annotates, for each pixel of the input image 202, which segment or segments of the object the pixel belongs (e.g., depicts) and, if desired, a probability or confidence factor associated with that classification. The Segmenter module 238 may, if desired, apply a thresholder to the segment classification probability determined at each pixel so that any determined segment classification probability less than the threshold is discarded.

Thus, the Segmenter module 238 applies the segmenting model 240 to the input image 202, thereby generating a segmentation mask 242 (which is interchangeably referred to herein as a "segmentation map," "segmentation map mask," "segmentation map image," or a "segmentation image" 242) of the segments of the vehicle 205 which are depicted within the image 202. Different segments of an object may be depicted within the segmentation map as mutually exclusive areas, and the different segments depicted within the images may be indicated by respective borders, colors, and/or other suitable indicators. Each different segment may be depicted within the segmentation mask 242 (e.g., on a pixel basis) by using a different color, in an embodiment. In some embodiments, in addition to generating the visual segmentation mask 242 of the image 202, the Segmenter module 238 may generate a list of vehicle segments which are at least partially depicted within the target image 202 of the vehicle 205. The generated segmentation mask 242 of the vehicle 205 may be stored or otherwise made available 215 for use by other modules 210, 218, 225, 230, 245 of the system 200.

Figure 3E:
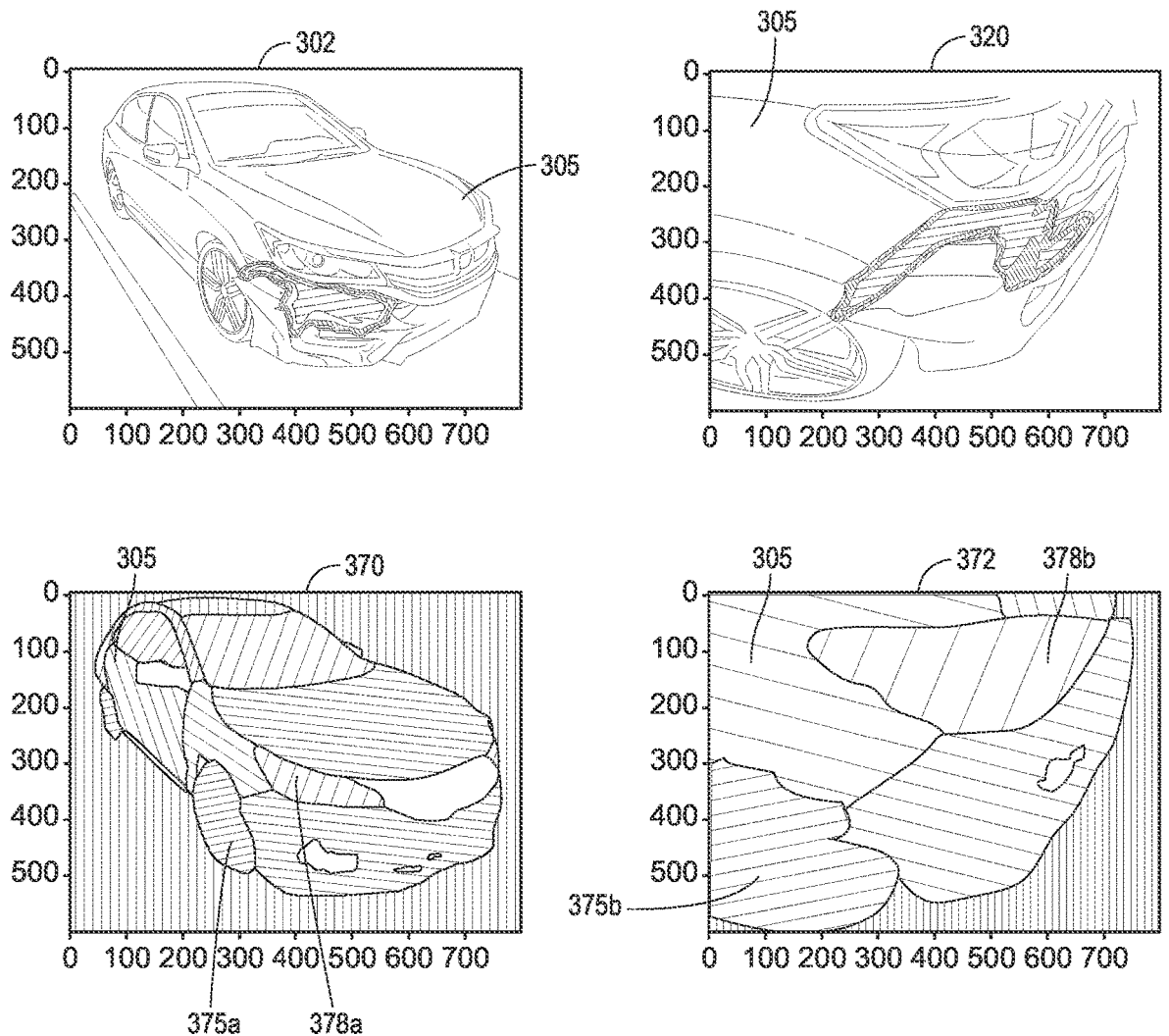

FIG. 3E illustrates an example usage of the Segmenter module 238. In FIG. 3E, the system 200 has applied the Segmenter module 238 to the image 302 of the vehicle 305 to obtain a corresponding segmentation mask 370, and the system 200 has applied the Segmenter module 238 to the image 320 of the vehicle 305 to obtain a corresponding segmentation mask 372. Advantageously, the Segmenter module 238 may denote a same segment of the vehicle 205 which is depicted in the different images 302, 320 of a same vehicle 305 by using the same color in both segmentation masks 370, 372. For example, the segmentation map mask 370 and the segmentation map mask 372 both depict a front right wheel segment using a first color, as denoted by references 375a, 375b, and both segmentation masks 370, 372 depict a right front headlight segment using a second color, as denoted by references 378a, 378b.

In FIG. 2, the system 200 includes a Damage Detailer module 245 (which may be the damage detailer routine 190 of FIG. 1) which determines and quantifies or measures the respective sizes and/or locations of damaged areas or sites on the vehicle 205 depicted within the image 202. The Damage Detailer 245 includes a Warping module or Warper 248 (which may be the warping routine 195 of FIG. 1) which operates on images which have been tagged as being a corner or perspective view, or that otherwise are determined to be an image of the vehicle which depicts multiple perspective lines along the vehicle in multiple different directions with respect to the location of the camera which captured the image, and/or other types of three dimensional aspects of the vehicle. (When a subject image is not a corner or perspective view, does not depict multiple directions of different lines of sight, or otherwise does not depict aspects of the vehicle in essentially three dimensions, such as when the subject image depicts only a single planar view of the vehicle, the Damage Detailer module 245 does not apply the Warper 248 to the subject image, and may proceed directly to determine measurements, e.g., as is described in later sections below.) Generally speaking, the Warping module 248 performs a warping technique on the image 202 to flatten the image (e.g., to make a two-dimensional view of the object as depicted in the image to account for or compensate for three dimensional aspects of the object depicted in the image), thereby generating a warped image 202'. The Warping module 248 may apply the warping technique to the image based on a set of warping waypoints depicted within the image. In some embodiments, the set of warping waypoints may be predefined, for example, the outside corners and/or boundaries of a panel, window, or other segment of the depicted object; physical locations at which different panels or segments of the depicted object meet (e.g., the intersection of a window edge, a door top edge, and a door hinge edge); a physical location of a part (e.g., the attachment location of a rearview mirror); etc. In some embodiments, the set of warping waypoints utilized to warp the subject image 202 may be dynamically determined or discovered so that the warping of the image 202 is optimized. For example, the Warping module 248 may utilize a machine-learning optimization technique to discover a set of optimum warping waypoints for the image 202. At any rate, upon warping or flattening the image 202, the steps or actions taken by the Warping module 248 to perform the warping or flattening may be saved or maintained as a warping transformation "WT" associated with the image 202 which results in the warped image 202'. That is, WT(image 202)=image 202'.

The warping transformation WT which the Warping module 248 used to generate the warped image 202' may be applied to the heat map mask 228 to generate a warped heat map mask 228' of the image 202 (e.g., WT(heat map mask 228)=heat map mask 228'), and may be applied to the segmentation map mask 242 to generate a warped segmentation map mask 242' of the image 202 (e.g., WT(segmentation map mask 242)=segmentation map mask 242'). In some embodiments, the Damage Detailer 245 initially applies the Warping module 248 to the segmentation mask 242 of the image 202 to generate the warped segmentation mask 242' and determine the warping transformation WT, and subsequently uses the determined warping transformation WT to warp the heat map mask 228 and optionally to warp the image 202, thereby generating the warped heat map mask 228' and optionally the warped image 202'.

Figure 3F:
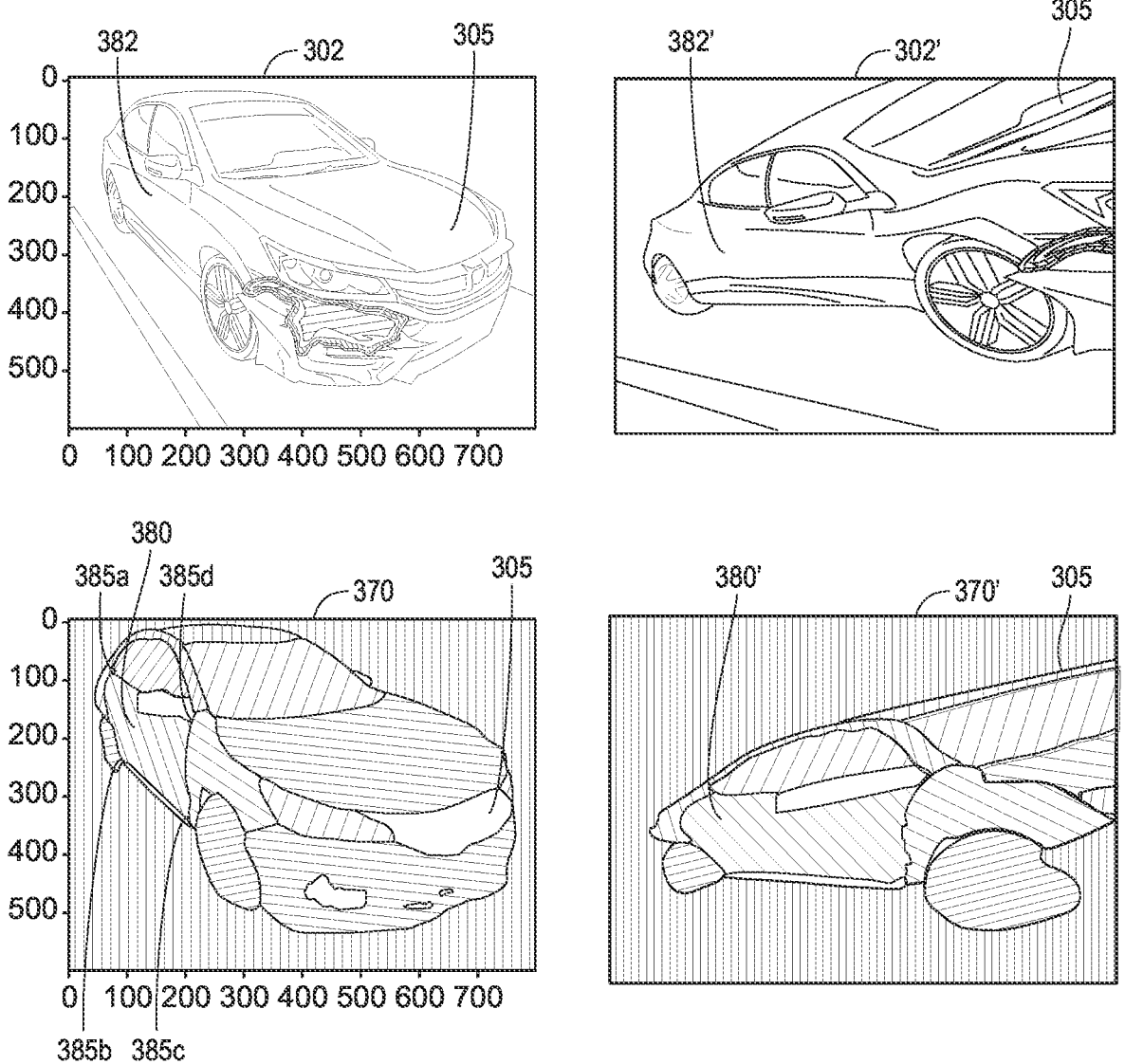

To illustrate with an example, in FIG. 3F, the Damage Detailer module 245 has applied the Warping module 248 to the segmentation map 370 of the vehicle 305 depicted in the image 302 (where the segmentation map 370 includes the Right Side panel segment 380), thereby generating a flattened segmentation map 370' in which the right side panel segment 380 is depicted in a two dimensional representation 380', and thereby determining the warping transformation "$WT_{370}$" corresponding to transforming the original segmentation map 370 into the warped segmentation map 370'. As also shown in FIG. 3F, the Damage Detailer module 245 has applied the warping transformation $WT_{370}$ to the image 302 of the vehicle 305 (which depicts the right side panel 382 of the vehicle 305), and has generated a flattened image 302' in which the right side panel 382 depicted in the image 302 is depicted in a two dimensional representation 382'. Further, in a similar manner, although not shown in FIG. 3F, the Warping module 248 may additionally or alternatively warp the heat map 340 of the vehicle 305 depicted in the image 302 by using the same warping technique and transformation $WT_{370}$ used by the Warping module 248 to generate the warped heat map 340'.

The Damage Detailer 245 may include a Stitcher module or Stitcher 250 (which may be the stitching routine 197 of FIG. 1) which operates on two input images, each of which depicts a respective portion or entirety of a same particular component or segment of the vehicle 205, to generate an aggregate, stitched image 252 which includes information and features of the particular component or segment from each of the two input images, e.g., a single, composite or panoramic image. The two input images may depict different portions of the particular segment which may partially overlap, and/or one of the input images may have a greater degree of zoom compared to the other one of the input images. The Stitcher 250 may convert or transform one or both of the two images so that both images have a common or normalized uniform depth of field, which may require warping one or both the images (e.g., when one or both of the images depict perspective views). The Stitcher 250 may generate the stitched image 252 by aligning one or more stitching waypoints or features of the object which are depicted in both images, for example. Additionally or alternately, the Stitcher 250 may generate the stitched image 252 by aligning one or more stitching waypoints or features of the particular component or segment depicted in both images, of respective segmentation maps, and/or of other segments or portions of the vehicle which are depicted in both of the two images, which may be particularly useful when one of the images depicts the particular component or segment with a greater level of zoom. In an embodiment, the Stitcher 250 may identify the depicted stitching waypoints within the two images (whether the waypoints are segment waypoints, segmentation map waypoints, or other commonly depicted waypoints) by utilizing convolution, k-dimensional tree filtering, and/or other suitable techniques. In an embodiment, at least some of the stitching waypoints may be predefined, for example, the outside corners of a panel, window, or other segment of the depicted object; a physical location at which different panels or segments of the depicted object meet (e.g., the intersection of a window edge, a door top edge, and a door hinge edge); a physical location of a part (e.g., the attachment location of a rearview mirror); etc. It is noted that the set of stitching waypoints and the set of warping waypoints discussed herein may be mutually exclusive sets or may at least partially intersect.

At any rate, based on the steps and actions applied by the Stitcher 250 to the two input images to generate the stitched image 252, the Stitcher 250 may determine the corresponding stitching transformation "ST", and the Stitcher 250 may apply the stitching transformation ST to other images related to the two target input images, such as heat map images, segmentation images, and/or the target images, thereby respectively generating a stitched heat map, a stitched segmentation map, and/or a stitched target image.

At any rate, and returning to FIG. 2, the Damage Detailer module 245 measures the respective sizes 255 and/or locations 258 of damaged areas of the vehicle 205 depicted within the image 202 or within the stitched image 252 by utilizing the heat map mask 228 in conjunction with the segmentation map mask 242 of the image 202, 252 (or, when the image 202 is a corner view, by utilizing the warped heat map mask 228' in conjunction with the warped segmentation map mask 242'). In particular, the Damage Detailer 245 determines a depth of field indicator of the segmentation map 242 based on the Y/M/M 208 of the vehicle 205. The depth of field indicator typically is in units of pixels per unit length, such as pixels per centimeter, pixels per meter, etc., where the length is scaled to the actual physical size of the physical vehicle 305. The Damage Detailer 245 overlays the heat map mask 228 and the segmentation map 242 of the image 202 (or, if appropriate, overlays the warped heat map mask 228' and the warped segmentation mask 242' of the image 202, or overlays respective stitched images) to thereby determine which pixels of segments of the vehicle 205 which are included in the segmentation map 242, 242' represent damage to the vehicle 205 at corresponding locations on the physical vehicle 205, e.g., as indicated by the colored pixels of the overlaid heat map mask 228. Additionally, the Damage Detailer 245 measures the respective size 255 of each detected damaged area and/or measures a respective distance 258 of the detected damaged area (e.g., with respect to an edge of a segment or other waypoint of the vehicle 205) by using the depth of field indicator. A more detailed description of the Damage Detailer 245 is provided elsewhere in this disclosure.

Accordingly, in view of the above, when the image processing system 200 applies all of the modules 210, 218, 225, 230, 238, 245 to the input image 202, the image processing system 200 automatically detects the presence of damage at a site or area on the vehicle 205 which is depicted in the input image 202, and automatically determines a measured size 255 and/or measured location 258 of damaged area, as well as the types 235a of damage which were incurred at the area, and/or types of information 215 corresponding to the image 202 and/or to the damaged vehicle 205. Of course, in embodiments, the system 200 need not apply all modules 210, 218, 225, 230, 238, 245 to the image 202. For example, the system 200 may only apply the Damage Typer module 230 to the image 202 to determine the types of damage (or probabilities thereof) depicted within the image 202. In another example, the system 200 may omit applying the Tagger module 218 to the image 202, and instead may determine whether or not the image 202 requires warping by utilizing another technique.

In yet another example, the system 200 may apply the Tagger module 218 (e.g., to determine the respective depicted view of the object within the input image 202 and within other input images, such as front, driver's or left side, passenger's or right side, back, particular perspective, etc.), and may omit the Segmentation module 238. In this example, the Damage Detailer 245, including the Warper 248 and the Stitcher 250, may operate on the different input images in their entireties instead of operating on different depicted segments of the object. In still another example, the system 200 may apply the Segmentation module 238 to some of the input images, forgo applying the Segmentation module 238 to others of the input images, and apply the Damage Detailer 245 (including the Warper 248 and the Stitcher 250) as appropriate. Other embodiments in which the system 200 applies fewer image processing modules to the target image 202 and its associated input images or applies additional or alternate image processing modules to the image 202 and associated images are possible.

Further, some input images 202 may not be processed by any of the modules 225-245 of the system 200. For example, prior to or upon the tagging of a particular target image 202 by the Tagger module 218, a culling routine associated with the image processing system 200, such as culling routine 150 of FIG. 1, may determine that the particular target image 202 is to be culled from the set of target images of the damaged vehicle. For instance, the culling routine may cull the target image 202 due to the target image 202 being a duplicate view of the damaged vehicle, due to image quality, due to a too near or too far away level of zoom of the target image 202, etc. In these situations, the target image 202 is not further processed by the system 200.

In some embodiments, the image processing system 200 (or instances thereof) may operate on each of a set of target images depicting a same damaged vehicle, and information discovered by the system 200 indicative of or relating to damage depicted within each image (e.g., damage locations, damage types, damage sizes, and other damage characteristics, such as but not limited those described above) may be aggregated and screened to remove any duplicate information (which may have been respectively obtained from image processing each of multiple images of a same area of damage, for example), and provided to a user interface (e.g., user interface 102), stored in memory (e.g., the memories 139, the database 109, or some other memories), and/or transmitted via one or more networks to a recipient computing device. Different instances of the system 200 may operate on at least some of the set of target images in parallel, if desired, and/or a single instance of the system 200 may operate on at least some of the set of target images sequentially.

Figure 4A:
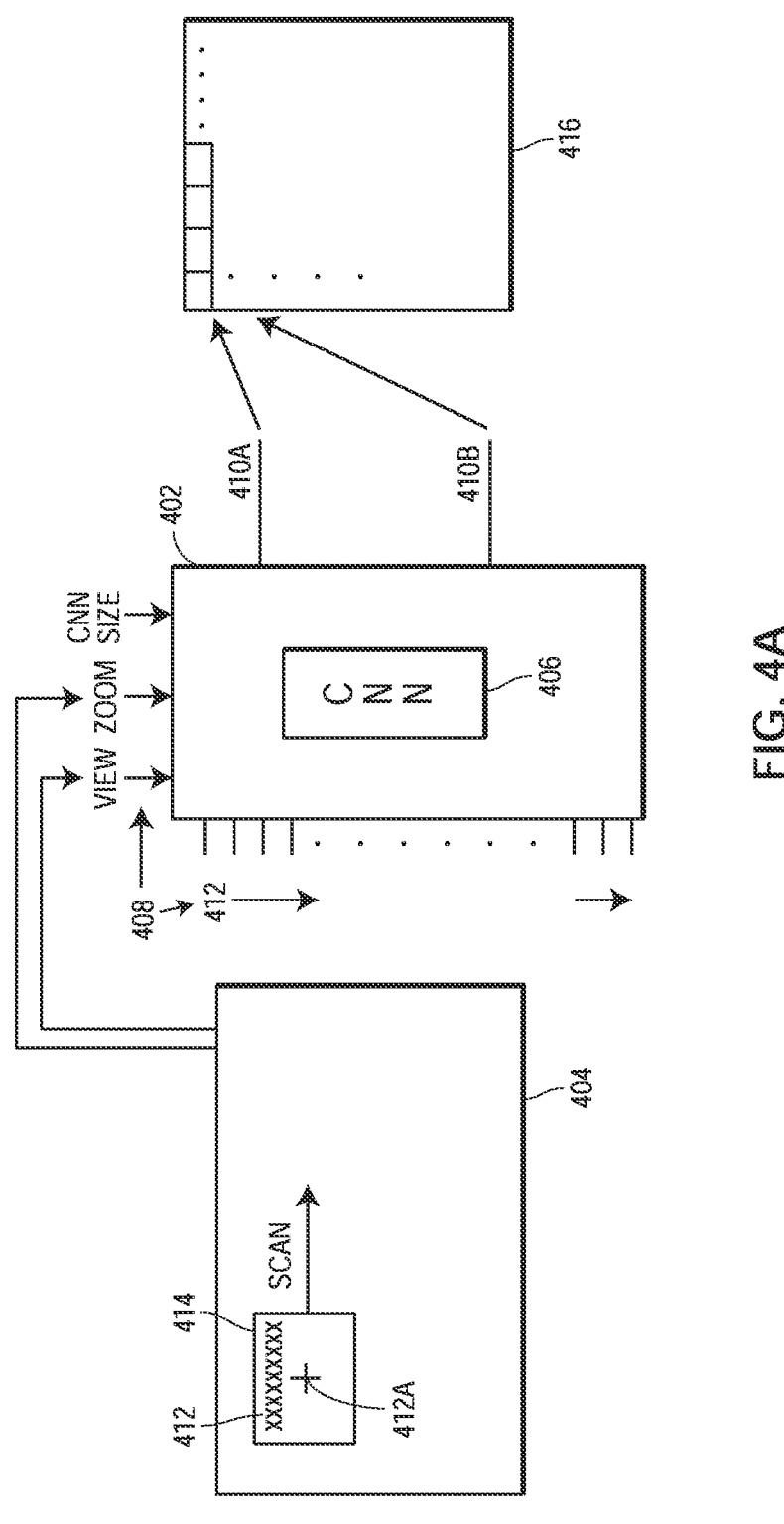
FIGS. 4A-4C depict block diagrams of various different CNN model-based detectors that each implement a CNN to detect damage to a vehicle within an image, to detect a damage type of damage to a vehicle within an image, and/or to detect one or more segments of a vehicle within an image.
Figure 4B:
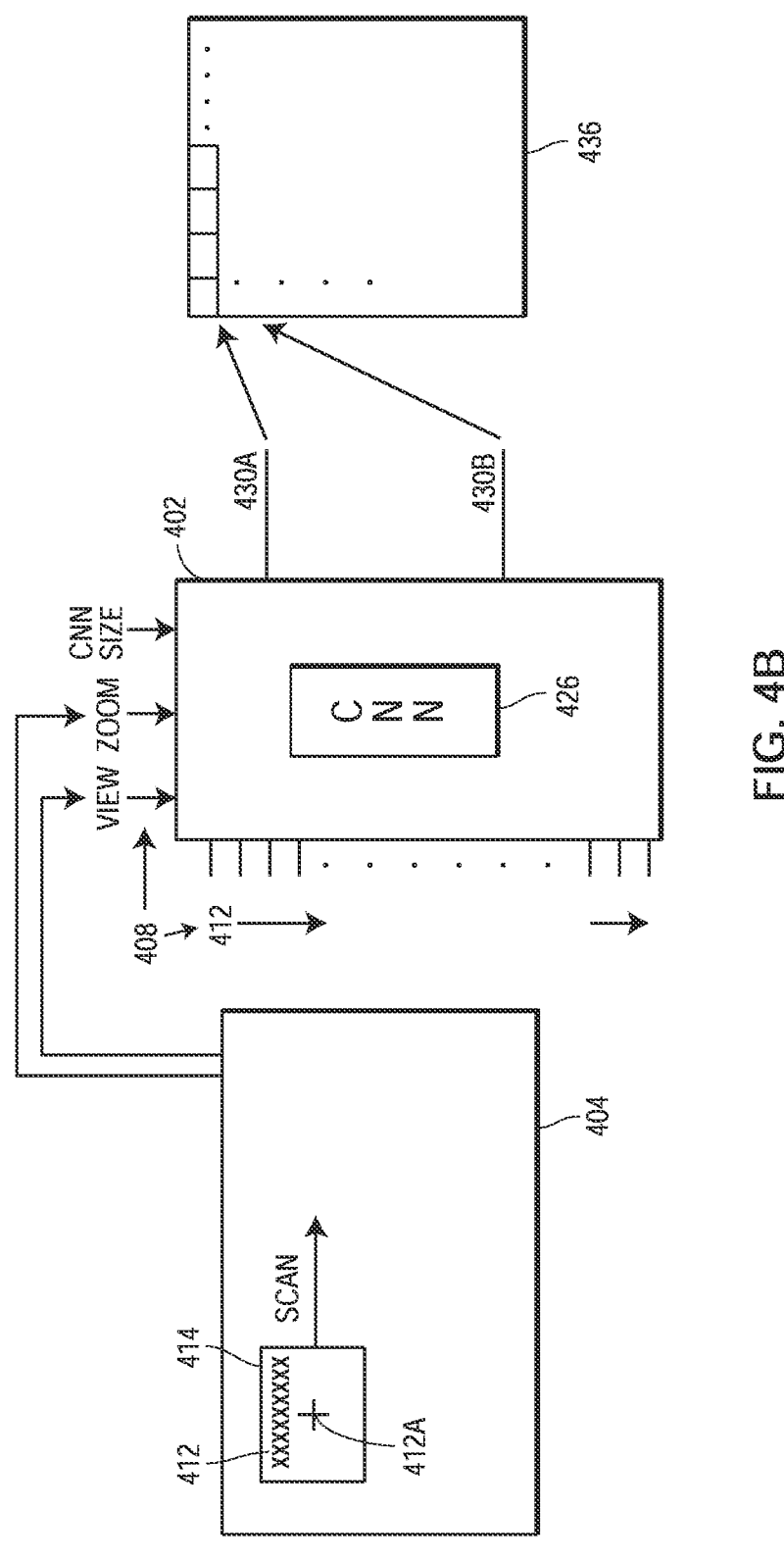
Figure 4C:
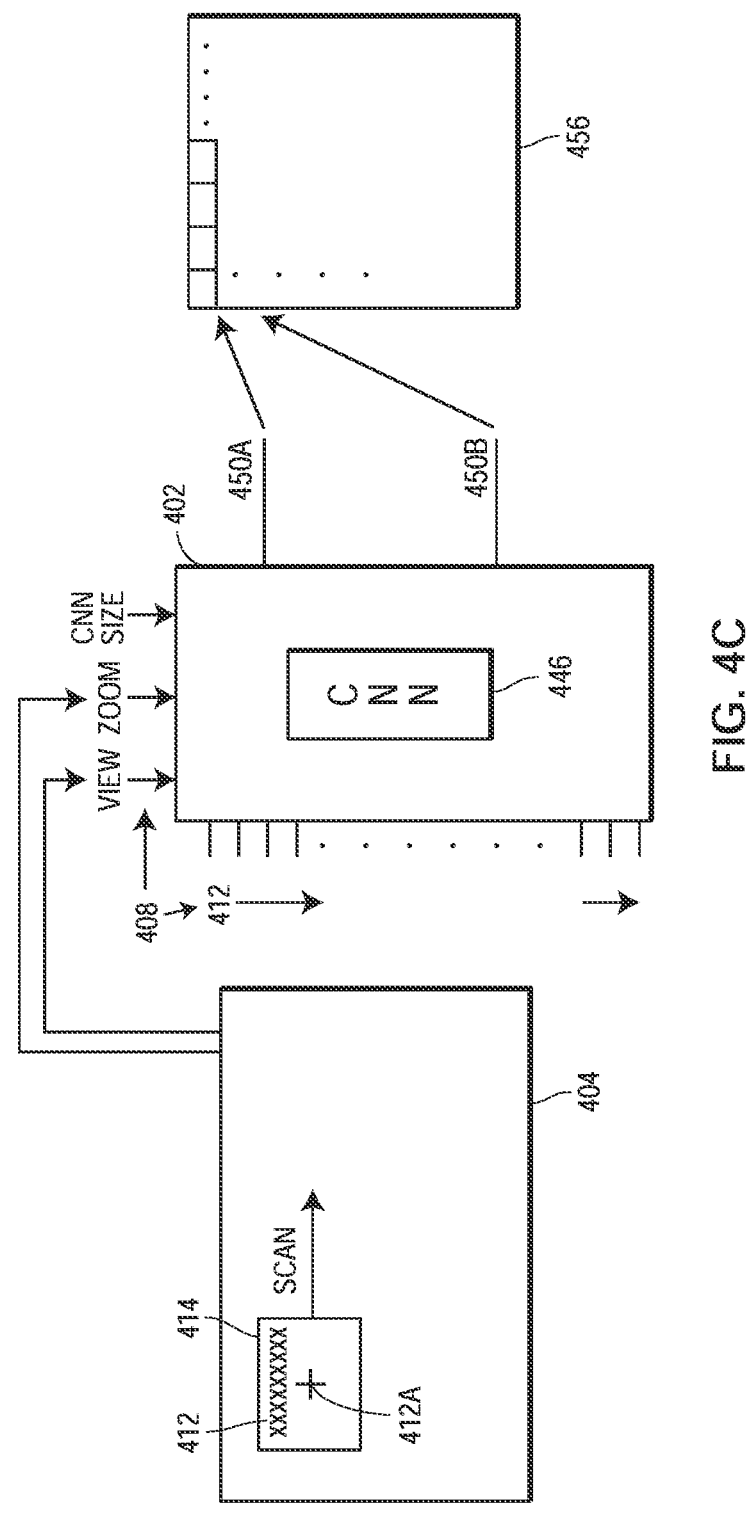

FIGS. 4A-4C depict block diagrams of various different CNN model based detectors that each implement a different CNN to (1) detect damage to a vehicle within an image (FIG. 4A), (2) detect a damage type of a damage site on a vehicle within an image (FIG. 4B), or (3) detect one or more segments of a vehicle within an image (FIG. 4C). In particular, FIG. 4A depicts a CNN model based characterization engine 402 that may be used by the Heat Mapper routine 225 of FIG. 2 to develop a heat map of an object within an image 404 (which may be any of the selected tagged target images 142 of FIG. 1 or target images 202 of FIG. 2), to identify the areas of likely damage in that image 404. In particular, as will be understood, the characterization engine 402 incudes or uses a CNN 406 (which may be the CNN 132 of FIG. 1) to analyze or process a set of model inputs 408 to produce, for each set of inputs 408 present at the model 402, a set of outputs 410 which are indicated, in this case, as an output 410A that indicates whether damage exists based on the current set of inputs 408 and as an output 410B that indicates a probability that damage exists (or a confidence factor) that damage exists based on the current set of inputs 408.

Generally speaking, the model inputs 408 include a first input that specifies or identifies the view of the image 404 (e.g., front view, side view, corner view, right rear corner view, left rear corner view, passenger side view, etc.) Typically this view will be one of a set of known or predetermined or enumerated views that the image can fall within and the values of this input may be limited to the standard eight views of an automobile (e.g., four corner view, two side views, a front view and a rear or back view). Still further, the model inputs 408 include a second input that specifies or identifies an approximate zoom level of the image (e.g., no zoom, moderate zoom, high zoom, etc.).

Again, the zoom level input is typically limited to one of a fixed set of possible approximate zoom levels. The view and zoom level inputs 408 may also be obtained from an information file associated with the image 404 being processed, may be entered by a user or may be determined automatically using other techniques described herein. In any event, these inputs have been determined to be very useful in obtaining highly accurate damage indications or damage outputs for the model 402 which implements a CNN that has been trained on images with this information present. Moreover, model inputs 408 include a set of pixel values 412 from the image 404 being processed. This set of pixel values 412 will typically be a fixed set of contiguous pixels in the image 404 and are the pixels defined by an input template 414 defining a square, a rectangular, a circle, an oval, or any other desired shape that is scanned through the image 404. The size and shape of the input template 414 may also be provided as an input to the model 402. The input template 414 is focused or centered about a center pixel 412A (which does not actually need to be in the center of the template 414) for which the model 402 is determining the damage outputs 410A and 410B.

During operation of the model 404, the Heat Mapper routine 225 moves the input template 414 to be centered on a particular center pixel 412A of the image 404, applies the pixel values 412 at the various locations covered by the input template 414 to the model inputs 408, and implements model calculations using the CNN 406 on those input pixel values and the view and zoom inputs 408, to produce the outputs 410A and 410B. The implementation of a CNN is well known and thus will not be described in detail herein. However, as is known, the CNN 406, if properly trained, represents or contains a set of factors or weights to be used in the model calculations that have been determined, in a training process, to provide the best statistical estimation of the damage estimation output 410A based on the processing (using a similar input template 414) of a large number of training images in which the damage estimation or value at each pixel is known or quantified. Generally speaking, the training algorithm or process implements a recursive mathematical calculation (also referred to sometimes as a regression algorithm) that determines the set of CNN factors or weights which, when implemented in the model 402, provides the best (most statistically accurate) estimation of the known damage outputs in the set of training images over the entire set of training images.

In any event, after calculating the outputs 410A and 410B, the model 402 stores the output values 410A and 410B in a heat map image 416 as corresponding to or as associated with the current input center pixel 412A within the input template 414, and then moves the input template 414 over a new center pixel 412A. The model 402 then calculates the output values 410A and 410B for that new center pixel 412A and stores these outputs in the heat map image 416 for that new center pixel 412A. The model 402 repeats this process to scan the entire input image 404 to determine for each pixel therein, a set of output values 410A and 410B defining the existence of damage at that pixel and the probability or likelihood for that damage calculation. As CNNs are generally known, it will be evident to those of ordinary skill in the art that the model 402 can produce, as part of the calculations therein, a confidence factor or probability factor indicating how closely the predicted output 410A is statistically correlated with the training data. Moreover, the size of the CNN or input template 414 may be chosen to be any desired size such as a 4 by 4, 10 by 10, 100 by 100, 50 by 75, etc. Generally speaking, the higher the number of pixel inputs leads to a more computationally expensive model (and a harder model to train) but may result in higher accuracy. Thus, in any event, the model 402 comprises a characterization engine and, more particularly, a CNN based image model that processes each of the pixels of a selected image to determine the particular pixels of the image 404 (or of the object within the image 404) that are damaged, and the likelihood of damage (e.g., the confidence of that calculation). In this case, the characterization engine or CNN model 402 uses a CNN transform 406 that has been developed or trained using a training engine that analyzes a plurality of images of objects (e.g., different automobiles) damaged in various different manners which have been annotated, on a pixel by pixel basis, to indicate which pixels of the training image represent damaged areas of the objects (and which images have also been annotated to indicate the view and/or zoom level of the image). Importantly, it is not necessary that the CNN training routine or the model 402 know the Y/M/M of the vehicles depicted in the training images or the image 404 being processed.

Still further, FIG. 4B depicts a CNN model based characterization engine 422 that may be used by the Damage Typer routine 230 of FIG. 2 to develop a damage-typed image of an object within the image 404 (which may be any of the selected tagged target images 142 of FIG. 1 or target images 202 of FIG. 2), to identify the areas of likely damage in that image 404 and, additionally to detect a type of damage in each of the damaged areas or sites. In particular, as will be understood, the characterization engine 402 incudes or uses a CNN 406 (which may be the CNN 133 of FIG. 1) to analyze or process a set of model inputs 408 to produce, for each set of inputs 408 present at the model 402, a set of outputs 430A and 430B. In this case, the output 430A indicates a type of damage at a particular pixel based on the current set of inputs 408 and the output 430B indicates a probability or confidence factor that the detected damage type is correct. Here, because the model 402 is characterizing the pixel as falling within a no damage category, or one of a plurality of different but limited number of damage types, the outputs 430A may include multiple different damage types, and the confidence factor outputs 430B may include a different confidence factor for each of the potentially detected damage types. Essentially, in this case, the model 402 determines, based on the inputs 408 to the model 402, the likelihood that the pixel 412A being analyzed falls within each of the possible damage types (or no damage) and, as such, calculates a probability or correlation factor that the pixel falls into each of the different possible damage types, including no damage. In any event, the model 402 may select, as the damage type outputs 430A, all of the damage types and may provide the confidence factor for each damage type on the outputs 430B, may select only the damage types that have a confidence factor over a particular threshold and may provide the confidence factor on the output 430B for each of those damage types that are over the particular threshold or may select only one damage type with the highest confidence factor and provide that damage type and confidence factor on the outputs 430A and 430B. In other cases, the model 402 may simply output the damage type that has the highest confidence factor or correlation value. In any event, it will be understood that a single pixel of the image 404 may be determined to fall within zero, one, two or even more different damage types.

Of course, similar to the model of FIG. 4A, the model inputs 408 include a first input that specifies or identifies the view of the image 404 (e.g., front view, side view, corner view, right rear corner view, left rear corner view, passenger side view, etc.) and a second input that specifies or identifies an approximate zoom level of the image (e.g., no zoom, moderate zoom, high zoom, etc.) Moreover, the inputs 408 of FIG. 4B include a set of pixel values 412 from the image 404 being processed. This set of pixel values 412 will typically be a fixed set of contiguous pixels in the image 404 as defined by an input template 414, and the input template may define a square, a rectangular, a circle, an oval, etc. and be of any desired size. The size and shape of the input template 414 may also be provided as an input to the model 402. The input template 414 is centered about or focused on a pixel 412A for which the model 402 is determining the damage-typed outputs 430A and 430B. This area may be any particular or desired size and shape and the size or shape may be determined by the training algorithm which trains the model CNN 426.

In a manner similar to that described with respect to FIG. 4A, the Damage Typer routine 230 moves the input template 414 centered over a particular center pixel 412A, applies the pixel values 412 at the various locations around the center pixel 412A as defined by the input template 414 to the model 402, and implements the model calculations using the CNN 426 on those input pixel values and the view and zoom inputs 408, to produce the outputs 430A and 430B. Again, the implementation of a CNN is well known and thus will not be described in detail herein. However, as is known, the CNN 426, if properly trained, represents or contains a set of factors or weights to be used in the model calculations that have been determined, in a training process, to provide the best statistical estimation of the damage type estimation output 430A based on processing of a large number of training images (using the same input template 414) in which the damage type at each pixel is known or quantified. Generally speaking, the training algorithm or process implements a recursive mathematical calculation (also referred to sometimes as a regression algorithm) that determines the set of CNN factors or weights which, when implemented in the model 402, provides the best (most statistically accurate) estimation of the known damage types at each pixel in the set of training images over the entire set of training images.

In any event, after calculating the outputs 430A and 430B, the model 402 stores the output values 430A and 430B in a damage-typed image 436 as corresponding to or as associated with the current input center pixel 412A within the input template 414 and moves the input template 414 over a new center pixel 412A. The model 402 then calculates the output values 430A and 430B for that new center pixel 412A and stores these outputs in the damage-typed image 436 for that new center pixel 412A. The model 402 continues to scan the entire input image 404 using the input template 414 to determine for each pixel therein, a set of output values 430A and 430B defining the type of damage at that pixel (if any) and the probability or likelihood or confidence factor for that damage type calculation. As CNNs are generally known, it will be evident to those of ordinary skill in the art that the model 402 can produce, as part of the calculations therein, a confidence factor or probability factor indicating how closely the predicted output 430A is statistically correlated with the training data. Moreover, the size of the CNN or input template 414 may be chosen to be any desired size. In any event, the model 402 comprises a characterization engine and, more particularly, a CNN based image model that processes each of the pixels of a selected image to determine a damage type (if any) associated with each of the particular pixels of the image (or of the object within the image), and a confidence factor or probability of the determination. In this case, the characterization engine or CNN model 402 uses a CNN transform 426 that has been developed or trained using a training engine that analyzes a plurality of images of objects (e.g., different automobiles) damaged in various different manners which have been annotated, on a pixel by pixel basis, to indicate which pixels of the training image represent damaged areas of the objects and the type of damage at those areas (and which images have also been annotated to indicate the view and/or zoom level of the image).

Still further, FIG. 4C depicts a CNN model based characterization engine 402 that may be used by the Segmenter routine 238 of FIG. 2 to develop a segmented image of an object within the image 404 (which may be any of the selected tagged target images 142 of FIG. 1 or target images 202 of FIG. 2), to identify the segments depicted within that image 404. In particular, as will be understood, the characterization engine 402 incudes or uses a CNN 446 (which may be the CNN 134 of FIG. 1) to analyze or process a set of model inputs 408 to produce, for each set of inputs 408 present at the model 402, a set of outputs 450A and 450B. In this case, output 450A indicates a segment name or identity to which a particular pixel belongs based on the current set of inputs 408, and the output 450B indicates a probability or confidence factor associated with the detected segment identity. In this case, because the model 402 is characterizing each pixel as falling within one of various different segment types (or no segment at all), the output 450A may include multiple different segment identities for a particular pixel and the confidence factor output 450B may include a different confidence factor for each of the potentially detected segments. Essentially, in this case, the model 402 determines, based on the inputs 408 to the model 402, the likelihood that the center pixel 412A of the input template 414 falls within each of the possible segment types and, as such, essentially calculates a probability or correlation factor that the pixel 412A falls into each of the different possible segment types, including no segment (e.g., a pixel could be background image information). As such, the model 402 may select, as the segment type outputs 450A, only the segment types that have a confidence factor over a particular threshold and may provide the confidence factor on the output 450B for each of those segment types that are over the particular threshold. In other cases, the model 402 may simply output the segment type that has the highest confidence factor or correlation value on the outputs 450A and 450B. In any event, it will be understood that a single pixel of the image 404 may be determined to fall within zero, one or even two different segment types based on the confidence factors calculated by the model 402.

Of course, similar to the model of FIG. 4A, the model inputs 408 include a first input that specifies or identifies the view of the image 404 (e.g., front view, side view, corner view, right rear corner view, left rear corner view, passenger side view, etc.) and a second input hat specifies or identifies an approximate zoom level of the image (e.g., no zoom, moderate zoom, high zoom, etc.) Moreover, the inputs 408 of FIG. 4C include a set of pixel values 412 from the image 404 being processed as defined by an input template 414. The inputs and input template 414 is similar in nature to that described for FIG. 4A and FIG. 4B, but need not be the same size or the same shape.

In a manner similar to that described with respect to FIG. 4A, the Segmenter routine 238 moves the input template 414 centered on a particular center pixel 412A, applies the pixel values at the various locations around the center pixel 412A as defined by the input template 414, and implements the model calculations using the CNN 446 on those input pixel values and the view and zoom inputs 408, to produce the outputs 450A and 450B. Again, the implementation of a CNN is well known and thus will not be described in detail herein. However, as is known, the CNN 446, if properly trained, represents or contains a set of factors or weights to be used in the model calculations that have been determined, in a training process, to provide the best statistical estimation of the segment type estimation output 450A based on processing of a large number of training images (using the same size and shape input template 414) in which the segment type at each pixel is known or quantified. Generally speaking, the training algorithm or process implements a recursive mathematical calculation (also referred to sometimes as a regression algorithm) that determines the set of CNN factors or weights which, when implemented in the model 402, provides the best (most statistically accurate) estimation of the known segments in the set of training images over the entire set of training images.

In any event, after calculating the outputs 450A and 450B, the model 402 stores the output values 450A and 450B in the segmented image 456 as corresponding to or as associated with the current input center pixel 412A within the input template 414 and moves the input template 414 over a new center pixel 412A. The model 402 then calculates the output values 450A and 450B for that new center pixel 412A and stores these outputs in the segmented image 456 for that new center pixel 412A. The model 402 operates to scan the entire input image 404 (or most of the input image 404) to determine for each pixel therein, a set of output values 450A and 450B defining the identity of the segment of the object present at that pixel and the probability or likelihood or confidence factor for that segment identification calculation. As CNNs are generally known, it will be evident to those of ordinary skill in the art that the model 402 can produce, as part of the calculations therein, a confidence factor or probability factor indicating how closely the predicted output 450A is statistically correlated with the training data. Moreover, the size of the CNN or input template 414 may be chosen to be any desired size and shape.

Figure 4D:
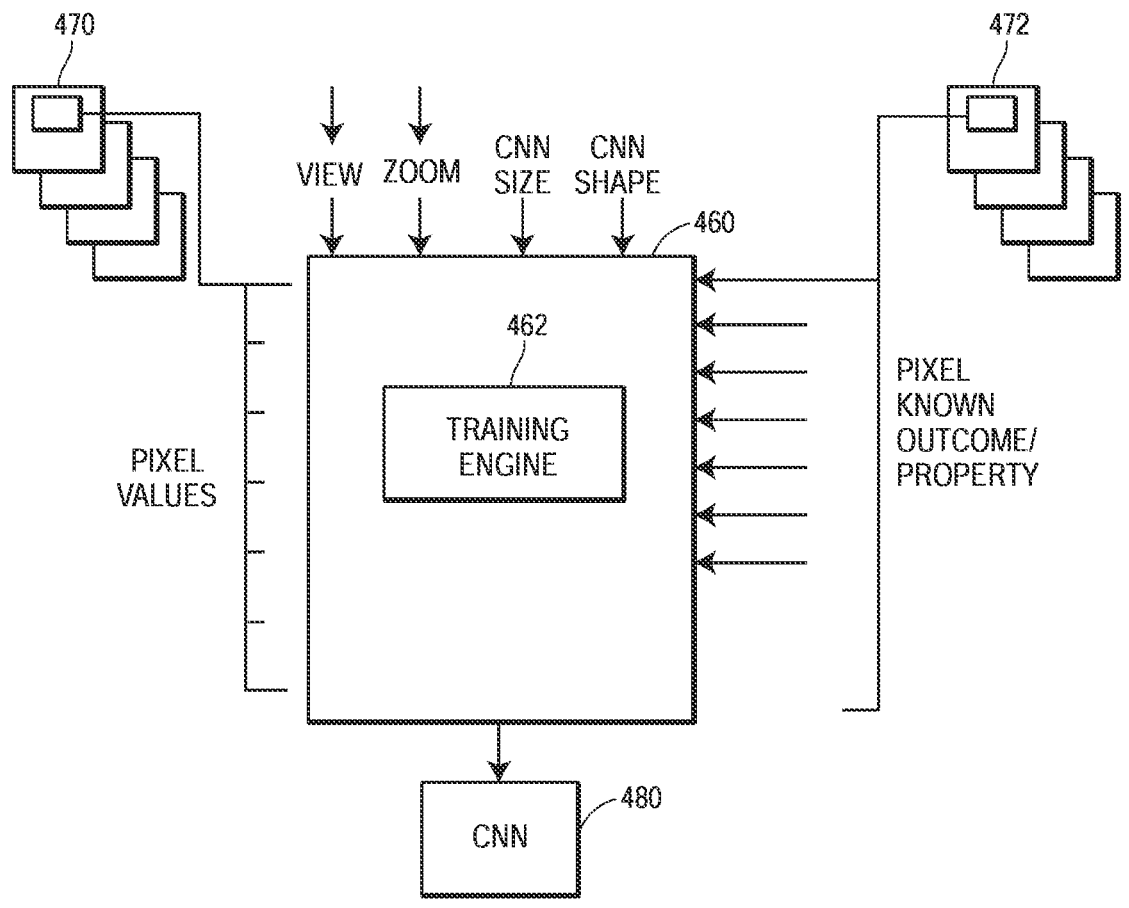
FIG. 4D depicts a block diagram of a training module that may be used to produce or create the CNNs used in the models of FIGS. 4A-C from various different types of training images.

FIG. 4D depicts a block diagram of a training module 460 that may be used to produce or create the CNNs 406, 426 and 446 used in the models 402 of FIGS. 4A-4C from the same or from various different sets of training images. In particular, the training module 460 may include a processing engine 462 that ultimately processes a set of training images 470 using a set of information files 472 associated with each of the training images 470, wherein the information files include information as to the zoom and view of the image 470 and as to a known property or outcome of each pixel in the image (a damage indication, a damage type or a segment identity with which each pixel is associated). The training or processing engine 460 uses known CNN modeling techniques to determine a CNN 480 that, when applied to the same training images 470 in one of the models 402 of FIGS. 4A-4C provides the best or most statistically accurate estimate of the known property or outcome (e.g., whether any particular pixel of an image 470 is damaged, what type of damage any particular pixel is associated with, or what segment a particular pixel is associated with) over all of the pixels of the entire set of training images 470.

As will be understood, the training module 460 may take, as inputs thereto, a CNN size (e.g., the number of pixel inputs to the CNN) and a CNN shape (the template shape of the pixels in an input template or scanning template), e.g., rectangular, square, circular, etc. Still further, the training module 460 may take as inputs at any particular time, the zoom level and view of the image being processed (i.e., the zoom level and view of the current one of the images 470 being processed) as well as the pixel values for the pixels defined by an input template of the specified size and shape centered over or focused on a current pixel or center pixel for which a prediction is known. The training module 460 may also receive, as inputs, the known property or outcome values of each of the input pixels within the training image 470 being processed, e.g., damage or not damaged, a type of damage, or a segment to which the pixel belongs. This known outcome or property information may be stored in and received from a set of information files 470A for each of the training images 470.

As will be understood, the engine 462 implements a recursive algorithm that recursively develops a set of weights or factors for the CNN 480. In particular, the engine 462 implements any of various known mathematical procedures or techniques to develop a set of CNN weights that, when used in a CNN model such as one of the CNN models 402 of FIGS. 4A-4C, predicts the known outcome or property for each image pixel in each of the set of training images 470 in the most statistically accurate manner (overall). Generally speaking, the engine 462 uses a particular set of CNN weights to determine a statistical measure of how accurate these weights are in predicting the known properties or outcomes of each input pixel for each pixel of each training image 470. The routine then alters the weights using known recursive techniques and repeats the prediction calculations over all of the pixels of all of the training images to determine if the new set of weights is more or less accurate in making the predictions, in a statistical sense. The engine 462 then continues to alter the CNN weights in a recursive manner, and tests those weights, to ultimately develop a set of CNN weights that best performs or that is most accurate in predicting the known outcomes, in a statistical sense, over the entire set of pixels in the entire set of training images. When the model trainer 460 finds a CNN that performs well or is otherwise acceptable, the engine 462 outputs this CNN to be used by one of the models 402 of FIGS. 4A-4C. Of course, if desired, the training module 460 may repeat the CNN calculations using different input template sizes and/or shapes to determine an input template size and shape that best suited for making the desired predictions or detections. Of course, the input template size and shape effects the number of CNN weights that are within the CNN being developed.

FIG. 5 illustrates a model training tool 500 that may be implemented by the training module or routine 135 of FIG. 1 to assist a user in creating the training images 470 (which may be any of the training images 122, 123 and 124 of FIG. 1) and the information files 472 associated therewith (which may be any of the information files 122A, 123A and 124A of FIG. 1). In particular, the tool 500 includes a communications module or interface (which may include hardware and/or software) 510, a user interface module 512 and an annotation module or routine 514 which operate together to enable a user to annotate, on a pixel by pixel basis, each of a set of non-annotated training images 520 to create an information file 520A for each of the training images 520, wherein the particular information within the information file 520A may be used by the training module 460 of FIG. 4D (along with the images 520) to create one of the CNNs 480. Here, the image files may be any of the training images 122, 123 and 124 of FIG. 1 or the training images 470 of FIG. 4D, and the information files 520A may be any of the information files 122A, 123A and 124A or the information files 472 of FIG. 4D. Generally, the communications interface 510 may be any desired type of communications interface (implemented in hardware and/or software and/or firmware) that communicates via any desired or available computer network or computer connection (such as a wired or wireless communication network, a memory device such as a flash or hard drive memory, etc.) to access the set of training images 520 wherever these images are stored. Generally speaking, the training images 520 may be a set of images of various different objects (automobiles) with different types and amounts of change (damage) thereon (and in some cases, objects with no change or damage). The objects, in this case, will be described as vehicle or automobiles, but could be other types of objects instead. Thus, in one case, the non-annotated images 520 may be images of different automobiles (of various Y/M/Ms) with different parts thereof damaged in different manners. It is preferable that the training images 520 include a plurality of examples of each type of automobile (Y/M/M) that will be or that could be analyzed by the models 402 of FIGS. 4A-4C and that the training images 520 include damages of each type that will be predicted by the model 402 of FIG. 4B. Moreover, it is preferable that the training images 520 includes different views of these automobiles (e.g., side, front and corner views) as well as images of different zoom levels (e.g., no zoom, moderate zoom and high zoom).

The user display interface 512 is generally an interface that connects to and drives a number of user input/output devices, including a user display device 530 and one or more user input devices such as a keyboard, a mouse, an electronic pen, a touch screen, etc. Still further, the annotation module 514 may be a computer routine executed on a processor (not shown in FIG. 5A) that controls and uses the communications interface 510 to access new training images 520, to enable a user to view and annotate each of the training images 520 using the user input/output devices 530, 532 and to store the annotated images or files 520A in a further memory device, not specifically shown in FIG. 5A but which could be in any of the databases or servers of FIG. 1, including the database 108.

Figure 5A:
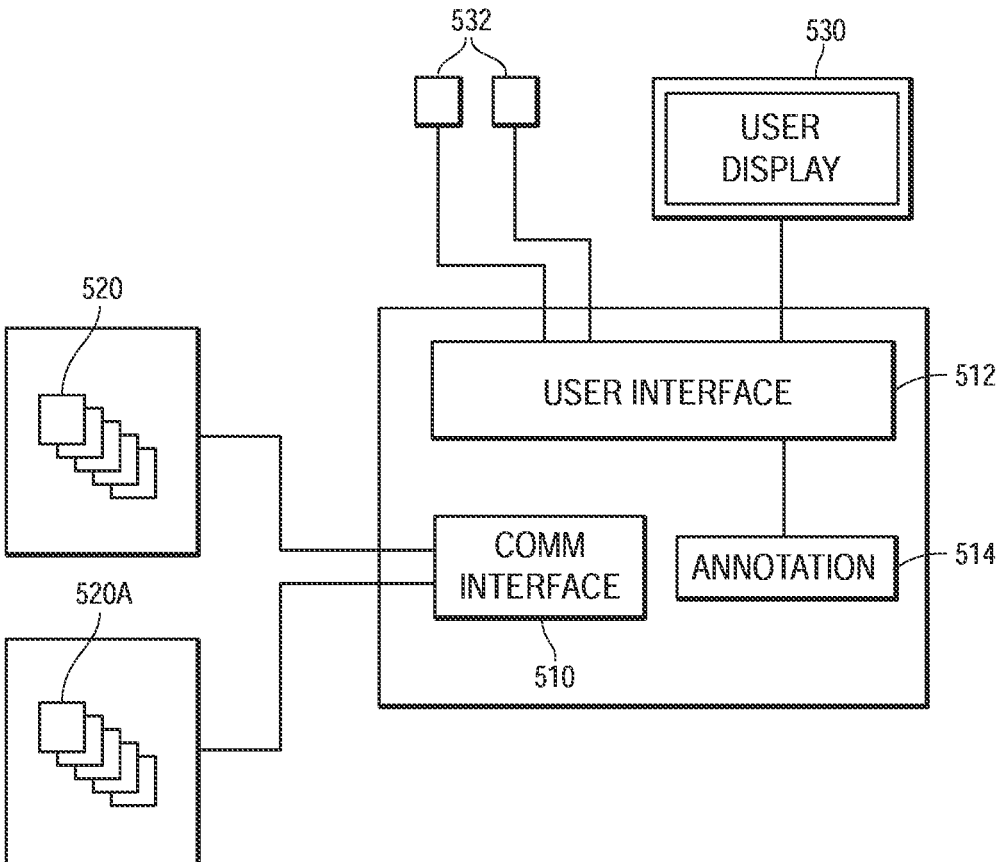
FIG. 5A depicts a training tool that may be used to annotate training images for use in the training module of FIG. 4D to create the CNNs used in the models of FIGS. 4A-4C.

Generally, the training tool 500 of FIG. 5A implements the annotation routine 514 to assist a user in annotating each of the training images 520 to create the information files 520A. More generally, the annotation routine 514 may use the communication module or interface 510 to access a particular non-annotated training image 520 and may display that non-annotated training image 520 on the user display device 530. The annotation routine 514 may then enable a user to indicate, on the displayed training image 520, using an electronic pen, a touch screen, a keyboard, a mouse or track pad, or any other type of selector or input device 532, one or more of (1) a set of pixels within the displayed image 520 that is associated with or that depict damage to the vehicle, (2) a set of pixels within the displayed image 520 that is associated with a particular type of damage and/or (3) a set of pixels within the displayed image 520 that is associated with a particular segment of the vehicle depicted in the image (e.g., associated with a particular automobile panel). The annotation routine or module 514 may enable a user, for example, to draw a line around the pixels in the displayed image associated with damage in general, pixels associated with a particular damage site of a particular type of damage, such as a dent or a scratch depicted in the displayed training image, or associated with a particular vehicle body panel or segment within the displayed image, to indicate the pixels in the training image 520 that depict damage in general, that depict damage sites of a particular type and/or that depict particular segments of a vehicle. To make pixel selection easier, the annotation routine 514 may enable a user to fill in areas of the image (e.g., inside or bounded by the line drawn by the user) to thereby select or associate each pixel in the filled in area. The annotation routine 514 may then enable the user to associate or label the selected set of pixels of the displayed training image 520 as being damaged (or illustrating damage), as being associated with a particular type of damage (such as with a dent, a scratch, a hole, a tear, etc.) and/or as being associated with a particular segment of the object (such as with a particular body panel of a vehicle), via the user interface input/output devices 530 and 532. As an example, annotation routine 514 may enable the user to label or associate a particular type of damage or a particular segment of an object depicted within the image 520 with the selected pixels using a drop down menu presented on the display screen 530, and the annotation engine or routine 514 may then mark the training image 520 and, in particular, the selected individual pixels of the training image 520, with a particular damage type or a particular segment as identified by the user or model trainer to create or update an information file 520A associated with the displayed training image 520. In some cases, the user may also be able to indicate the view of the image (e.g., right front corner view, side view, back view, etc.) and/or an approximate zoom level of the image (no zoom, moderate zoom, high zoom, etc.) via the user input/output devices 530, 532, which zoom and view information can also be stored as part of the information file 520A for that image. These preprocessed images 520, which correspond to the damage training images, damage-typed training images and segmented training images discussed previously, along with the information files 520A therefor, can then be advantageously used to train statistical or classification models (in one example, CNN models) that are then used to process pixels in new images (e.g., target images) (1) to detect damage or a probability of damage at each of those pixels, (2) to detect a type of damage and/or a probability of a particular type of damage at each of those pixels and/or (3) to detect the segment of the object and/or a probability of the segment of the object to which each of those pixels belong.

Figure 5B:
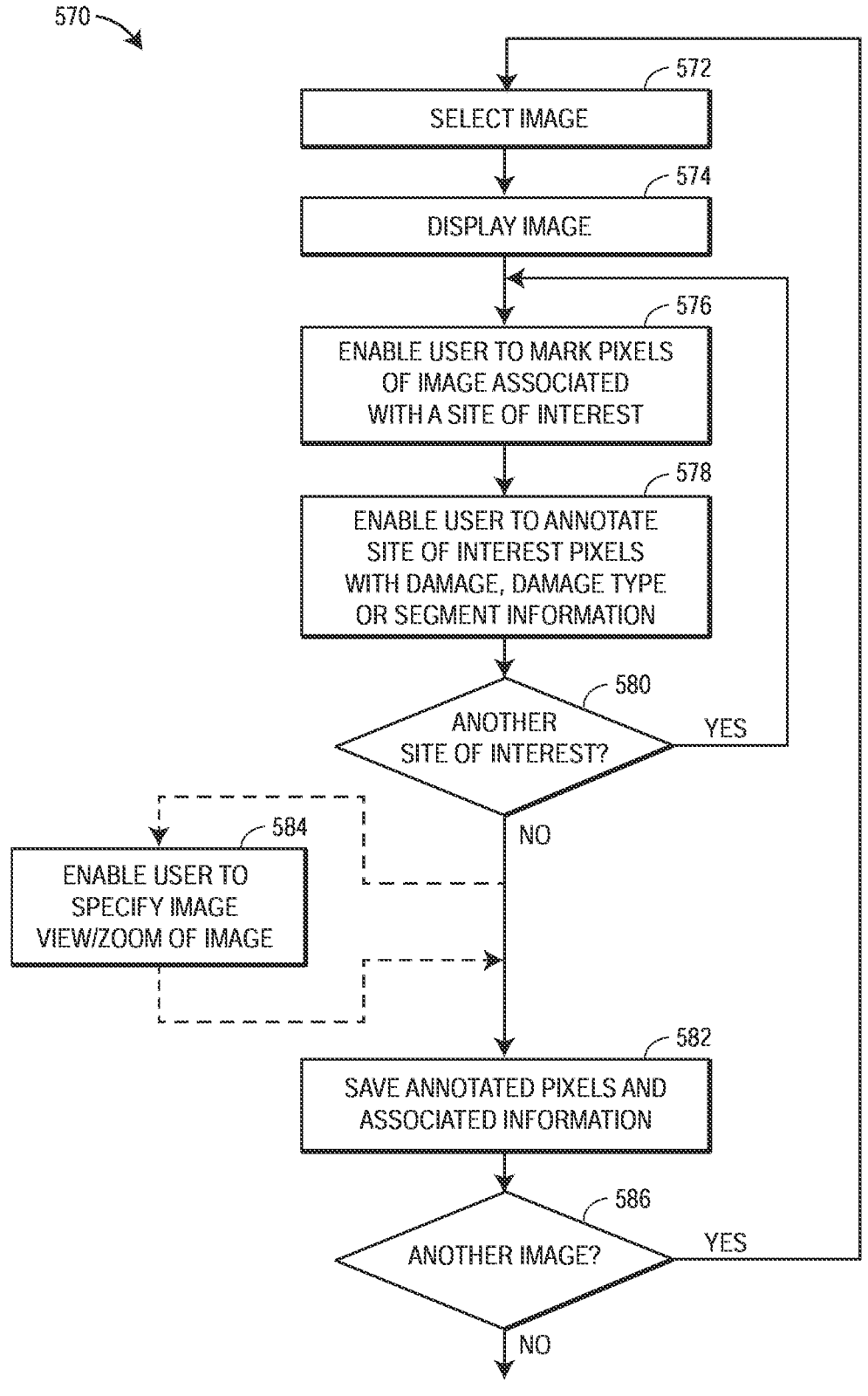
FIG. 5B depicts a flowchart of an annotation routine that may be implemented by the training tool of FIG. 5A.
Figure 6A:
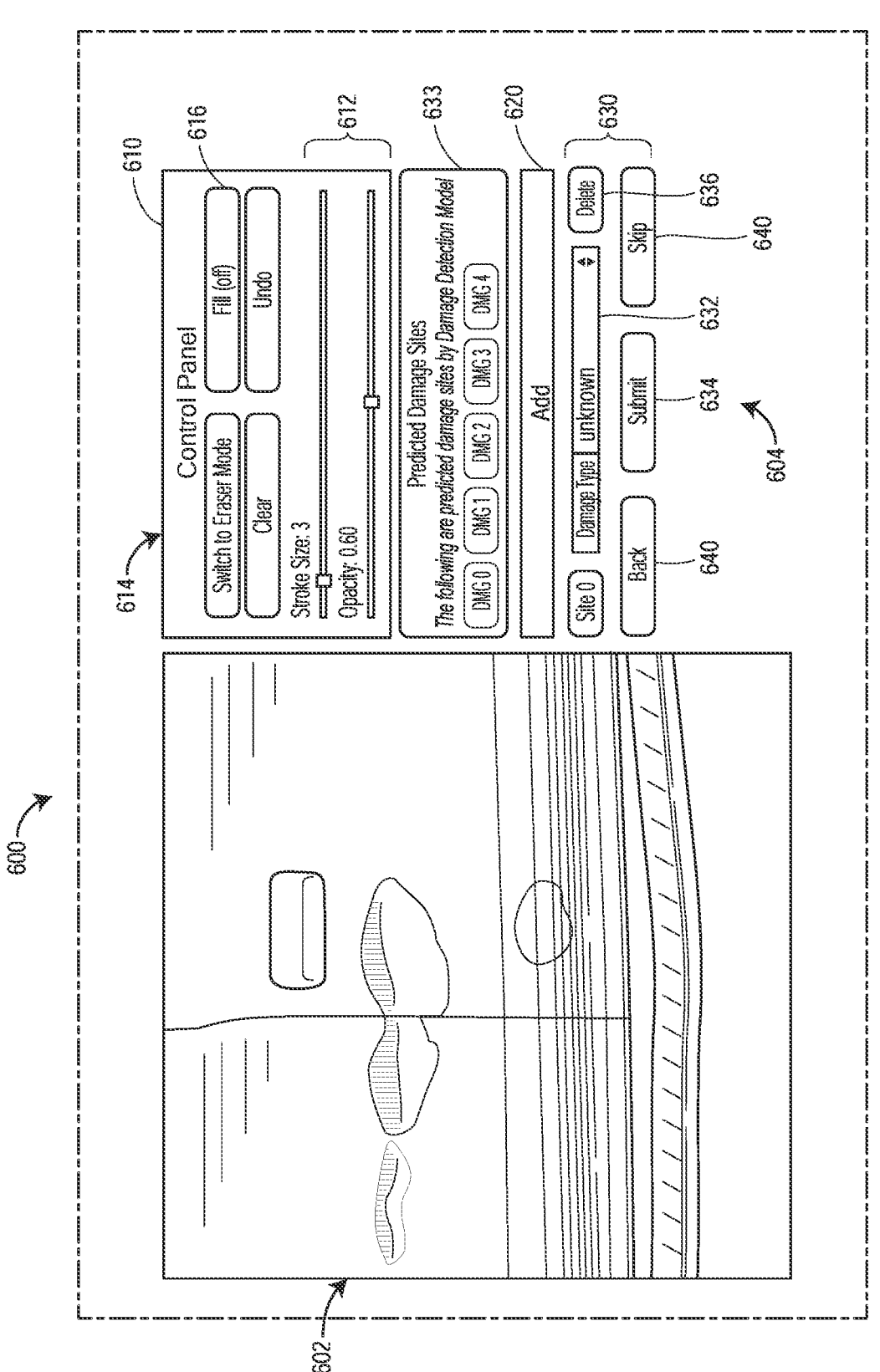
FIGS. 6A-6D depict display screens associated with or created by the model training tool of FIGS. 5A and 5B that illustrate different aspects of the training tool.

In one example, the annotation routine 514 may implement a routine 570 of FIG. 5B to assist a user in performing training image annotation and creation. In this case, at a block 572, the routine 570 may obtain one of the non-annotated training images 520 from a memory (using the communication module or interface 510 of FIG. 5A). The routine 570 includes a block 574 which may then display this image 520 on a user interface device such as a display screen 530 of FIG. 5A. As an example, FIG. 6A illustrates a user interface display screen 600 that may be provided by the routine 570 and that may be used to provide image information to a user and to enable a user to annotate the images as described herein. In the example of FIG. 6A, the display screen 600 includes an image display area 602 (in which a current non-annotated training image 520 is displayed) and an annotation area 604 (in which a user can enter or provide information to annotate the image displayed in the image display area 602).

Referring again to FIG. 5B, a block 576 of the routine 570 next enables the user to select and mark an area of the displayed image in the image display area 602 (e.g., to specify a set of pixels in the displayed image) as being associated with a site of interest within the displayed image. This site of interest can be, in one example, any damage site (e.g., specifying the pixels of the image illustrating one or more damaged areas of the object within the image), can be, in another example, a damage site of a particular type (e.g., specifying the pixels of the image illustrating a damage site of the object within the image of a particular damage type, for example, a dent or a scratch) and can be, in still another example, a particular segment or body panel of the object within the image (e.g., specifying the pixels of the image illustrating or associated with a particular segment or body panel of the automobile within the image). As an example, the block 576 may display in the annotation area 604 in the display screen of FIG. 6A one or more sets of controls that assist the user in specifying a set of pixels of the image within the image display area 602 to be associated with or grouped as a site of interest. For example, the block 576 may display a box 610 that includes controls that enable the user to specify the manner in which the image in the image display area 602 may be marked with a pen or other marking element (e.g., a finger on a touch screen, a mouse selection, etc.) For example, the box 610 may include a set of controls 612 that enable the user to specify a pen or stroke size, a color or opacity of the marker, etc. The box 610 may also include a set of controls 614 that enable the user to switch to an eraser mode (to erase markings in the image area 602) to clear the image markings, to undo a recent action, to unselect one or more selected or marked pixels, etc. The controls 614 may also include a control 616 that enables a user to fill in pixels within a marked bounded area on the image within the display area 602.

Figure 6B:
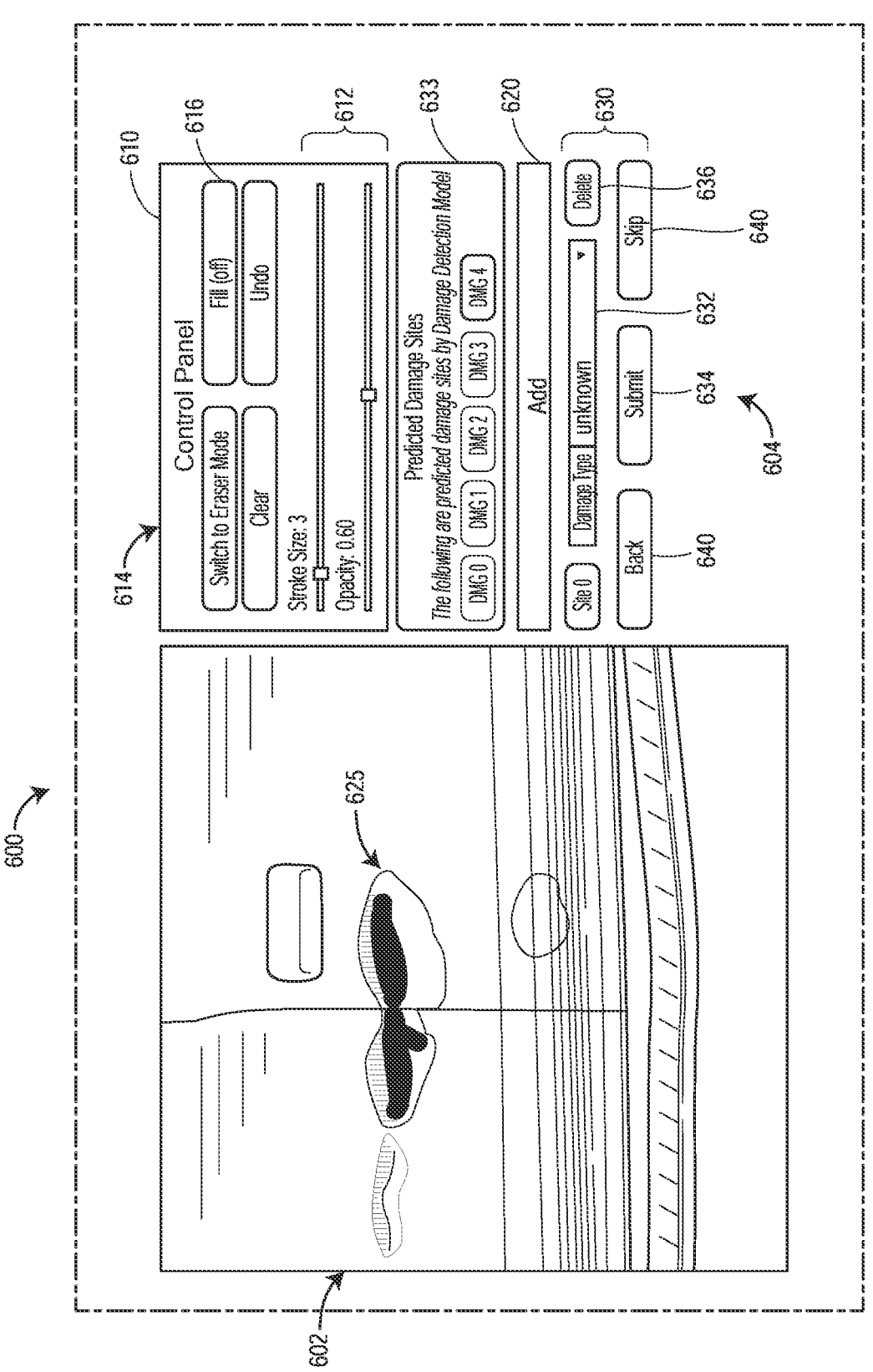

In one case, the block 576 may enable a user to select different sets of pixels within the image in the image display 602 associated with multiple different sites of interest. For example, the block 576 may display or use, in the annotation area 604 of FIG. 6A, a box 620 that enables a user to add or specify or create, in this case, different sites of interest in the image area 602, as it is possible that there may be multiple sites of interest in a single image. Thus, in the example screen 600 of FIG. 6A, the user may manipulate a Site 0 region 630 to indicate that the user is annotating a first damage site, and the routine 570 may then present a set of controls for the Site 0 site of interest to enable the user to mark and annotate the first site of interest (e.g., a first damage site). In the case of FIG. 6A, the annotation routine 570 is being used to mark damage types and so, in this case, the routine 570 enables the user to specify, using the controls 610, the area or areas (pixels) within the image displayed in the image area 602 that are to be associated with the first damage site. The user may, for example, use an electronic pen to circle a set of pixels in the image area 602 associated with the first damage site Site 0. FIG. 6B illustrates the screen 600 of FIG. 6A in which the user has used the controls 612 and an input device to specify a site of interest present in the image currently being displayed in the image display area 602 by painting the pixels (marked with reference number 625) in the site of interest. The block 576 of FIG. 5 could as well or instead enable a user to circle or outline the selected set of pixels and to use the box 616 in the annotation area 604 to fill in the circled or outlined pixels to mark each of the outlined or circled pixels (i.e., the pixels within the marked area) as being associated with the first damage site Site 0.

Figure 6C:
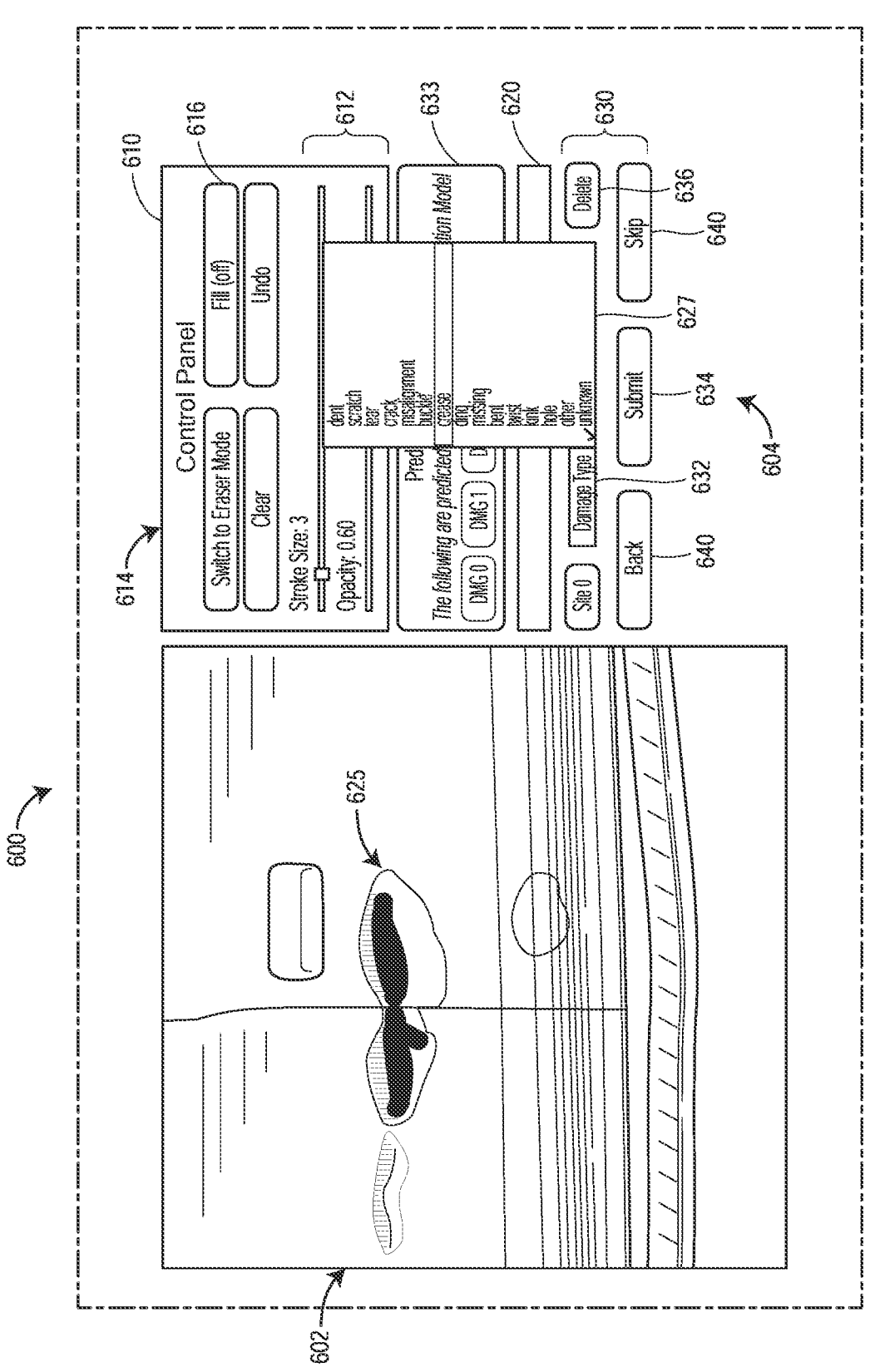

In any event, after a user has specified a set of pixels within the image display area 602 associated with a particular site of interest (which can be, for example, damage of any type, damage of a particular type, or a segment of the object in the image), a block 578 of the routine 570 of FIG. 5B enables a user to annotate the selected pixels of the site of interest with specific information about those pixels, such as that the pixels in the site of interest represent damage to the object in the image area 602, represent damage to the object of a specific or particular type, or represent a specific segment or body panel of the object displayed in the image area 602. For example, in the display screen 600 of FIG. 6B, the user may use an input block 632 to specify the type of damage associated with the marked first damage site Site 0. The block 578 may, for example, provide a drop down menu 627 (as illustrated in FIG. 6C) or other control (e.g., a separate window) on the screen 600 to enable the user to specify which of a predetermined set of damage types (or segment types if the image is being annotated to illustrate segments) is to be associated with each of the marked or selected pixels of damage site Site 0. In the case of FIG. 6C, the user has specified that the site of interest is associated with a damage type of "crease."

Figure 6D:
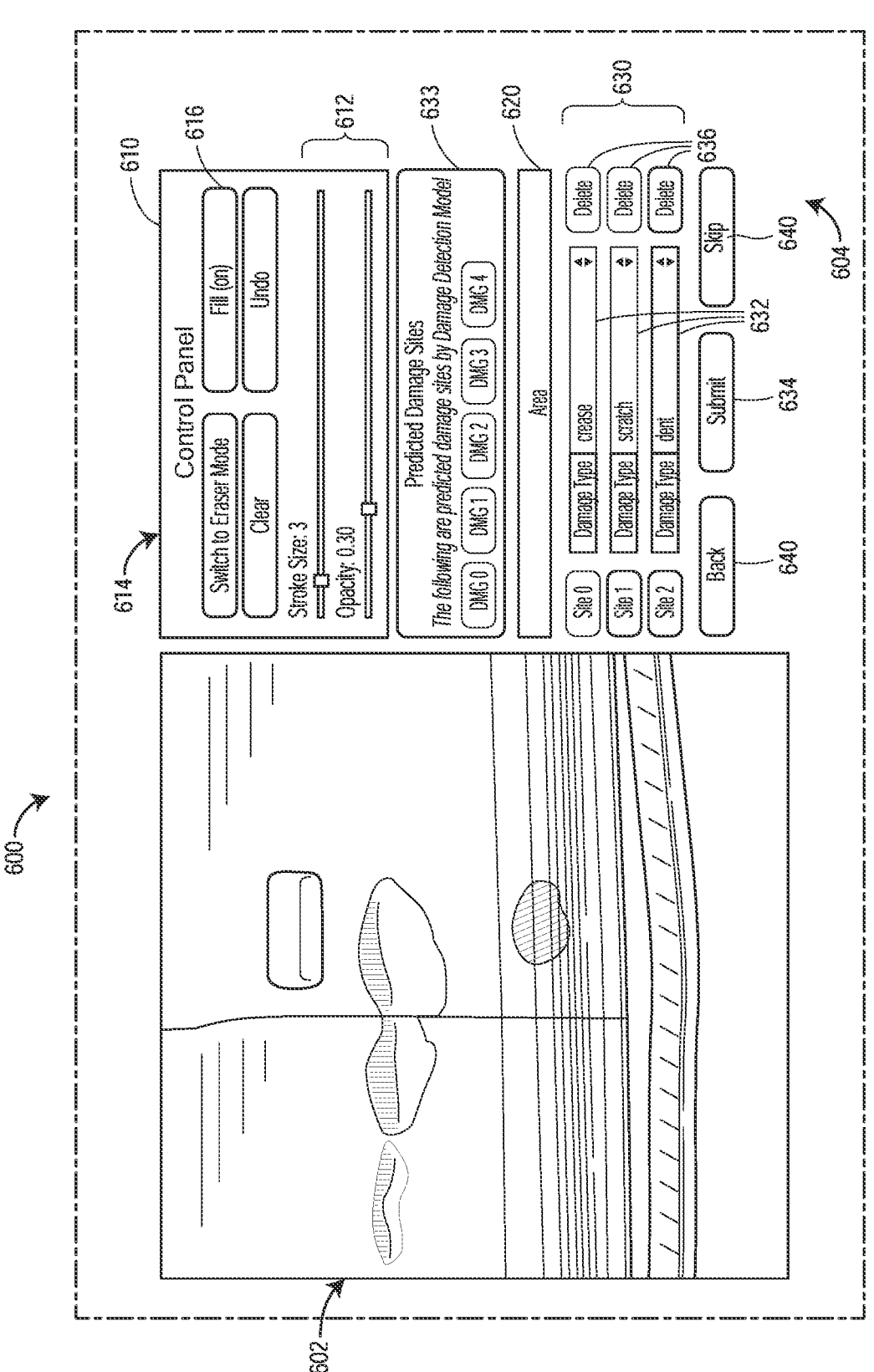

In any event, when the correct pixels of a site of interest are marked, and the correct damage type or segment information for each of the marked pixels is specified, a block 580 of the routine 570 of FIG. 5B may determine if there are more sites of interest in the image being displayed in the image area 602. For example, the block 580 may detect if a user uses the control 620 to add or specify a second damage site to indicate yet another damage site on the image displayed within the image area 602. If so, the routine 570 may return to the block 576 and enables the user to repeat the steps of using the control panel 614 to mark the pixels of the second site of interest Site land the controls 630 associated therewith to specify the damage or other information for the selected pixels (e.g., a damage type or a segment type). FIG. 6D illustrates a display screen in which multiple damage sites have been marked and annotated with different damage types. In one embodiment, hovering over the damage site icons for the different sites of interest may cause the routine 514 to display the pixels associated with that site of interest.

Still further, the routine or module 514 and in particular one of the blocks 576 or 578 of FIG. 5B may assist the user in selecting damage sites and segments by estimating the locations of different damage sites and/or the boundaries of different segments or body panels within the image displayed in the image display area 602 and enabling a user to view and alter those estimations via the pixel selection tools described herein with respect to FIGS. 6A-6D and/or to further annotate those estimations. In particular, the routine 514 may implement one or more of the techniques disclosed in U.S. Pat. No. 9,886,771 that analyze an image using a known base model to identify damage areas and/or segments. As will be seen, these techniques determine and use landmarks in an image to determine a more precise definitions of or estimations of the camera angle and zoom level of the image, and then rotate and size a base image of the object (e.g., a base image of an undamaged automobile of the same Y/M/M determined from a two-dimensional or three-dimensional base model object) to the same perspective and view as the image being processed. These techniques can then perform heat mapping and segmentation outlining in the manner described in U.S. Pat. No. 9,886, 771. Upon performing these processes on an image that is being displayed in the image display area 602, the routine 570 can then overlay these heat maps and/or segment maps onto the image in the image display area 604 to provide the estimated damage areas or segments. For example, in FIGS. 6A-6D, a set of controls 633 indicate a set of predicted damage sites in the image displayed in the image area 602 (e.g., five predicted damage sites DMG0 to DMG4). The routine 570 may enable a user to hover over or select these controls 602 to view the predicted areas of damage associated with each predicted damage site. The user may use the controls in the annotation area 604 to change the estimated set of pixels, fill-in bounded areas of pixels, specify particular ones of the predicted damage pixels and/or different pixels, etc. as being associated with one or more of the sites of interest (e.g., Site 0, Site 1, etc.). These predicted sites of interest may be used to assist the user in selecting and filling out the pixels associated with the different actual sites of interest. In some cases, the user may accept the pixels of a predicted site of interest as a new site of interest.

When the block 580 determines that a user is finished marking pixels of different sites of interest (e.g., damage sites or segment sites) and annotating each set of marked pixels with a damage type for a damage site or a segment for a segment site, the user may select the Submit 634 on the display screen 600 and a block 582 of the routine 570 may save that information for the image in an information file associated with the image. Additionally, at any time, the routine 570 may enable a user to delete one of the sites of interest using a delete button 536 provided for each site of interest.

Moreover, if desired, the routine 570 may include a block 584 that enables a user to enter or specify the view of the image within the image area 602 and/or the zoom level of the image within the image area 602. These values may again be provided from a predetermined or enumerated list of possible values provided in a drop down menu or other input box provided to the user. Of course, in some cases, the images may already be annotated with the view and zoom level information and so the block 582 may not be needed. Moreover, after the image information for a particular training image is stored, a block 586 of the routine 570 may determine if there are more images to be annotated. For example, in the example of FIG. 6A, the controls 640 may be used to enable a user to skip an image (e.g., select the next image to view) or to go back to a previous image. Of course, the routine may repeat the blocks 572-586 for any number of training images.

It will be noted that, while the example screen displays of FIG. 6A-6D illustrate the annotation of images for damage sites of different damage types, the module 514 and the routine 570 may be used in a similar manner to specify and select pixels associated with damage sites in general (without specifying a damage type) and may be used to specify and identify segments of an automobile or other object, such as body panels of an automobile.

Figure 7:
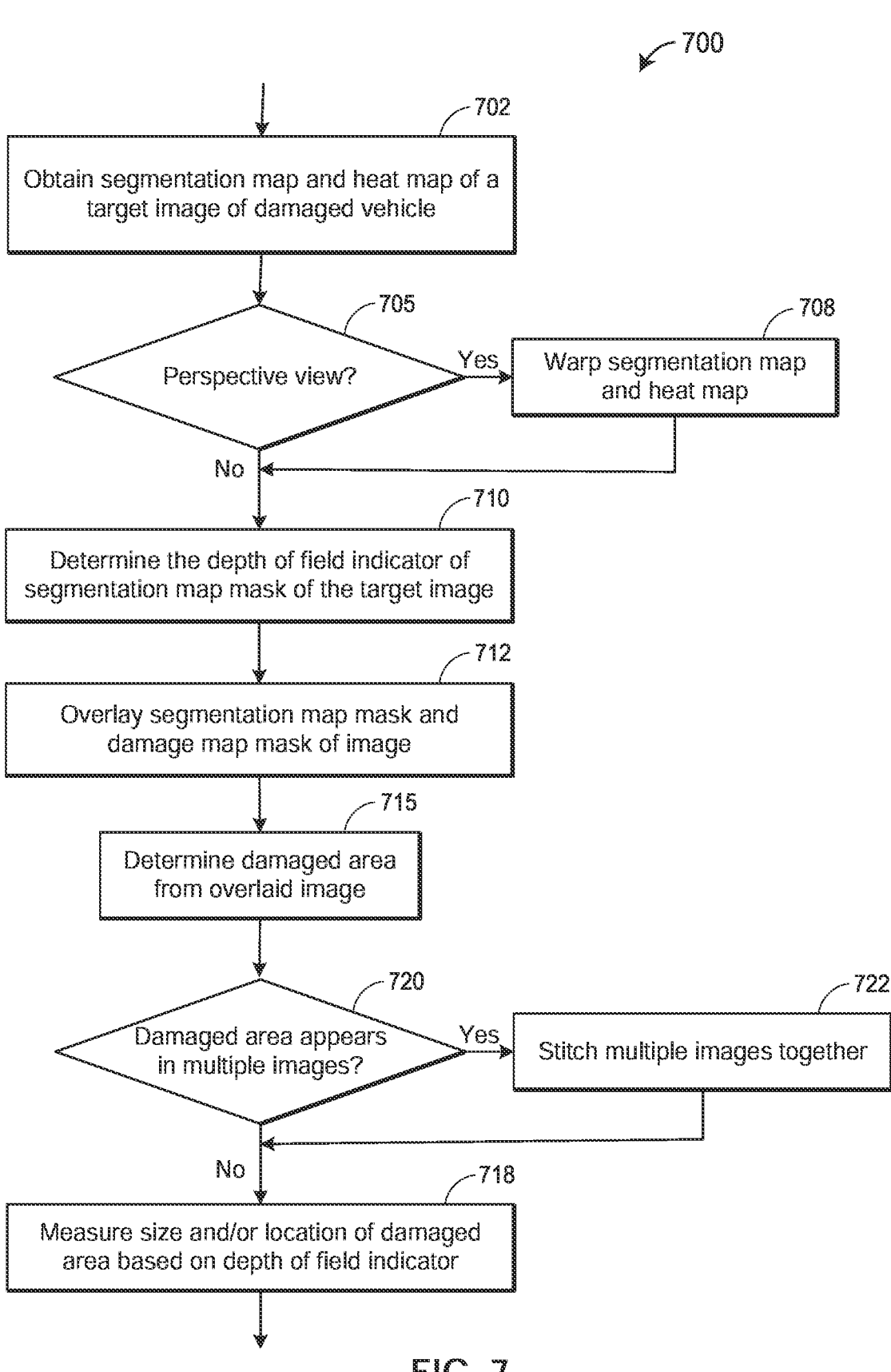
FIG. 7 depicts a block diagram of an example damage detailer routine, including an image warping routine and an image stitching routine, used to process images to determine a precise size and location of damage to an object.

FIG. 7 depicts a block diagram of an example damage detailer method 700 which may be utilized to process images to determine a precise size and/or location of damage to an object. For example, the method 700 may be implemented by the damage detailer routine 190 of FIG. 1 or by the Damage Detailer module 145 of FIG. 2. For ease of discussion, though, and not for limitation purposes, the method 700 is discussed below with simultaneous reference to FIGS. 1, 2, and 3A-3G.

At a block 702, the method 700 includes obtaining a segmentation map image and a heat map image of a target digital image of a damaged vehicle. The segmentation and heat map images may have been generated from the target digital image, e.g., in manners such as previously described. For example, the obtained segmentation map 242 and the obtained heat map image 228 may have been generated from a target digital image 202, or the obtained segmentation map 370 and the obtained heat map image 340 may have been generated from a target digital image 302. In some scenarios, the segmentation map and/or the heat map may be obtained from a data store, such as data store 109 or memories 139. In some scenarios, the method 700 includes generating the segmentation map and/or the heat map from the target digital image. For example, the method 700 may utilize one or more techniques described elsewhere within this disclosure to generate the segmentation map 370 and/or the heat map 340 from the target digital image 302.

At a block 705, the method 700 includes determining whether or not the obtained images depict a perspective view of the damaged vehicle. For example, the method 700 may access a tag indicative of the type of view of the target digital image (e.g., a tag generated by the tagger routine 148 or by the Tagger module 218), the method 700 may initiate an application of the tagger routine 148 or the Tagger module 218 to the target digital image to determine the type of view depicted therein, or the method 700 may utilize some other technique to determine whether or not the obtained images include a perspective view of the damaged vehicle.

When the segmentation map image and the heat map image depict a perspective view of the vehicle (e.g., the "Yes" leg of block 705), at a block 708 the method 700 includes warping the segmentation map and the heat map to thereby generate a warped segmentation map and a warped heat map. Generally speaking, warping the segmentation map and heat map images may include transforming each of the segmentation map image and the heat map image depicting one or more varying depths of field along one or more perspective lines into a corresponding warped or flattened map image which has a uniform (or essentially uniform) depth of field across at least a planar portion of depicted vehicle, if not most or even all of the depicted vehicle. A depiction of a planar portion of a depicted object having an "essentially" uniform depth of field, as utilized herein, generally refers a depiction in which a majority of the pixels or other portions of the depiction have a common depth of field, where the majority may be defined by a threshold, for example. As the segmentation map image and the heat map image have been generated from a same target digital image (and thus are from the same perspective as the camera angle of the target image and are of the same size), the same warping transformation is applied to each map image to generate its respective warped map image. The method 700 may utilize any suitable technique for warping images such as, for example, the warping techniques described elsewhere within this disclosure, e.g., the techniques discussed in more detail with respect to FIGS. 2, 8A, and 8B. Indeed, in an embodiment, the block 708 may incorporate at least a portion of the method 820 of FIG. 8B.

Upon or at some time after warping 708 the segmentation and heat maps, or when the segmentation and heat maps do not depict a perspective view of the vehicle (e.g., the "No" leg of block 705), at a block 710 the method 700 includes determining the (uniform or essentially uniform) depth of field indicator corresponding to the target digital image from which the (potentially warped) segmentation and heat maps were generated. In an embodiment, determining 710 the depth of field indicator of the target image includes determining a respective depth of field indicator corresponding to each vehicle segment of a plurality of vehicle segments depicted in the target image, which may be an entirety or a subset of the vehicle segments depicted in the target image. In an embodiment, the respective depth of field indicators may be determined based on the segmentation map and is described herein as such. However, in other embodiments, the respective depth of field indicators may easily be determined based on the target image itself. At any rate, the respective depth of field indicator corresponding to each of the plurality of vehicle segments may be determined based on a comparison (e.g., a ratio or a relative relationship) of a distance between selected or pre-defined measurement waypoints as depicted within the segmentation map and an actual, measured distance between corresponding waypoints of a physical vehicle corresponding to the depicted damaged vehicle. In an example, a particular depth of field indicator may be determined based on a comparison of a length of the principal axis of each vehicle segment as depicted within the segmentation map and an actual measurement of the length of a principal axis of a corresponding vehicle segment of a physical vehicle corresponding to the depicted damaged vehicle. For instance, based on the Y/M/M (and optionally the trim style) of the depicted damaged vehicle (e.g., the Y/M/M 208), the block 710 may include accessing stored data, such as stored data in a base object model or a segment model, such as models 120 and 121 of FIG. 1, which includes physical principal axis measurements of vehicle segments of a physical vehicle having the same Y/M/M (and optionally of the same trim style) as that of the depicted damaged vehicle, and comparing the stored physical principal axis measurement of the vehicle segment with the principal axis measurement of the vehicle segment as depicted in the source image. In some implementations of the block 710, the method 700 may omit determining the respective depth of field indicators of depicted vehicle segments which have respective principal axes that are only partially visible or not visible at all within the segmentation map. That is, the method 700 may determine respective depth of field indicators of only the depicted vehicle segments which have fully or entirely visible principal axes within the segmentation map.

Of particular interest are depictions of wheel segments within the segmentation map. As wheels are essentially round, a depiction or silhouette of a wheel within an image generally has an elliptical shape. As such, at the block 710, the method 710 may include fitting an ellipse to a wheel segment depicted in the segmentation map, and utilizing the length of the major axis of the fitted ellipse as the length of the principal axis of the depicted wheel segment, e.g., when the fit of the ellipse is above a predetermined fit threshold such as 70%, 80%, 90%, etc. When the fit of the ellipse to the depicted wheel silhouette is greater than the fit threshold, the length of the major axis of the fitted ellipse corresponding to the depicted wheel segment may be compared with the stored length of a diameter of a corresponding physical wheel to determine the depth of field of the depicted wheel segment. As such, wheel segments having fully-depicted major axes within the source image (even if the entirety of the wheel is not fully depicted) may be assessed for their respective depths of field.

Upon determining the respective depth of field indicators of the plurality of vehicle segments having fully-depicted principal axes within the segmentation map, at the block 710 the method 700 may include selecting one of the respective depth of field indicators to be the depth of field indicator corresponding to the segmentation map (and thus, corresponding to the heat map and the target image as well) as a whole. The selection may be made based on one or more various criteria, such as the number of vehicle segments for which respective depth of field indicators where determined, and/or other criteria. For example, when a total number of vehicle segments for which respective depth of field indicators were determined is less than a pre-determined threshold (e.g., two segments, three segments, five segments, etc.), the smallest depth of field (e.g., the closest to the camera) among the determined, respective depth of field indicators may be selected to be the depth of field indicator corresponding to the source image as a whole. When the total number of vehicle segments for which respective depth of field indicators were determined is greater than or equal to the pre-determined threshold, the method 700 may include performing a regression analysis on the vehicle segments for which respective depths of field were determined, and selecting the depth of field indicator corresponding to the source image as a whole based on the regression analysis. At any rate, the selected depth of field indicator corresponding to the source image as a whole may be stored, e.g., in the memories 139 or the data store 215.

At a block 712, the method 700 includes overlaying the segmentation map and the heat map to form an overlaid image or map of the damaged vehicle. As previously discussed, the segmentation map indicates, for each pixel, a corresponding vehicle segment represented by the pixel, and the heat map indicates, for each pixel, a corresponding occurrence and/or types of damage at a corresponding location of the damaged vehicle represented by the pixel. As such, the pixels of the overlaid image indicate (as represented by various pixels of the overlaid image) the locations of vehicle segments at which damage occurred, and optionally the one or more types of damaged which occurred at the locations. Accordingly, the method 700 determines 715 one or more damaged areas of one or more vehicle segments based on the overlaid image.

Moreover, at a block 718, the method 700 includes precisely measuring or determining the size and/or the location of the detected damaged area. In particular, based on the segmentation map of the damaged vehicle and the stored measurement of the corresponding physical vehicle, the method 700 may determine the units of actual physical length represented by each pixel of the segmentation map, e.g., based on the principal axis comparison, or based on a comparison of some other portion, part, edge, dimension, or distance between selected or pre-defined measurement waypoints included in the depiction of the vehicle and the corresponding physical measurement of the corresponding portion, part, edge, dimension, or distance between the corresponding waypoints of the corresponding physical vehicle. For example, at the block 718, the method 700 may determine the number of pixels which represent a unit of physical length of the actual, physical vehicle, such as meters, feet, inches, centimeters, a unit less than centimeter, etc. Subsequently, given the conversion factor of pixels to unit length determined based on the segmentation map, the method 700 may apply the conversion factor to the damage indicated by the pixels of the heat map to determine or measure the size (e.g., length, width, etc.) of areas of damage on the actual, physical vehicle. Additionally, the method 700 may easily determine a precise location of the area of damage on the physical vehicle, e.g., the distance from a landmark or waypoint of the physical vehicle, by using the conversion factor and the overlaid segmentation and heat maps. For example, the overlaid image may include pixels that indicate the damaged area of a vehicle segment as well as pixels which indicate the relative location of a landmark (such as the edge of the vehicle segment, a corner of another vehicle segment, etc.), and the method 700 may utilize the conversion factor to precisely measure, in units of length, the distance of (an edge of) the damaged area from the waypoint on the physical vehicle.

In some situations, a damaged area may extend across or otherwise appear in multiple images of the damaged vehicle. For example, damage to a right front bumper area may be depicted in both Right Front Corner view as well as in a Front view of the damaged vehicle, or damage to a passenger door may be depicted in both a Right Side view as well as a Right Side view with a greater degree of zoom. As such, at the block 720, the method 700 may include determining whether or not a particular area of damage is depicted in multiple target images of the damaged vehicle (e.g., based on respective overlaid images of the multiple target images). When the method 700 determines that a particular area of damage is entirely depicted within a single target image (e.g., the "No" leg of block 720), the method 700 may proceed to measure 718 the damaged area, such as in a manner described above.

On the other hand, when the method 700 determines that a particular area of damage is depicted in two different target images of the damaged vehicle (e.g., the "Yes" leg of block 720), the method 700 may include stitching together the two target images, the respective segmentation map images of the two target images, or the respective overlaid map images of the two target images so that the damaged area is integrally depicted within the stitched image (block 722). The two images may depict adjacent and overlapping portions of the damaged area, and/or the two segmentation maps images may depict the damaged area with different levels of zoom.

For ease of discussion and not for limitation purposes, the stitching discussion refers to stitching together two overlaid images to form an integral image. As each of the two overlaid images has been generated by a respective instance of the method 700, the respective depth of field of each of the two overlaid images is known, e.g., is stored in the memories 139 or the data store 215. Stitching 722 the two images together may include normalizing the two depths of field into a normalized (e.g., common or same) depth of field for the stitched image, and subsequently adjusting (e.g., resizing, while maintaining the respective aspect ratio) each of the two overlaid map images (if necessary) to be sized in accordance with the normalized depth of field. Further, to stitch together 722 the two overlaid images, the method 700 may include determining one or more locations (e.g., stitching waypoints, features, etc.) of the damaged vehicle that are depicted in both of the overlaid images. The one or more locations may include locations of stitching waypoints or features of a segment (or of the entire image) on which at least a part of the depiction of the damaged area is present, e.g., the edge of the damaged area, a corner of the damaged area, etc. Additionally or alternatively, the one or more locations may include locations of stitching waypoints or features situated on an area of the vehicle other than the depicted damaged area, such as a depicted roof line, a door handle, or the top of the wheel when the damaged area is a rear quarter panel. The method 700 may utilize any suitable technique to determine the one or more locations which are depicted on both of the images, such as convolving, k-dimensional tree filtering, and/or other suitable techniques.

The block 722 may include aligning the determined one or more locations depicted in the first image having the normalized depth of field with the determined one or more locations depicted in the second image having the normalized depth of field, and joining or stitching the two images together based on the alignment, thereby forming a single, stitched image including features and information from both of the images, and including an integral depiction of the damaged area.

Subsequently, the method 700 may assess or analyze the stitched image to determine additional information pertaining to the damaged area which was not available from assessing each of the original images individually. For example, the method 700 may measure the precise size and/or location of the damaged area as depicted within the stitched image, which may be larger than individually depicted in each of the two images. Further, when one of the original images is more zoomed in than the other image, additional pixel-related information may be determined and aggregated with the other image. For example, the more zoomed-in image has a larger number of pixels per unit length, more detail regarding per-pixel damage presence and/or damage types may be added to or aggregated with that of the less zoomed-in image.

Figure 8A:
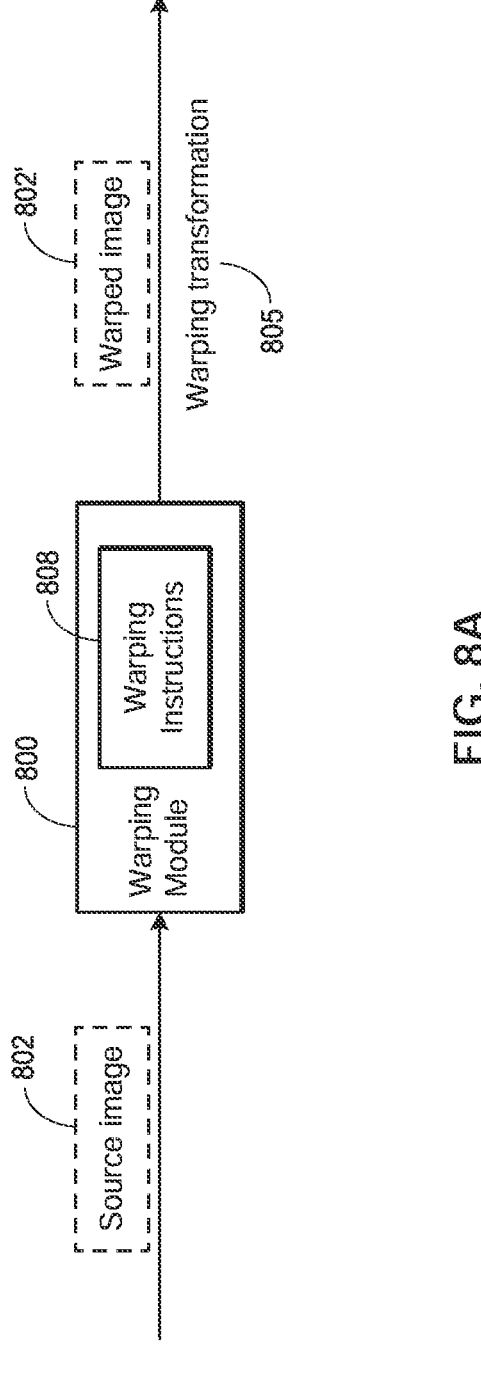
FIG. 8A depicts a block diagram of an example warping module which may be included in the image processing system of FIG. 1 or FIG. 2.

FIG. 8A depicts an example Warping module 800 which may be included in the image processing system 100, the image processing system 200, and/or in another other image processing system. For example, the Warping module 800 may be included in the warping routine 195 and/or the damage detailer routine 190 of FIG. 1, or the Warping module 800 may be included in the image processing system 200 of FIG. 2. For ease of discussion, though, and not for limitation purposes, the Warping module 800 is discussed below with simultaneous reference to FIGS. 1, 2, and 3A-3G.

Generally speaking, the Warping module 800 image processes or operates on a source image 802, which may be, for example, a target digital image, such as one of the target images 142, the image 202, or the image 302, or may be an image generated from the target digital image, such as the segmentation map image 370 generated from the image 302. The source image 802 depicts various three-dimensional aspects of an object depicted within the image 802, such as a vehicle, and the warping module 800 image processes the source image 802 to generate a corresponding two-dimensional, "flattened" or warped representation 802' of at least a portion of the object depicted in the source image 802. That is, the Warping module 800 may warp a perspective view of an object into a flattened perspective view of at least a portion of the object. For example, the Warping module 800 may transform a source image 802 which includes multiple, different depths of field of a depicted object (e.g., along an edge, axis, or perspective line of the depicted object) into a flattened, essentially two-dimensional representation 802' of the depicted object in which the depth of field is uniform (or essentially uniform) across at least a planar portion of the depicted object, if not most or all of the depicted object. Referring to FIG. 3F to illustrate, the Warping module 800 may transform the source image 302 into the warped source image 302', and/or may transform the source image 370 into the warped source image 370'. Additionally, the Warping module 800 may also discover, determine, or define the warping transformation 805 corresponding to the warping of the input source image 802 into the output warped image 802'. Subsequently, the Warping module 800 may utilize the discovered warping transformation 805 to transform the target digital image and/or to transform other images generated from the target digital image, such as heat map images.

In an example embodiment, the Warping module 800 includes a set of computer-executable warping instructions 808 that are stored on one or more tangible, non-transitory memories and executable by one or more processors. For example, when the Warping module 800 is included in the image processing system 100, the warping instructions 808 may be stored on the one or more memories 139 of the system 100 and may be executable by the one or more processors 138 of the system 100. In other embodiments, the Warping module 800 may be implemented by using any suitable, particularly configured combination of firmware and/or hardware in addition to or instead of the computer-executable instructions 808.

In embodiments, the Warping module 800 may be executable to perform at least a portion of an example method 820 for warping a source image which depicts three-dimensional features, characteristics, or aspects of an object, a block flow diagram of which is depicted in FIG. 8B. For ease of discussion, and not for limitation purposes, the method 820 is discussed below with simultaneous reference to the systems, modules, and other components shown in FIGS. 1, 2, 3A-3G, and 8A, although the method 820 may be implemented in other systems and/or by other modules and components. Additionally, although FIG. 8B depicts the method 820 as including the blocks 822-830, in other embodiments the method 820 may include fewer, additional, or alternate steps.

As shown in FIG. 8B, at a block 822 the method 820 includes determining the respective locations, within a source image such as the source image 802 of FIG. 8A, of a plurality of warping waypoints corresponding to an object depicted in the source image (such as a vehicle). As previously discussed, the source image on which the method 820 operates may be a digital image captured by a camera or may be an image generated from the captured digital image, such as segmentation map or segmented image. Generally speaking, and as previously discussed, the source image may depict various three-dimensional aspects of an object or vehicle depicted therein, such as multiple, different perspective lines along the object corresponding to different vanishing points of the source image. That is, a source image may depict a perspective view of the object or vehicle. For example, referring to the digital image 302 of FIG. 3F as an example source image, a first perspective line associated with the vehicle 305 extends from the right front corner of the vehicle towards the right rear corner of the vehicle 305, and a second perspective line associated with the vehicle 305 extends from the right front corner of the vehicle towards the left front corner of the vehicle 305, e.g., in a direction different than the direction of the first perspective line, and towards a different vanishing point than the vanishing point of the first perspective line. The respective depth of field corresponding to the first perspective line varies along its respective direction (e.g., a first three-dimensional aspect of the vehicle 305), and the respective depth of field corresponding to the second perspective line varies along its respective direction (e.g., a second three-dimensional aspect of the vehicle 305). Of course, other three-dimensional aspects of the vehicle 305 may be depicted within the source image 302.

Figure 3G:
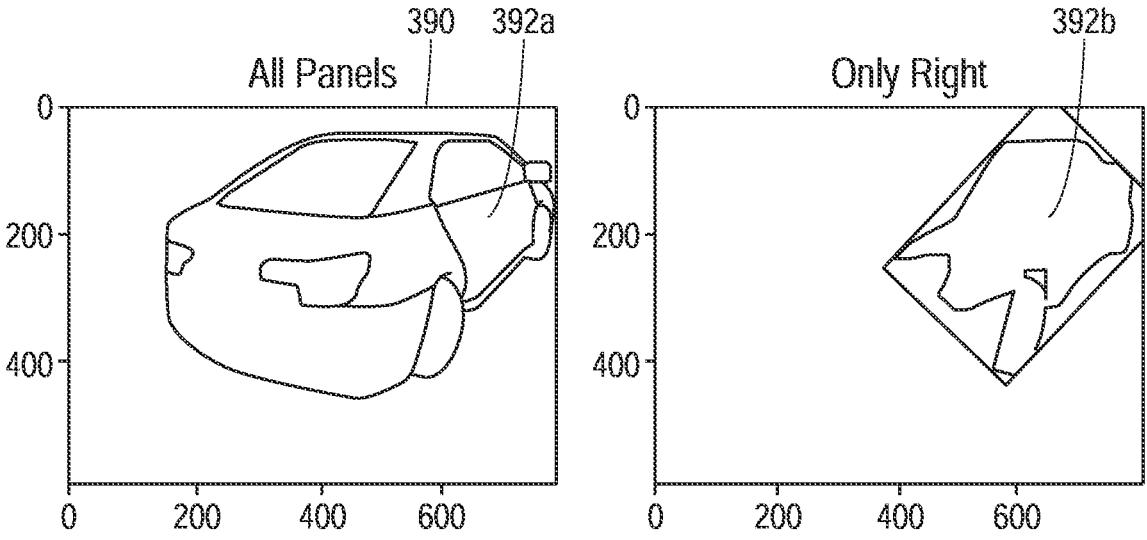
Figure 3G:
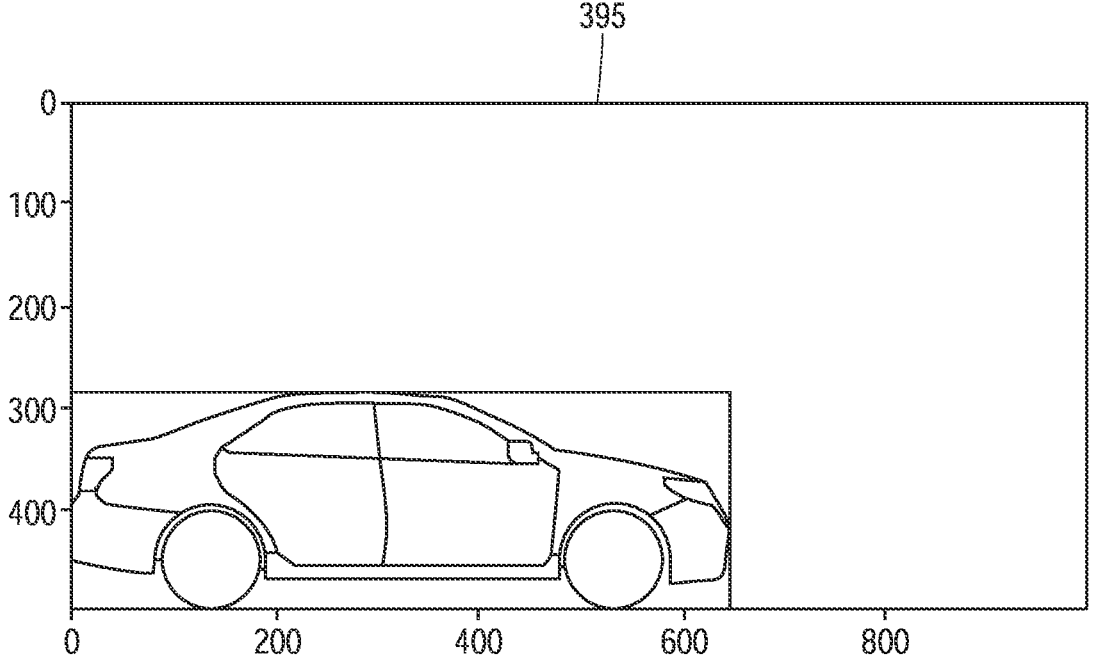

In an embodiment, the determining 822 of the respective locations of the plurality of warping waypoints corresponding to the depicted object may include determining the respective locations of a pre-defined set of warping waypoints. Different sets of pre-defined warping waypoints may be determined a priori for different segments, and indications of the sets of pre-defined warping waypoints and their corresponding segments may be stored in database 108, for example. For instance, when the depicted object is a vehicle, the pre-defined warping waypoints may include the four corners of a depicted side panel or a door, and when the depicted object is a building, the pre-defined warping waypoints may include the corners of a depicted front or side elevation, or of a door or window depicted in the front or side elevation. Referring to FIG. 3G to illustrate, an example source image 390 of a target vehicle is a perspective view of a segment map of the target vehicle, where the segment map may have been generated, by using any of the techniques described elsewhere herein, from another, two-dimensional digital image captured by a camera. A target segment of the source image 390 for warping may be an entire planar view 392a of the target vehicle (in this case, the passenger or right-side view 392a of the target vehicle, which is depicted separately in FIG. 3G from the depiction of source image 390 for clarity of illustration), or may be a portion 392b of the planar view 392a, e.g., as illustrated in FIG. 3G, a portion or segment 392b representing the passenger door of the vehicle. As an example, a set of pre-defined warping waypoints for the segment 392a and/or for the segment 392b may include the four corners of the passenger door. As such, in this embodiment, the block 822 may include determining the respective locations of four corners the passenger door as depicted within the source image 390, where the pre-determined set of warping waypoints are included in the target segment 392 for warping. For some segments, though, the pre-defined set of warping waypoints may include one or more warping waypoints which are not included in the target segment. For example, if a target segment is a frame of a vehicle disposed between the front and the rear passenger side doors, the set of pre-defined warping waypoints may include waypoints located on either or both of the passenger side doors, or if the target segment is the right-side planar view, a pre-defined warping waypoint may include a waypoint located on the back-side planar view of the vehicle.

In an embodiment (not shown in FIG. 8B), the determining 822 of the respective locations of a plurality of warping waypoints may additionally or alternatively include determining or discovering (e.g., in-line with the execution of the method 820) respective locations of a plurality of optimal or optimized waypoints for warping the depiction of the target object (or segment thereof) within the source image 802. That is, the method 820 may include discovering a set of warping waypoints which particularly optimize the warping of the source image 802 (or segment thereof) and the respective locations of the waypoints within the source image 802. Said another way, determining 822 the respective locations of a plurality of warping waypoints for the source image 802 may include discovering an optimized set of warping waypoints that is unique to the source image 802. Similar to the pre-defined sets of warping waypoints, one or more discovered warping waypoints may be included in a target segment that is to be warped, and/or one or more discovered warping waypoints may be included in a different segment. Further, the discovery of the optimized set of waypoints may be based on the segment of the source image 802 that is targeted for warping (which may be the entire image 802 or a portion thereof) and a standard view of a physical object corresponding to object depicted in the image 802.

Generally speaking, a "standard view" of a physical object, such as a vehicle, may be a planar view of the object that has an essentially uniform depth of field with respect to a camera that captured or could have captured the planar view. As such, a standard view of a physical object may be a standard right side view, a standard left side view, a standard front view, or a standard back view of the physical object. As utilized herein, a "standard" view is a view that is generated from a plurality of different images of the same type of planar view (e.g., right side, left side, front, back) of similar physical objects, for example, vehicles of a same make, model, and year of manufacture. For example, a standard right side planar view of a vehicle of a particular make, model, and year of manufacture may be generated from a plurality of different images of right side planar views of different vehicles of the particular make, model, and year of manufacture, where the plurality of different images may include images of undamaged vehicles and may include images of damaged vehicles. As such, the "standard" view of the vehicle may be considered to be a standardization, combination, amalgamation, or averaged representation of the same type of planar view of multiple vehicles of the particular make, model, and year of manufacture. To illustrate, FIG. 3G depicts an example standard right side view 395 of a vehicle of the same make, model, and year of manufacture as the subject vehicle depicted in source image 390, where the standard right side view 395 has been generated from a plurality of images of right side view of different vehicles of the same make, model, and year of manufacture as the subject vehicle depicted in the source image 390. Indeed, in some embodiments (not shown), the method 820 may include generating one or more standard views of a vehicle of a particular make, model, and year of manufacture, and storing the generated standard views, e.g., in one or more data storage entities 108.

At any rate, in this embodiment, discovering the plurality of optimized warping waypoints based on the segment of the target object and the standard view of a corresponding physical object may include determining a particular planar view included in the source image 802 (e.g., front, back, right, left), where the particular planar view typically has multiple, different depths of field as the source image is a perspective view of the object. Additionally, discovering the optimized warping waypoints may further include mapping the particular planar view depicted within the source image 802 to a standard particular planar view of a physical object corresponding to the object depicted in the source image 802. Additionally, this embodiment of the block 822 may include applying a machine-learning optimization technique to the mapping to discover the respective locations of the optimized set of warping waypoints. The machine-learning technique may be a reinforcement learning technique, a Monte Carlo simulation, or another type of optimizing machine-learning technique. For example, using the machine-learning technique, multiple warpings of the source image may be iteratively performed using different sets of candidate warping waypoints, and each resultant warped image may be evaluated against the standard view based on the mapping. In an example implementation, the machine-learning technique may discover the set of warping waypoints which minimize the space or distance between the source image 802 and the standard view, e.g., by maximizing a ratio between the intersection of the source image 802 and the standard view and a union of the source image 802 and the standard view. In some embodiments, the machine-learning technique may also determine a number of warping waypoints included in the optimized set, e.g., the optimized number of warping waypoints for the source image 802. Typically, the number of warping waypoints is at least three waypoints, although an optimum number of warping waypoints may be discovered to be three, four, five, or more waypoints. The machine-learning technique may be bounded, such as by a threshold level, a maximum number of attempts, etc. In some embodiments, multiple machine-learning techniques may be utilized.

At a block 825, the method 820 includes reshaping a minimum area polygon that corresponds to the determined warping waypoints and that covers the depiction of the planar portion of the object (e.g., of the particular planar view) within the source image 802. The reshaping 825 may be based on physical measurements and an aspect ratio of a corresponding planar portion of a physical object corresponding to the object depicted in the image. Referring to FIG. 3F to illustrate, the block 825 may include reshaping a minimum area polygon corresponding to the segment 380 of the vehicle 305 indicative of the passenger door and its four corners 385a, 385b, 385c, 385d (which were previously determined at the block 822 to be the respective locations of the set of warping waypoints) into a minimum area polygon which is accordance with the aspect ratio of a physical passenger door of a corresponding physical vehicle. In some embodiments, at the block 825, the method 820 may include determining or generating the minimum area polygon that covers the segment 380 and that includes the locations of the four corners 385a-385d, e.g., by using any suitable method, prior to reshaping.

Additionally, based on the Y/M/M 308 of the vehicle 305, the method 820 may determine the aspect ratio of a physical passenger door of a physical vehicle having the same Y/M/M 308 as the vehicle 305, e.g., by accessing stored data indicative of the physical measurements and optionally of the corresponding aspect ratio of the passenger door of a physical vehicle having the same Y/M/M 308 as the vehicle 305 which may be stored, for instance, in database 108. Based on the aspect ratio of the corresponding physical vehicle and based on the determined locations of the four corners 385a-385d within the source image 370, the method 820 may reshape the minimum area polygon covering the segment 380 of the source image 370 to have the same aspect ratio as that of the passenger door of the corresponding physical vehicle.

Generally speaking, the warping of the minimum area polygon to have the aspect ratio of a corresponding segment or portion of a corresponding physical vehicle may specify or indicate the warping transformation of the minimum area polygon. Accordingly, at the block 828, the method 820 may include determining (and optionally storing or saving) the warping transformation, e.g., as warping transformation 805. Generally speaking, an application of the warping transformation to the initial minimum area polygon results in the warped minimum area polygon having the same aspect ratio as a corresponding physical segment of a physical object or vehicle corresponding to the object or vehicle depicted in the source image.

At a block 830, the method 820 may include applying the warping transformation to the source image, e.g. to the source image in its entirety or to each segment included in the source image. As such, at the block 830, the method 820 thereby generates a warped source image which has an (essentially) uniform depth of field across the planar portion of the depicted object, if not most or all of the depicted object. For example, referring to FIG. 3F, upon determining the warping transformation corresponding to the warped minimum area polygon of the segment 380 indicative of the passenger door, the warping transformation may be applied to the source image 370 to thereby generate the warped source image 370' in which the depth of field is uniform across the segment 380' indicative of the passenger door, and in some cases, is uniform across more than one or all of the segments of the vehicle 305 depicted within the warped source image 370'.

Further, in some embodiments, the method 820 may include applying the warping transformation to other images generated from or which are otherwise based on the source image 370 (not shown in FIG. 8B), for example, that are of the same perspective of the camera angle and are sized to the size of the source image. For example, when the source image is a segmentation image of a vehicle on which the method 820 operates to generate a corresponding warped segmentation image and a warping transformation, the method 820 may further include applying the warping transformation to the target digital image from which the segmentation image was generated and/or to a heat map image generated from the target digital image corresponding to the segmentation image. In some situations, the method 820 may include applying the warping transformation to an overlaid image, such as to an overlay of the target digital image masked by the corresponding heat map, or to some other combination of overlaid images of the object which are based on the target digital image of the object.

Beneficially, the warped source image 370' is an image which may be utilized by image processing systems to precisely measure actual characteristics of the damaged vehicle 305, at least due to the relatively uniform depth of field across the damaged vehicle depicted in the image 370'. Moreover, also at least due to the uniform depth of field of the warped image 370', the warped image 370' may easily be combined or stitched with other images to form a stitched image based on which aggregate damage information corresponding to damaged areas that extend across multiple images may be determined.

Figure 9A:
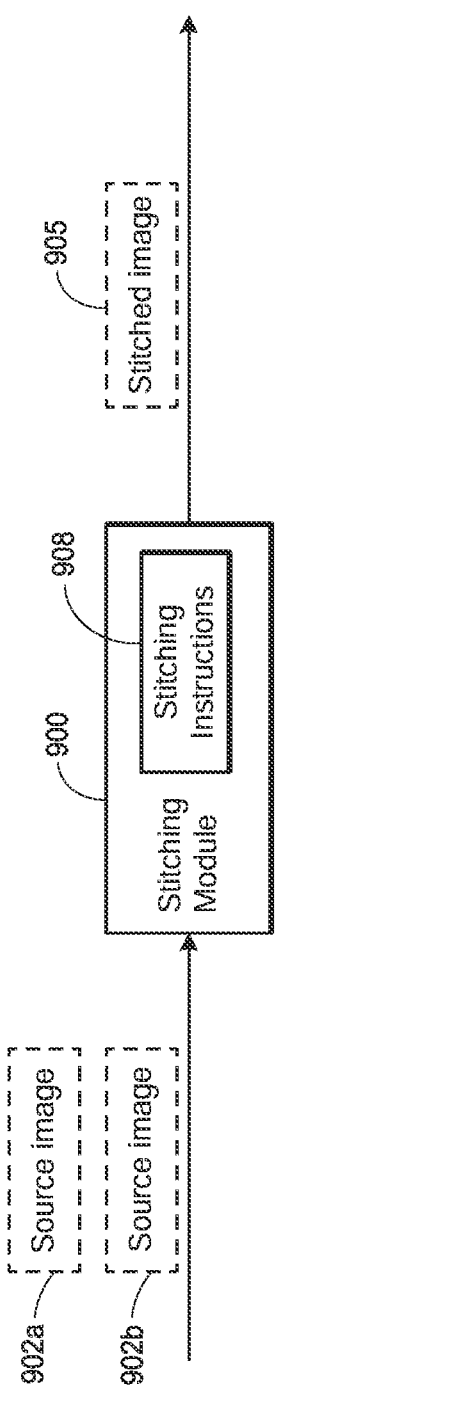
FIG. 9A depicts a block diagram of an example stitching module which may be included in the image processing system of FIG. 1 or FIG. 2.

FIG. 9A depicts an example Stitching module 900 which may be included in the image processing system 100, the image processing system 200, and/or in another other image processing system. For example, the Stitching module 900 may be included in the stitching routine 197 and/or the damage detailer routine 190 of FIG. 1, or the Stitching module 900 may be included in the image processing system 200 of FIG. 2. For ease of discussion, though, and not for limitation purposes, the Stitching module 900 is discussed below with simultaneous reference to FIGS. 1, 2, and 3A-3G.

Generally speaking, the Stitching module 900 image processes or operates on two source images 902a, 902b depicting a same object, such as a vehicle, to generate a single, integral stitched image 905 which includes features and information from each of the source images 902a, 902b. The two source images 902a, 902b may be, for example, two target digital images, such as a first and a second target image 142 of FIG. 1, two segmentation map images respectively generated from the first and the second target images 142, or a segment from the first target image and a segment from the second target image. Generally speaking, each of the source images 902a, 902b has a respective uniform depth of field, and thus may be a side view image of the object or vehicle, or may be flattened perspective view image of the object or vehicle. As such, in some cases, at least one of the source images 902a, 902b may have been generated by the Warping module 800 of FIG. 8. Each of the source images 902a, 902b depicts at least a respective portion of a same particular portion or segment of the object or vehicle. For example, the source image 902a may be segmentation map image of a warped, Right Rear Corner view of a vehicle, and thus may depict at least a portion of a segment indicative of the right rear quarter panel of the vehicle, and the source image 902b may be a segmentation image of a Right Side view of the vehicle and thus may depict an entirety of the segment indicative of the vehicle's right rear quarter panel.

In an example embodiment, the Stitching module 900 includes a set of computer-executable stitching instructions 908 that are stored on one or more tangible, non-transitory memories and executable by one or more processors. For example, when Stitching module 900 is included in the image processing system 100, the stitching instructions 908 may be stored on the one or more memories 139 of the system 100 and may be executable by the one or more processors 138 of the system 100. In other embodiments, the Stitching module 900 may be implemented by using any suitable, particularly configured combination of firmware and/or hardware in addition to or instead of the computer-executable instructions 908.

Figure 9B:
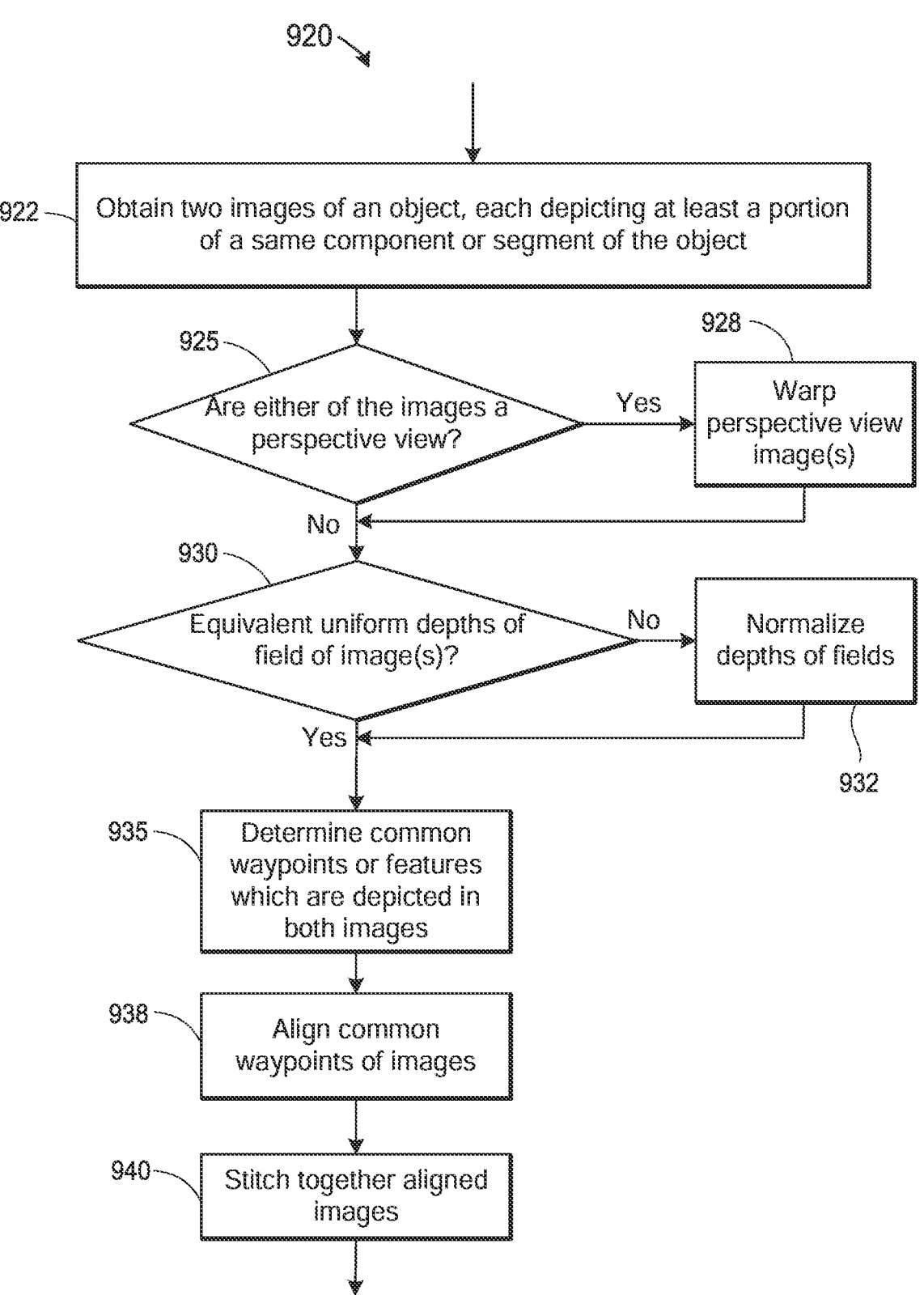
FIG. 9B depicts a flow diagram of an example method for stitching together two images to form an integral image.

In embodiments, the Stitching module 900 may be executable to perform at least a portion of an example method 920 for stitching together two source images of an object, a block flow diagram of which is depicted in FIG. 9B. For ease of discussion, and not for limitation purposes, the method 920 is discussed below with simultaneous reference to the systems, modules, components, and methods shown in FIGS. 1, 2, 3A-3G, 8A-8B, and 9A, although the method 920 may be implemented in other systems and/or by other modules and components, and in conjunction with other methods. Additionally, although FIG. 9B depicts the method 920 as including the blocks 922-940, in other embodiments the method 920 may include fewer, additional, or alternate steps.

As shown in FIG. 9B, at a block 922 the method 920 includes obtaining two source images of an object, such as a vehicle. Each of the two source images depicts at least a portion of a same area, segment, or component of the object. The two source images may both be digital target images, such as digital target images 302 and 320, or the two source images may both be segmentation map images, such as segmentation images 370 and 372. The images may be obtained from a data store, such as data store 109 or the memories 139, or the images may be obtained via a network or communication interface.

At a block 925, the method 920 includes determining if either of the obtained source images is a perspective view image of the object. If so (e.g., the "Yes" leg of block 925), then the method 920 includes warping 928 each of the perspective view images into a flattened perspective view image having a uniform depth of field. For example, the method 920 may be utilized to warp each of the perspective view images. After any perspective view images have been warped, or when the two source images do not include any perspective views (e.g., the "No" leg of block 925), the method 920 includes determining 930 whether or not the two images (at this point both of which have respective relatively uniform depths of field) have equivalent depths of field. If not (e.g., the "No" leg of block 930), then the method 920 includes normalizing 932 or otherwise truing up the two different depths of field. Normalizing 932 the depths of field into a common or equivalent depth of field may include resizing one or both of the source images, in some situations.

Upon both images having a same normalized or equivalent depth of field (e.g., as denoted by the exit arrow of block 932 or the "Yes" leg of block 930), the method 920 includes determining 935 one or more common stitching waypoints or features which are depicted in both source images. Stitching waypoints or features may include, for example, a corner, an edge, or other feature of the area, segment, or component of the object which is at least partially depicted in each of the two source images. Additionally or alternatively, stitching waypoints or features may include waypoints or features of other areas, segments, or components of the object. For example, when the commonly depicted segment in both images is a damaged right front bumper, the waypoints may include the right headlight assembly, the right front wheel, etc. The one or more common stitching waypoints/features may be determined using any suitable technique, such as convolution, utilizing k-dimensional trees, etc.

At a block 938, the method 920 includes aligning the two images having the normalized depths of field based on the determined common stitching waypoints, and at a block 940, the method 920 includes stitching together the aligned images to form a single, stitched image (e.g., the stitched image 905) depicting the area, segment, or component of the object which was at least partially depicted in each of the obtained source images. For example, when each source image depicts a different portion of a same segment of the object which partially overlap, the stitched image depicts an aggregate depiction of a larger portion (and in some cases, the entirety) of the segment in a single image. In another example, when one of the source images depicts a smaller portion of the segment than the other sourced image, but with a greater level of zoom than the other source image, the stitched image depicts the additional detail provided by the greater level of zoom into the larger depiction of the segment.

The stitching technique of method 920 is particularly useful for manipulating images of a segment which wraps around or otherwise extends over several views of an object, such as the front bumper assembly or a front headlight assembly of an automobile, into a single view via which characteristics of a damaged area of the segment whose depiction extends across the multiple views may be accurately determined. For example, precise measurements of the entire size and location of the damaged area may be determined from the stitched image, and/or particular types of damage to the segment may be identified from the stitched image.

Figure 10A:
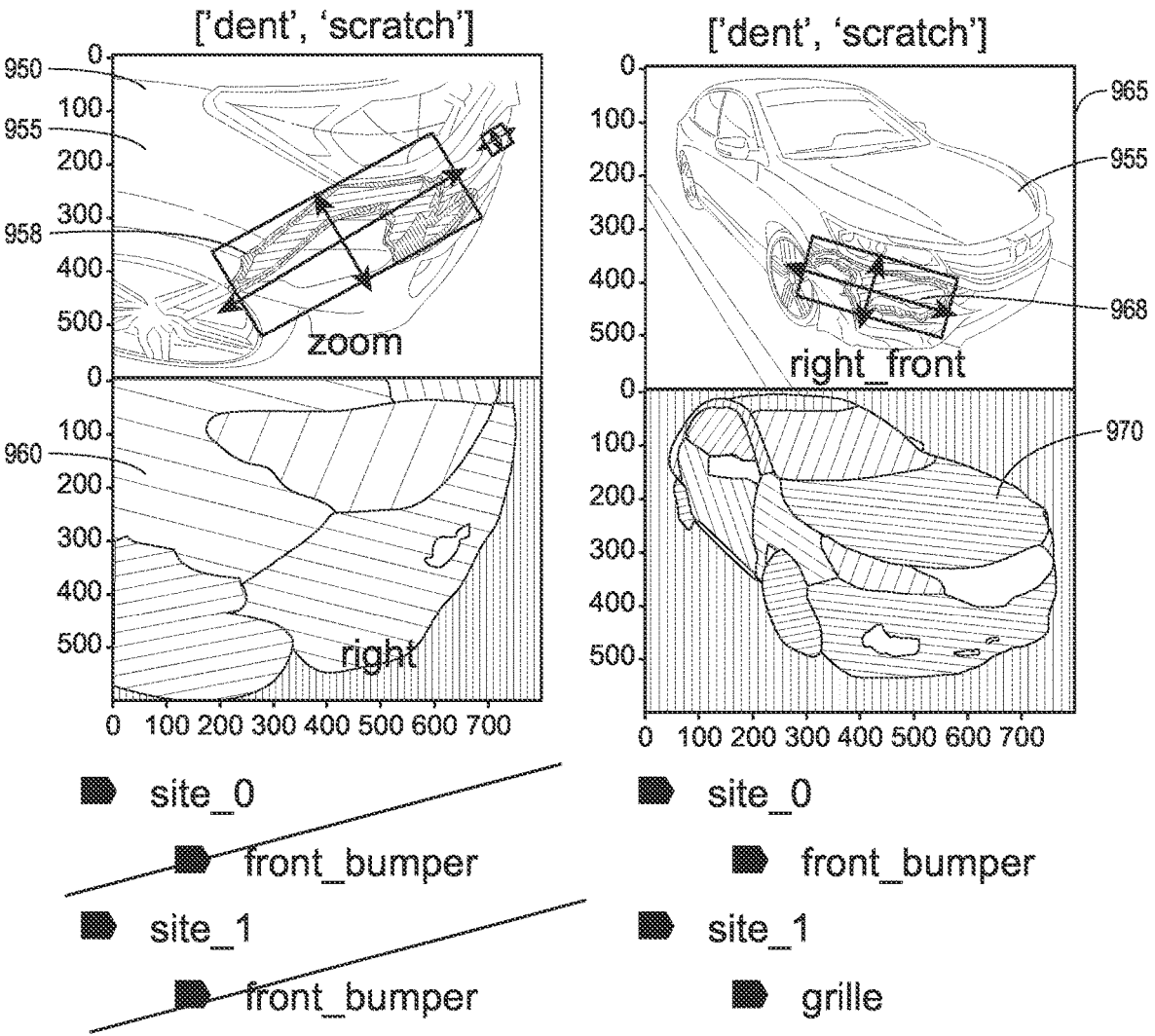
FIGS. 10A-10C depict example display screens illustrating detailed damage on an automobile as determined by the image processing system 100 and/or by the image processing system of FIG. 2.
Figure 10B:
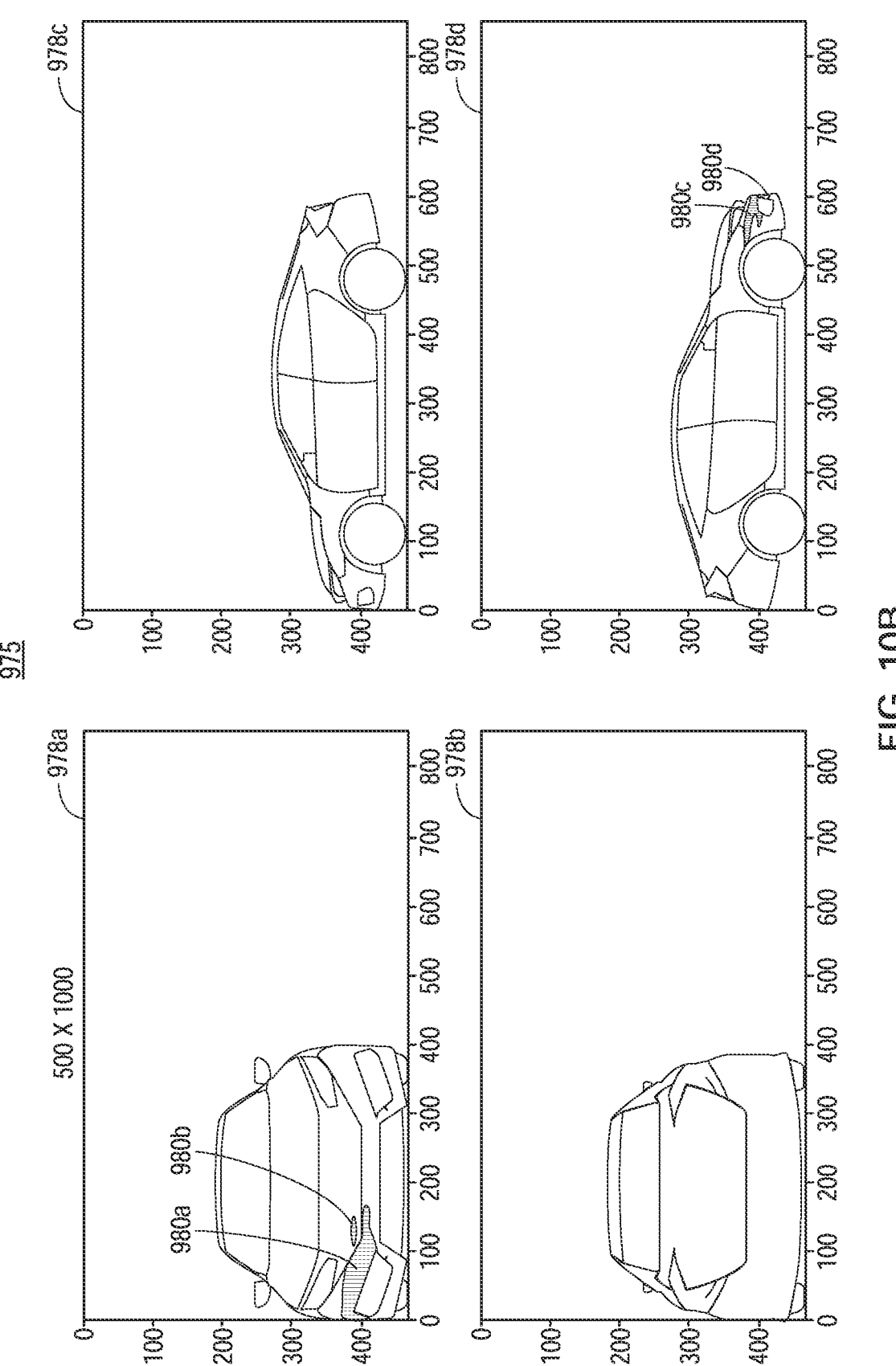
Figure 10C:
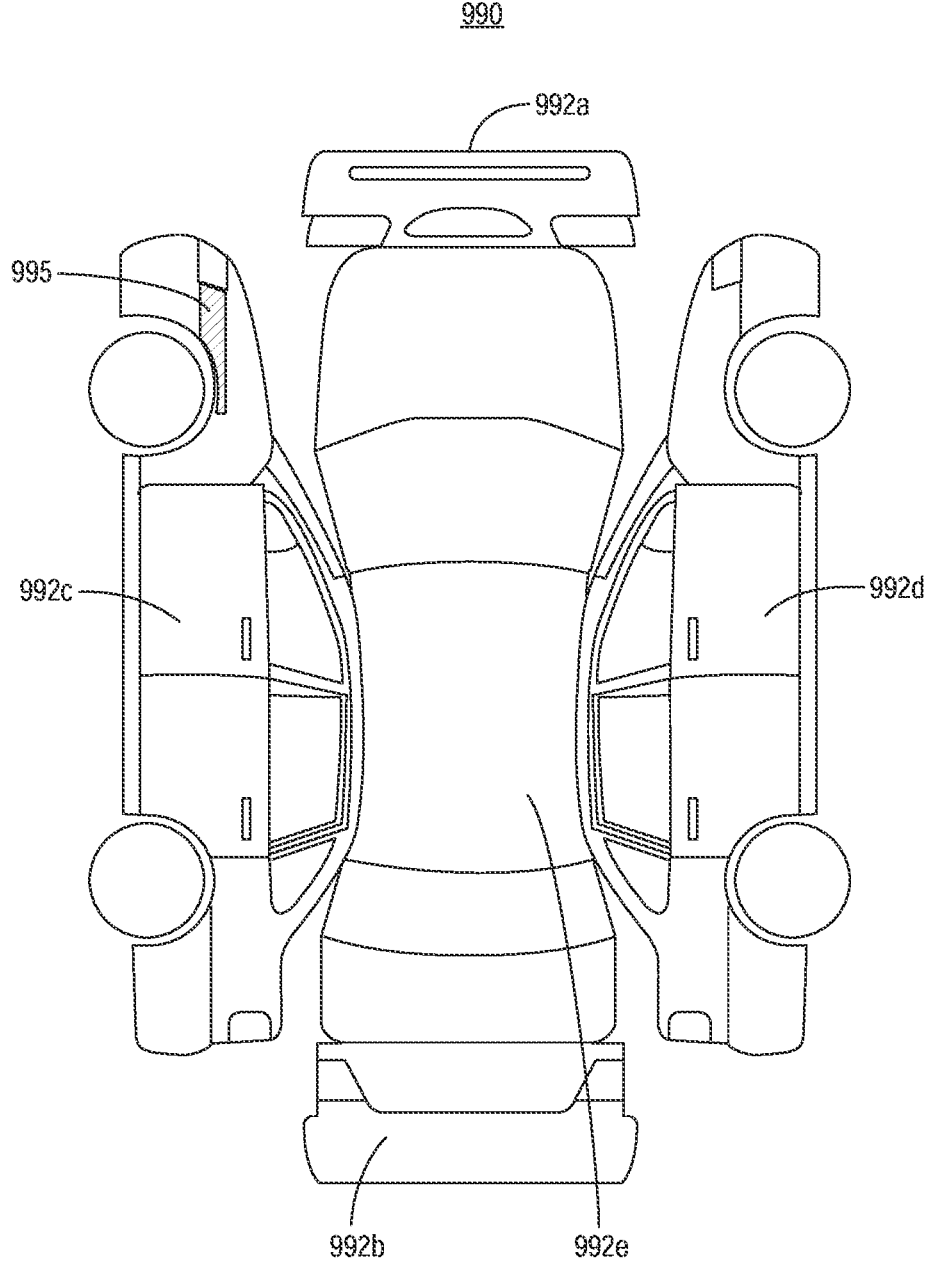

As previously discussed, each of the set of target images of an object may be operated on by the image processing system 100, the image processing system 200, and/or by one or more of the disclosed image processing techniques to detect changes to the depicted object, and the detected change information (e.g., type(s) of change(s), precise location(s) of change on the object, precise size(s) of changes, etc.) may be consolidated and provided to a user interface for display thereon, stored in a file, and/or transmitted to another computing device. FIGS. 10A-10C depict example outputs and display screens (which may be presented on user interfaces, for example), each of which provides damage information determined from image processing a set of target images of a damaged vehicle, e.g., via the image processing system 100, the image processing system 200, and/or by using one or more of the disclosed image processing techniques for detecting changes in depicted objects.

FIG. 10A illustrates an example implementation of aggregating and consolidating damage or change information detected from image processing multiple images of a damaged vehicle. In FIG. 10A, original target image 950 of a damaged vehicle 955 has been overlaid with a corresponding heat map 958. Damaged areas depicted in the image 950 have been typed as being a "dent" on the right front bumper ("site_0") and a "scratch" on the right front bumper ("site_1"), and have been respectively measured based on a corresponding segmentation map 960. Similarly, original target image 965 of the damaged vehicle 955 has been overlaid with a corresponding heat map 968. The damaged areas depicted in image 955 have been identified as a "scratch" on the right front bumper ("site_0") and a "dent" on the grille ("site_1"), and have been respectively measured based on a corresponding segmentation map 970. As damage to the right front bumper has been detected in both image 950 and image 965, in the consolidated information, the front bumper need only be indicated once as a damage site (and not three times, as denoted by the slanted lines) in conjunction with its corresponding (aggregate and consolidated) types of damages (e.g., "dent" and "scratch") along with the indication of the grille and its corresponding type of damage (e.g., "dent").

FIG. 10B depicts an example display screen 975 on which detected change information of a vehicle may be presented to a user. The display screen 975 presents four segmented views of the vehicle, e.g., a front view 978a, a rear view 978b, a left side view 978c, and right side view 978d, where each segment of the vehicle is depicted a different color, and the color key is consistent across the four views 978a-978d. Based on the pixels of the heat map images and the segmentation map images generated based on the initial set of target images of the vehicle, the detected areas of damage are indicated in the views 978a-978d by the color black. A user may zoom in on any of the views to obtain a more detailed depiction of a damaged area (if any), and/or a user may select a damaged area (e.g., by clicking), upon which detailed information about the damaged area (e.g., precise size, segment(s) affected by the damage, precise location, damage type(s), etc.) may be displayed (e.g., in a pop-up window, or other suitable representation). In some embodiments, by selecting an indicated area of damage on one of the views 978a-978d, the display screen 975 may present, on the user interface, the original target image(s) which include the selected area of damage. Of course, such damage information associated with display view 975 may be stored in a file and processed by another computing device or routine, e.g., to determine replacement parts to order, to determine insurance estimates, to estimate repair costs, etc.

FIG. 10C depicts a display screen 990 on which detected change information of a vehicle may be presented to a user. The display screen presents a "butterflied" depiction of the vehicle in which five views of the vehicle, e.g., a front view 992a, a rear view 992b, a left side view 992c, a right side view 992d, and a bird's eye view 992e are depicted by using outlines of segments and parts of the vehicle which are visible in each view. Detected areas of damage 995 (in this case, only a single detected area of damage) are depicted on the display screen 990 in a contrasting color. Similar to the display screen 975, a user may zoom in on any of the views to obtain a more detailed depiction of a damaged area (if any), and/or a user may select the damaged area (e.g., by clicking), upon which detailed information about the damaged area (e.g., precise size, segment(s) affected by the damage, precise location, damage type(s), etc.) may be displayed (e.g., in a pop-up window, or other suitable representation). In some embodiments, by selecting an indicated area of damage on one of the views 992a-992e, the display screen 990 may present, on the user interface, the original target image(s) which include the selected area of damage. Of course, such damage information associated with display view 990 may be stored in a file and processed by another computing device or routine, e.g., to determine replacement parts to order, to determine insurance estimates, to estimate repair costs, etc.

Of course, FIGS. 10A-10C are exemplary outputs and display screens on which the change information detected by the disclosed image processing techniques may be presented. Other display screens and representations may be utilized.

The following additional considerations apply to the foregoing discussion. Throughout this specification, plural instances may implement components, operations, or structures described as a single instance. Although individual operations of one or more routines or methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms or units. Any of these modules, units, components, etc. may constitute either software modules (e.g., code stored on a non-transitory, tangible, machine-readable medium) or hardware modules. A hardware module is tangible unit capable of performing certain operations and may be configured or arranged in a certain manner. In example embodiments, one or more computer systems (e.g., a stand-alone, client or server computer system, cloud computing system, etc.) or one or more hardware modules of a computer system (e.g., a processor or a group of processors) may be configured by software (e.g., an application or application portion) as a hardware module that operates to perform certain operations as described herein.

A hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module in dedicated and permanently configured circuitry or in temporarily configured circuitry (e.g., configured by software) may be driven by cost and time considerations.

Accordingly, the hardware terms used herein should be understood to encompass tangible entities, be that entities that are physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules or routines can provide information to, and receive information from, other hardware and/or software modules and routines. Accordingly, the described hardware modules may be regarded as being communicatively coupled. Where multiple of such hardware or software modules exist contemporaneously, communications may be achieved through signal transmission (e.g., over appropriate circuits, lines and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a university complex, an office environment, or as a server farm), while in other embodiments the processors may be distributed across a number of locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "application," an "algorithm" or a "routine" is a self-consistent sequence of operations or similar processing leading to a desired result. In this context, applications, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs may be used for implementing an image processing application and system for configuring and executing the change detection techniques disclosed herein. Thus, while particular embodiments and applications have been illustrated and described herein, it is to be understood that the disclosed embodiments are not limited to the precise construction and components disclosed herein. Various modifications, changes and variations, which will be apparent to those skilled in the art, may be made in the arrangement, operation and details of the methods and structure disclosed herein without departing from the spirit and scope defined in the claims.

What is claimed:

1. A method of detecting damage to a vehicle, comprising:
obtaining a plurality of electronic images of a plurality of vehicles having damage;
marking each electronic image of the plurality of electronic images, via a computer processing device, to indicate, for each pixel of a first set of pixels of the each electronic image of the plurality of electronic images illustrating damage to a respective vehicle depicted within the each electronic image, a respective damage type of a plurality of damage types and a respective segment of a plurality of predetermined vehicle segments, each vehicle segment corresponding to a different part of an undamaged vehicle, to create a set of marked vehicle images;
developing, using a computer processing device, a regression model from the plurality of marked vehicle images, the regression model trained to detect vehicle damage in an image on a pixel by pixel basis;

obtaining at least one electronic image of a further vehicle;
applying, using a computer processing device, the regression model to the at least one electronic image of the further vehicle to determine, for each pixel of a second set of pixels of the at least one electronic image of the further vehicle, a measure of a probability of damage to the further vehicle at locations of the vehicle associated with the each pixel of the second set of pixels, the applying of the regression model to the at least one electronic image of the further vehicle including providing, to the regression model, at least one of: a first input indicative of a respective view of each electronic image of the at least one electronic image, or a second input indicative of a respective zoom level of the each electronic image of the at least one electronic image, including determining a predicted damage type and a predicted vehicle segment at the locations of the vehicle associated with the each pixel of the second set of pixels; and
producing, using a computer processing device, a heat map of the further vehicle illustrating areas of detected damage to the further vehicle.

2. The method of claim 1, wherein the regression model is a neural network model.

3. The method of claim 1, wherein the regression model is a convolutional neural network model.

4. The method of claim 3, wherein developing the regression model includes selecting a size and a shape for a pixel area surrounding a pixel being processed to use as inputs to the regression model.

5. The method of claim 1, wherein developing the regression model includes using a plurality of electronic images of a plurality of different vehicles including different damage.

6. The method of claim 1, wherein developing the regression model includes using a plurality of electronic images of a plurality of different vehicles including different types of damage.

7. The method of claim 1, wherein developing the regression model includes using a plurality of electronic images of a plurality of different vehicles including damage at different locations on the different vehicles.

8. The method of claim 1, wherein developing the regression model includes using a plurality of electronic images of a plurality of different vehicles of different years, makes, models or trims, including damage.

9. The method of claim 1, further including using the heat map to determine one or more repair activities to be applied to the further vehicle to correct damage to the further vehicle.

10. The method of claim 1, further comprising marking the each electronic image of the plurality of electronic images with at least one of: an indication of a respective view of the respective vehicle within the each electronic image of the plurality of electronic images, or an indication of a level of zoom of the each electronic image of the plurality of electronic images.

11. An image processing system for use in detecting damage to a vehicle, comprising:
one or more tangible, non-transitory memories that store a plurality of electronic images of a plurality of vehicles including damage, wherein each electronic image of the plurality of electronic images is marked to indicate, for each pixel of a first set of pixels of the each electronic image of the plurality of electronic images at which damage to a respective vehicle depicted in the each electronic image is present, a respective damage type of a plurality of damage types and a respective segment of a plurality of predetermined vehicle segments, each vehicle segment corresponding to a different part of an undamaged vehicle;

a model generation routine, for execution on a computer processor, that creates a regression model from the plurality of marked vehicle images stored in the one or more tangible, non-transitory memories, the regression model trained to detect vehicle damage in an image on a pixel by pixel basis;

at least one electronic image of a further vehicle, the at least one electronic image of the further vehicle stored on the one or more tangible, non-transitory memories;

a damage detection routine, for execution on a computer processor, that analyzes the at least one electronic image of the further vehicle using the regression model to determine, for each pixel of a second set of pixels of the at least one electronic image of the further vehicle, a measure of a probability of damage to the further vehicle at locations of the vehicle associated with the each pixel of the second set of pixels, the using of the regression model including providing, to the regression model, at least one of: a first input indicative of a respective view of the further vehicle depicted within each electronic image of the at least one electronic image, or a second input indicative of a respective zoom level of the each electronic image of the at least one electronic image, the damage detection routine further determining a predicted damage type and a predicted vehicle segment at the locations of the vehicle associated with the each pixel of the second set of pixels; and a heat map routine, for execution on a computer processor, that develops a heat map of the further vehicle illustrating locations of the further vehicle at which damage has been detected.

12. The image processing system of claim 11, wherein the regression model is a neural network model.

13. The image processing system of claim 11, wherein the model generation routine develops the regression model using a plurality of electronic images of a plurality of different vehicles including different types of damage.

14. The image processing system of claim 11, wherein the model generation routine develops the regression model using a plurality of electronic images of a plurality of different vehicles including damage at different locations on the different vehicles.

15. The image processing system of claim 10, wherein:

the each electronic image of the at least one electronic image of the further vehicle includes at least one of: first information about the respective view of the further vehicle depicted within the each electronic image of the further vehicle, or second information about the respective zoom level of the each electronic image of the further vehicle; and at least one of: the first input to the regression model is based on the first information or the second input to the regression model is based on the second information.

16. An image processing system for detecting damage to a vehicle, comprising:

a memory that stores one or more electronic images of the vehicle;

a characterization engine having an image model, wherein the characterization engine executes on a computer processor to process each electronic image of the one or more electronic images of the vehicle using the image model to detect, on a pixel by pixel basis, if there is damage to the vehicle at a corresponding location of the vehicle depicted in the each electronic image of the one or more electronic images of the vehicle, wherein the image model is a regression model trained on a plurality of marked vehicle images in which each pixel, of the plurality of marked vehicle images, corresponding to damage to a respective vehicle depicted within each vehicle image of the marked vehicle images is marked with an indication of a respective damage type of a plurality of damage types and a respective segment of a plurality of predetermined vehicle segments, each vehicle segment corresponding to a different part of an undamaged vehicle, and wherein the using of the image model includes providing, to the image model, at least one of: a first input indicative of a respective view of the vehicle depicted within the each electronic image of the one or more electronic images of the vehicle, or a second input indicative of a respective zoom level of the each electronic image, and wherein using the characterization engine further includes determining a predicted damage type and a predicted vehicle segment at the corresponding location of the vehicle depicted in the each electronic image of the one or more electronic images of the vehicle; and one or more tangible, non-transitory memories that store an image of the vehicle indicating, for each pixel of a set of pixels of the image, if damage exists on the vehicle at the each pixel.

17. The image processing system of claim 16, wherein the characterization engine is a neural network engine and wherein the image model includes neural network weights developed using the plurality of marked vehicle images.

18. The image processing system of claim 16, wherein the characterization engine applies, at each pixel of a multiplicity of pixels within the one or more images of the vehicle, an input template that specifies a set of pixels around a pixel being analyzed to use as inputs to the image model.

19. The image processing system of claim 16, wherein at least one of:

the each electronic image of the one or more electronic images of the vehicle includes information about the respective view of the vehicle depicted within the each electronic image of the vehicle, and the first input to the regression model is based on the information about the respective view; or the each electronic image includes information about the respective zoom level of the each electronic image, and the second input to the regression model is based on the information about the respective zoom level.

20. The image processing system of claim 16, wherein the characterization engine determines, using the image model, a probability of damage at each pixel of a set of pixels in the one or more of the electronic images of the vehicle and uses the determined probability of damage at the each pixel of the set of pixels to determine if damage to the vehicle exists at the each pixel of the set of pixels.

* * * * *